US011698573B2

(12) United States Patent
Shigematsu

(10) Patent No.: US 11,698,573 B2
(45) Date of Patent: Jul. 11, 2023

(54) ADAPTER DEVICE, MOUNT APPARATUS, AND ACCESSORY

(71) Applicant: CANON KABUSHIKI KAISHA, Tokyo (JP)

(72) Inventor: Masayasu Shigematsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/184,362

(22) Filed: Feb. 24, 2021

(65) Prior Publication Data
US 2021/0181607 A1    Jun. 17, 2021

Related U.S. Application Data

(63) Continuation of application No. PCT/JP2018/031995, filed on Aug. 29, 2018.

(51) Int. Cl.
*G03B 17/56*   (2021.01)
*G03B 17/14*   (2021.01)

(52) U.S. Cl.
CPC ............. *G03B 17/56* (2013.01); *G03B 17/14* (2013.01); *G03B 17/565* (2013.01); *G03B 2206/00* (2013.01)

(58) Field of Classification Search
CPC ................... G03B 17/14; H04N 23/50–55
See application file for complete search history.

(56) References Cited

U.S. PATENT DOCUMENTS

| 5,274,413 | A  | * | 12/1993 | Nomura  | G03B 17/14 |
| | | | | | 396/529 |
| 8,770,868 | B1 | * | 7/2014 | Hasuda  | H04N 5/2254 |
| | | | | | 396/531 |
| 9,261,756 | B2 | * | 2/2016 | Kuroiwa | G03B 17/565 |

(Continued)

FOREIGN PATENT DOCUMENTS

| CN | 102401975 A | 4/2012 |
| CN | 103608724 A | 2/2014 |

(Continued)

OTHER PUBLICATIONS

Leicaflex SL at https://www.leicaeme.com/wiki_index/Leicaflex-SL (Year: 2022).*

(Continued)

*Primary Examiner* — Leon W Rhodes, Jr.
(74) *Attorney, Agent, or Firm* — Canon U.S.A., Inc. I.P. Division

(57) ABSTRACT

An adapter device includes a first mount and a second mount. The first mount is fastened to the adapter device by multiple screws, and has first through third mount recesses and first through third mount claws disposed following a circumferential direction. The second mount is fastened to the device by multiple screws, and has fourth through sixth mount claws and fourth through sixth mount recesses disposed following the direction. The first through third mount claws are insertable to mount recesses on an imaging apparatus, the fourth through sixth mount claws are insertable to mount recesses on an accessory, and the smallest angle range of the first through third mount recesses in the direction of the first mount is not greater than the smallest angle range of the fourth through sixth mount claws in the direction of the second mount.

24 Claims, 26 Drawing Sheets

(56) References Cited

U.S. PATENT DOCUMENTS

| | | |
|---|---|---|
| 2013/0077953 A1 | 3/2013 | Kikuchi |
| 2013/0148954 A1 | 6/2013 | Uehara |
| 2015/0212395 A1* | 7/2015 | Kuroda ............... G03B 17/566 396/529 |

FOREIGN PATENT DOCUMENTS

| | | |
|---|---|---|
| CN | 108989611 A | 12/2018 |
| EP | 2728405 A1 | 5/2014 |
| EP | 3410187 A1 | 12/2018 |
| EP | 3410188 A1 | 12/2018 |
| JP | 2005-070712 A | 3/2005 |
| JP | 2013-003389 A | 1/2013 |
| JP | 2014-021348 A | 2/2014 |
| JP | 2017-211536 A | 11/2017 |
| JP | 6615265 B2 | 12/2019 |

OTHER PUBLICATIONS

Leicaflex SL 35mm at https://cameratique.com/leicaflex-sl-35mm-chrome-classic-film-vintage-camera-body-slr-cap-excellent-cond (Year: 2022).*

Leicaflex SL chrome body at https://wide-angle.nl/shop/leicaflex-sl-chrome-body-1e-model-1969/ (Year: 2022).*

Metabones MBLR-M43-BM2 Adapter B&P Photo product page, https://www.bhphotovideo.com/c/product/1088723-REG/metabones_mblr_m43_bm2_leica_r_to_micro.html (Year: 2015).*

* cited by examiner

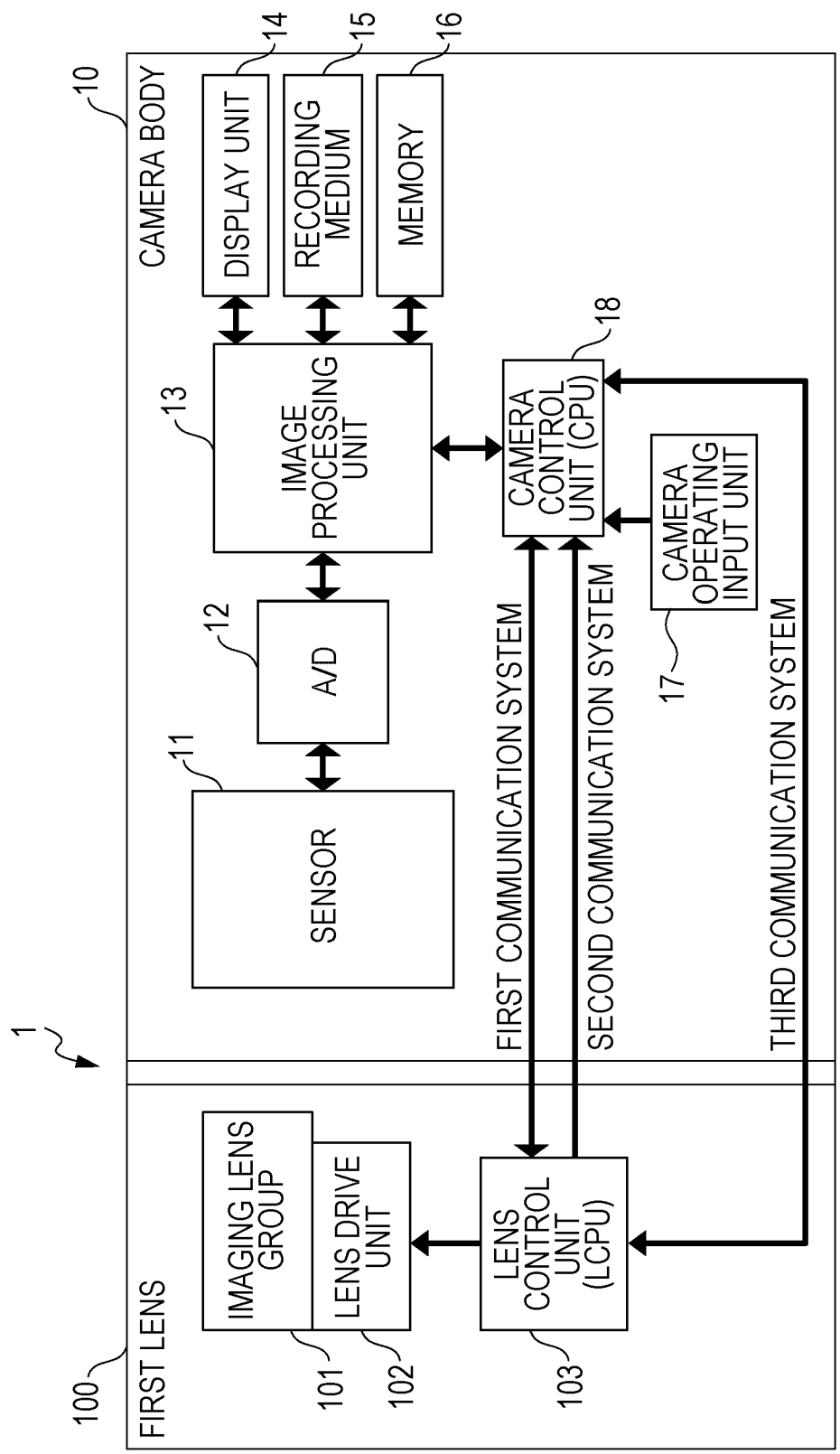

ADAPTER DEVICE, MOUNT APPARATUS, AND ACCESSORY

CROSS-REFERENCE TO RELATED APPLICATIONS

This application is a Continuation of International Patent Application No. PCT/JP2018/031995, filed Aug. 29, 2018, which is hereby incorporated by reference herein in their entirety.

BACKGROUND OF THE INVENTION

Field of the Invention

The present invention relates to an adapter device, a mount apparatus, and an accessory.

Background Art

Conventionally, an accessory (camera accessory), such as an interchangeable lens, which can receive power supply from a digital camera (herein after, referred to as a camera) and communicate commands, data, and so forth with the camera in a state where the accessory is mounted to the camera is known. It is known that multiple contacts (terminals) capable of electric connection, by coming into contact, are provided on both the camera and a mounting portion of the accessory, to enable the power supply and communication.

There is also known a mounting system for mounting (coupling) the accessory to the camera employing so-called bayonet coupling. In the bayonet coupling, mounts of both the camera and accessory are relatively rotated, and bayonet claws provided on each of the camera and accessory engage with each other.

Corresponding combinations of cameras and accessories employing a mounting system described above are predetermined. For example, corresponding accessories (e.g., interchangeable lenses, etc.) differ depending on the length of the flange focal distance of the camera. In other words, some accessories are not compatible with the flange focal distance of a camera.

In a case where an accessory not compatible with a camera is mounted, problems may occur. For example, in a case where an interchangeable lens not compatible with a camera having a certain flange focal distance is mounted to the camera, an optical image of a subject entering via the interchangeable lens may not be focused on the image plane of the camera. Thus, it may be necessary to restrict connection of a camera and an accessory in an incompatible combination.

In particular, in a case where a corresponding camera has approximately the same diameter as the diameter a plurality of accessories have, it may be difficult to judge from the external appearance whether the camera and the accessories have a corresponding combination.

PTL1 discusses a technique where a protrusion of a lens, which has the same flange focal distance but a short back focus, abuts a wall portion provided to a camera body, thereby preventing erroneous mounting of the lens to a camera body that cannot be mounted with a lens with a short back focus.

CITATION LIST

Patent Literature

PTL1: Japanese Patent Laid-Open No. 2005-70712

The technique described in PTL1 only discusses a technique that prevents erroneous mounting of a lens to a camera that cannot operate correctly with a lens that uses the same mounting system and has a short back focus. Thus, the technique discussed in PTL1 cannot prevent erroneous mounting of an accessory that has a different flange focal distance to a camera not compatible with the accessory.

Further, in the technique discussed in PTL1, a wall portion is provided on the camera body such that a protrusion of the lens is abutted to the camera body. Another configuration is thereby needed, and thus the number of parts or manufacturing cost may be increased.

Further, for example, in a case where a conversion lens having substantially the same mount diameter and a long flange focal distance is mounted to a camera having a short flange focal distance, a conversion adapter is necessary to be inserted between the camera and the conversion lens. In this case, the conversion lens has substantially the same diameter on both ends, and thus there is a problem that erroneous mounting may easily occur on the camera and the accessory with respect to the conversion adapter.

The present invention is directed to prevent erroneous mounting of an imaging apparatus and an accessory having mounts that can be mutually engaged with each other.

SUMMARY OF THE INVENTION

The present invention in its first aspect provides an adapter device according to the present invention includes a first mount on one side, and a second mount on another side, the first mount being attachable to and detachable from an imaging apparatus, and the second mount being attachable to and detachable from an accessory, the adapter device being characterized in that the first mount is fastened to the adapter device by a plurality of first screws, and a first mount recess, a first mount claw, a second mount recess, a second mount claw, a third mount recess, and a third mount claw are disposed following a circumferential direction of the first mount, the second mount is fastened to the adapter device by a plurality of second screws, and a fourth mount claw, a fourth mount recess, a fifth mount claw, a fifth mount recess, a sixth mount claw, and a sixth mount recess are disposed following a circumferential direction of the second mount, the first, second, and third mount claws are insertable into mount recesses provided to the imaging apparatus, the fourth, fifth, and sixth mount claws are insertable into mount recesses provided to the accessory, and a smallest angle range out of angle ranges in a circumferential direction of the first mount out of the first, second, and third mount recesses is equal to or smaller than a smallest angle range out of angle ranges in a circumferential direction of the second mount out of the fourth, fifth, and sixth mount claws.

The present invention in its second aspect provides an adapter device comprising a first mount on one side and a second mount on another side, a first mount being attachable to and detachable from an imaging apparatus, and the second mount being attachable to and detachable from an accessory, wherein the first mount is fastened to the adapter device by a plurality of first screws, and a first mount recess, a first mount claw, a second mount recess, a second mount claw, a third mount recess, and a third mount claw are disposed following a circumferential direction of the first mount, the second mount is fastened to the adapter device by a plurality of second screws, and a fourth mount claw, a fourth mount recess, a fifth mount claw, a fifth mount recess, a sixth mount claw, and a sixth mount recess are disposed following a circumferential direction of the second mount, the first, second, and third mount claws are insertable into mount recesses provided to the imaging apparatus, the fourth, fifth, and sixth mount claws are insertable to mount recesses provided to the accessory, and a largest angle range out of angle ranges in a circumferential direction of the second mount out of the fourth, fifth, and sixth mount claws is smaller than a largest angle range out of angle ranges in a circumferential direction of the first mount out of the first, second, and third mount recesses.

The present invention in its third aspect provides a mount apparatus being attachable to and detachable from an accessory having a first mount, wherein the mount apparatus has a second mount having a plurality of mount claws that can be engaged with a plurality of claws provided to the first mount, the plurality of mount claws includes a first mount claw, and a second mount claw and a third mount claw each having an angle range in a circumferential direction smaller than the angle range of the first mount claw, disposed following a circumferential direction of the second mount, the mount apparatus has a plurality of biasing members biasing the plurality of mount claws provided to the first mount in a center axis direction of the second mount, the first, second and third mount claws respectively have a first, second and third biasing member arrangement portions on which each of the plurality of biasing members is arranged, the second mount is fastened to the imaging apparatus by a plurality of screws, and in a case where a line extending from a center of the second mount in a gravitational direction and a direction opposite to the gravitational direction when viewing the mount apparatus in a normal position from the center axis direction of the second mount is taken as a first mount center line, and a line orthogonal to the first mount center line is taken as a second mount center line, and when viewing the second mount in the center axis direction of the second mount: the first mount claw overlaps the first mount center line, and at least one of the second mount claw and the third mount claw overlap the second mount center line, in a radial direction of the second mount, the first biasing member arrangement portion overlaps the first mount center line in the radial direction of the second mount, and the second biasing member arrangement portion overlaps the second mount center line in the radial direction of the second mount.

The present invention in its fourth aspect provides an accessory attachable to and detachable form a mount apparatus having a first mount, wherein the accessory has a second mount having a plurality of mount claws and a plurality of mount recesses that can be engaged with a plurality of claws provided to the first mount, the plurality of mount recesses include a first mount recess, and a second mount recess and a third mount recess that have an angle range in the circumferential direction smaller than the angle range of the first mount recess, disposed following a circumferential direction of the second mount, the second mount is fastened to the imaging apparatus by a plurality of screws, in a state that the accessory is attached to the mount apparatus, the plurality of mount claws are biased in a center axis direction of the second mount by each of a plurality of biasing members arranged in each space of the plurality of claws in the mount apparatus, the plurality of mount claws include a first mount claw, a second mount claw and a third mount claw, and in a case where a line extending from a center of the second mount in a gravitational direction and a direction opposite to the gravitational direction when viewing from the center axis direction of the second mount with the mount apparatus to which the accessory is mounted in a normal position, is taken as a first mount center line, and when viewing the second mount in the center axis direction of the second mount: the first mount center line does not overlap any of the plurality of mount recesses, and at least the biasing member which biases the first mount claw overlaps the first mount center line in a state that the accessory is attached to the mount apparatus.

Further features of the present invention will become apparent from the following description of exemplary embodiments with reference to the attached drawings.

BRIEF DESCRIPTION OF THE DRAWINGS

FIG. 1A is a block diagram of a camera system including a first lens unit 100 and a camera body 10 as a first imaging apparatus to/from which the first lens 100 can be directly attached/detached according to an embodiment of the present invention.

DESCRIPTION OF THE EMBODIMENTS

Figure 1B:
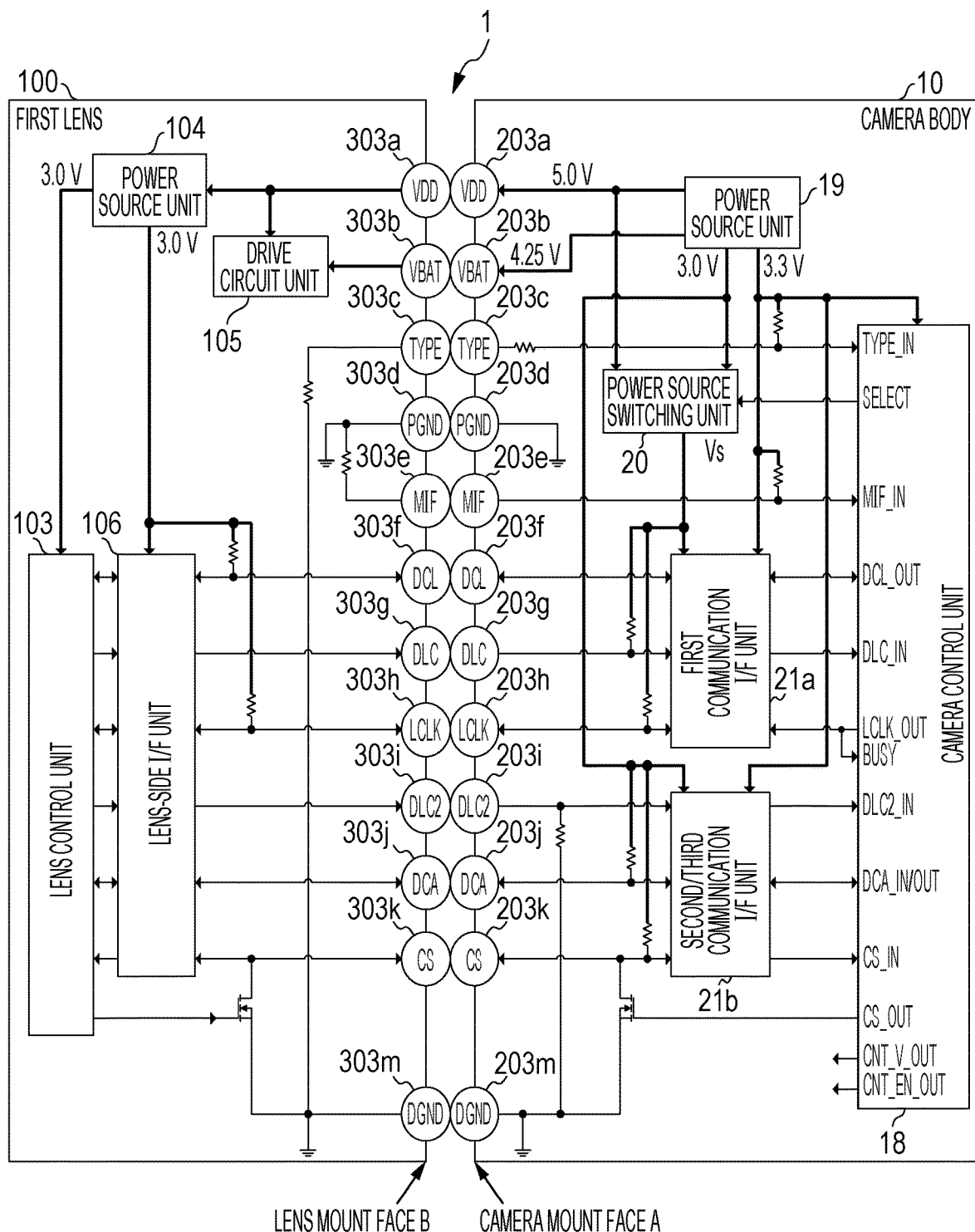
FIG. 1B is a block diagram illustrating a configuration of a mount portion 1 included in the first lens 100 and the camera body 10 according to an embodiment of the present invention.

FIGS. 1A and 1B are block diagrams of a camera accessory and imaging apparatus according to an embodiment of the present invention. FIG. 1A is a diagram exemplarily describing a camera system including a first lens unit (hereinafter referred to as first lens) 100, serving as an accessory according to the embodiment of the present invention, and a camera body 10 serving as a first imaging apparatus to/from which the first lens 100 can be directly attached/detached. FIG. 1B is a diagram describing the configuration of a mount portion 1 included in the first lens 100 and the camera body 10. That is in FIG. 1, the mounts provided on the first lens 100 and the camera body 10 are collectively referred to as the mount portion 1. Each mount provided to the first lens 100 and camera body 10 will be described below.

As illustrated in FIG. 1A, the camera body 10 has a charge-accumulation type solid-state imaging device (hereinafter referred to simply as sensor) 11, such as a complementary metal-oxide semiconductor (CMOS) sensor or the like, that performs photoelectric conversion of an optical image of a subject guided by a photography lens group 101 provided on the inner side of the first lens 100 and outputs electric signals. The camera body 10 also has an analogue to digital (A/D) conversion unit 12 that converts analog electric signals output from the imaging sensor 11, and an image processing unit 13 that generates image signals by performing various types of image processing on the digital signals. The image signals (still image and moving image) generated at the image processing unit 13 can be displayed on a display unit 14, and recorded in a recording medium 15.

The camera body 10 has memory 16. This memory 16 serves as a buffer for performing processing on image signals, and also stores operation programs (computer programs) that a below-described camera control unit 18 uses.

The camera body 10 has a camera operating input unit 17 including a power source switch for turning the power source on/off, a photography switch (release switch) for starting recording of image signals, and selection/settings switches for performing various types of menu settings. The camera body 10 has the camera control unit 18 including a microprocessor (central processing unit (CPU) serving as a computer) that centrally controls the operations of the camera body 10 and first lens 100. For example, the camera control unit 18 performs various types of settings based on signals input from the camera operating input unit 17, or controls communication with a lens control unit 103 provided to the first lens 100 via the mount portion 1.

On the other hand, the first lens 100 has the photography lens group 101 an optical member having multiple lens groups, such as a zoom lens, shift lens, and focus lens, and light amount adjustment members, such as a diaphragm. The first lens 100 has actuators for moving or operating optical members, such as the multiple lens groups and diaphragm, and a lens drive unit 102 that drives the actuators. The first lens 100 includes the lens control unit 103 including a microprocessor (logical CPU (LCPU)) for lenses, which centrally controls operations of the first lens 100. The lens control unit 103 controls the lens drive unit 102 by communicating with the camera control unit 18 via, for example, the mount portion 1.

(Basic Configuration of Mount Portion 1)

Next, the configuration of the mount portion 1 including a camera mount face A provided on the camera body 10 side, and an accessory mount face B provided on the first lens 100 side will be described with reference to FIG. 1B. The camera mount and accessory mount include a locking mechanism, a mount holding mechanism, and multiple electric terminals. The mounts will be described in detail below.

The mount portion 1 has multiple terminals that are capable of electrically connecting the camera body 10 and the first lens 100 to each other, as illustrated in FIG. 1B. The multiple terminals are, at the camera mount face A, exposed to the outside of the camera body 10 as multiple camera-side contact pins provided to a contact holding member 203. The multiple terminals are, at the accessory mount face B, exposed to the outside of the camera accessory (e.g., first lens 100) as multiple accessory-side contact faces provided to a contact face holding member 303. The contact pins and the contact faces of the camera body 10 side and the camera accessory (e.g., first lens 100) side are electrically connected to each other with mutually corresponding contacts in a state where the camera accessory is mounted to the camera body 10.

A camera power source unit 19 generates a communication control power source (VDD) as a power source to be supplied to a mounted camera accessory via a VDD terminal, or power source to be supplied to a first communication I/F unit 21a via a power source switching unit 20. The camera power source unit 19 also generates a driving power source (VBAT) as a power source to be supplied to the mounted camera accessory via a VBAT terminal.

The camera power source unit 19 generates a 3.3 V power source as a power source to be supplied to the camera control unit 18, first communication I/F unit 21a, and a second/third communication I/F unit 21b. The camera power source unit 19 also generates 3.0 V power source as a power source to be supplied to the first communication I/F unit 21a and second/third communication I/F unit 21b via the power source switching unit 20.

The power source switching unit 20 is connected to the camera power source unit 19. The power source switching unit 20 supplies only one of the VDD and 3.0 V power sources generated at the camera power source unit 19, to the first communication I/F unit 21a as a power source Vs for communication interface. Switching of power source voltage is executed following instructions from the camera control unit 18.

Next, a lens power source 104 generates a 3.0 V power source, as a power source voltage for supply to the lens control unit 103 and a lens-side I/F unit 106, based on VDD supplied from the camera body 10 side.

In a state where the first lens 100 is mounted to the camera body 10, a driving power source (VBAT) is supplied to a drive circuit unit 105 at the first lens 100 side, via a VBAT terminal from the above-described camera power source unit 19.

Although the power source voltage for the lens control unit 103 and lens-side I/F unit 106 is the same (3.0 V) in the present embodiment, a configuration may be made where the voltage level that the lens control unit 103 exhibits is 3.3 V. In this case, there is the need to supply power source of a voltage level of 3.0 V and 3.3 V to the lens-side I/F unit 106, the lens power source 104 therefore generates power sources of 3.0 V and 3.3 V.

Hereafter, the functions of the terminals common to both the camera mount face A and accessory mount face B will be described. VDD terminals 203a and 303a are terminals that supply communication control power source (VDD) as communication power primarily used for communication control, to the camera accessory (e.g., the first lens 100) from the camera body 10. Note that while the voltage of power source supplied to the first lens 100 is 5.0 V, the voltage of supplied power source will change depending on the type of accessory mounted to the camera body 10.

VBAT terminals 203b and 303b are terminals that supply driving voltage source (VBAT), which is driving power used for operating the mechanical driving units of the actuators used for driving the diaphragm and focus lens, from the camera side to the camera accessory side. In other words, the VBAT terminals 203b and 303b are terminals used to supply power source other than the above-described communication power. Note that the voltage of the power source serving as driving power supplied to the first lens 100 is 4.25 V. The VDD terminals 203a and 303a and VBAT terminals 203b and 303b described above are power source terminals for supplying power source from the camera body 10 to the camera accessory, for example.

DGND terminals 203m and 303m are grounding terminals GND terminals) corresponding to the communication control power source VDD. Note that grounding in the present embodiment means to set the voltage level of the grounding terminals to approximately the same level as the negative pole side of the power source, such as a battery.

PGND terminals 203d and 303d are grounding terminals for connecting the camera body 10, and a mechanical drive system including motors (actuators) provided to a camera accessory (e.g., the first lens 100), to ground level. That is to say, the PGND terminals 203d and 303d are grounding terminals (GND terminals) corresponding to the driving power source VBAT. The DGND terminals 203m and 303m and PGND terminals 203d and 303d described above are grounding terminals for grounding various types of power source systems in the camera body 10 and accessory to the ground level.

MIF terminals 203e and 303e are terminals for detecting that the camera accessory (e.g., the first lens 100) has been mounted to the camera body 10. In the present embodiment, the MIF terminals 203e and 303e detect that the first lens 100 has been mounted to the camera body 10.

The camera control unit 18 detects that the camera accessory has been mounted to or detached from the camera body 10, by detecting the voltage level that the MIF terminals 203e and 303e indicated. Based on this detection, the camera control unit 18 starts supply of power source to power source terminals after having detected mounting of, for example, the camera accessory, and effects control to start communication between the camera body 10 and camera accessory.

TYPE terminals 203c and 303c are terminals for distinguishing the type of camera accessory (e.g., the first lens 100) mounted to the camera body 10. The camera control unit 18 detects the value of voltage of signals indicated by the TYPE terminals 203c and 303c, and distinguishes the type of camera accessory mounted to the camera body 10 based on this value. The first lens 100 is pull-down connected to the DGND terminal at a predetermined resistance value. This resistance value differs depending on the type of the camera accessory.

Next, description will be made regarding various types of communication terminals between the camera body 10 and the camera accessory. The multiple communication terminals provided to the mount portion 1 are divided into multiple communication systems (groups), and each communication system is capable of performing communication independently. In the present embodiment, LCLK terminals 203h and 303h, DCL terminals 203f and 303f, and DLC terminals 203g and 303g, are a first communication system that performs first communication. DLC2 terminals 203i and 303i are a second communication system that performs second communication, which is independent from the first communication. Further, CS terminals 203k and 303k, and DCA terminals 203*j* and 303*j* are a third communication system that performs third communication, which is independent from the first and second communication. In the present embodiment, the camera control unit 18 and lens control unit 103 can perform communication independently with the first through third, via the above-described multiple communication terminals.

LCLK terminals 203*h* and 303*h* are terminals of the first communication system, and are terminals for communication clock signals output from the camera body 10 to the camera accessory (e.g., the first lens 100), and terminals for the camera body 10 to monitor the busy state of the accessory.

DCL terminals 203*f* and 303*f* are terminals of the first communication system, and are communication data terminals for performing bidirectional communication between the camera body 10 and the camera accessory (e.g., the first lens 100).

DLC terminals 203*g* and 303*g* are terminals of the first communication system, and are terminals for communication data output from the camera accessory (e.g., the first lens 100) to the camera body 10.

The above-described LCLK terminals, DCL terminals, and DLC terminals, corresponding to the first communication system, can switch the signal output format between so-called CMOS output type and open type. In the present embodiment, the CMOS output type has switch output of voltage at both H (High) and L (Low). In comparison with this, the open type has switch output at only the L side. Although open type used in the present embodiment is the so-called open drain type, the open type may be the open collector type.

DLC2 terminals 203*i* and 303*i* are terminals of the second communication system, and are terminals for communication data output from the camera accessory (e.g., the first lens 100) to the camera body 10.

DCA terminals 203*j* and 303*j* are terminals of the third communication system, and are terminals for communication data for performing bidirectional communication between the camera body 10 and the camera accessory (e.g., the first lens 100).

CS terminals 203*k* and 303*k* are terminals of the third communication system, and are signal terminals for communication requests between the camera body 10 and camera accessory (e.g., the first lens 100). In the present embodiment, in a case where the first lens 100 is mounted to the camera body 10, the communication voltage at the corresponding terminals in the first through third communication systems is 3.0 V.

(Configuration of Camera Mount and Accessory Mount)

The configuration of the camera mount 201 and the lens mount (accessory mount) 301 according to the present embodiment will be described with reference to FIGS. 2A through 3B. In the following description, the mount provided to the imaging apparatus side will be referred to as camera mount, and the mount provided to the lens unit side will be referred to as lens mount. Concerning mounts of the below-described conversion adapter, the side mounted to the imaging apparatus will be referred to as lens mount, and the side mounted to the lens unit will be referred to as camera mount. In the following description, a second conversion adapter 70 has a camera mount 1201 that is the same as the camera mount 201 provided on the camera body 10. In the following description, a first conversion adapter 40 has a lens mount 1301 that is the same as the lens mount 301 provided on the first lens 100.

Figure 2A:
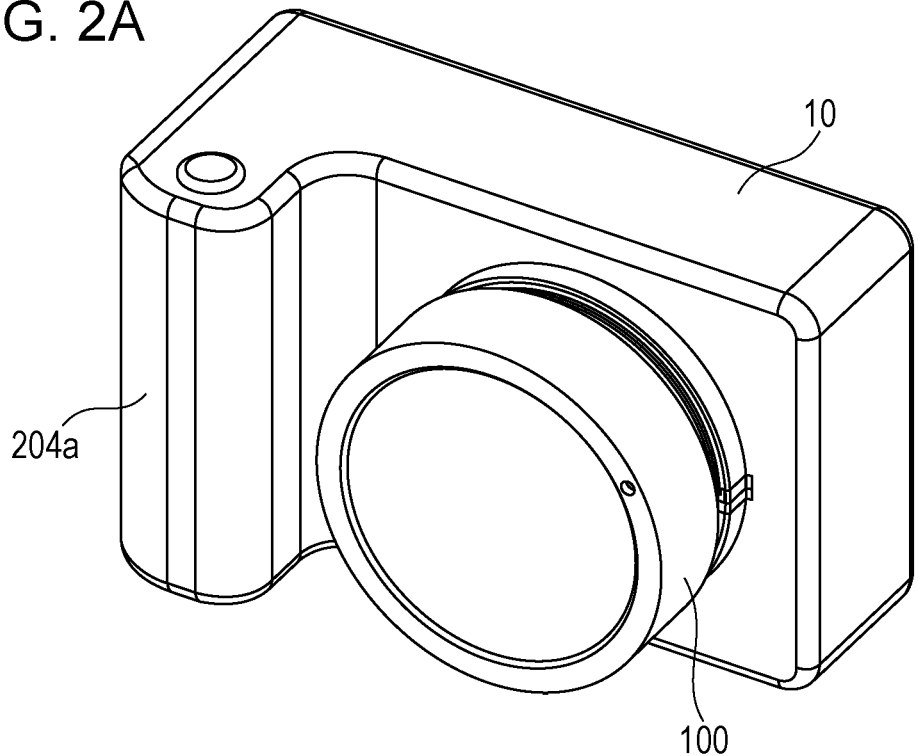
FIG. 2A is an external perspective view of a camera body 10 in a state where a first lens unit 100 is mounted to the camera body 10 according to an embodiment of the present invention.
Figure 2B:
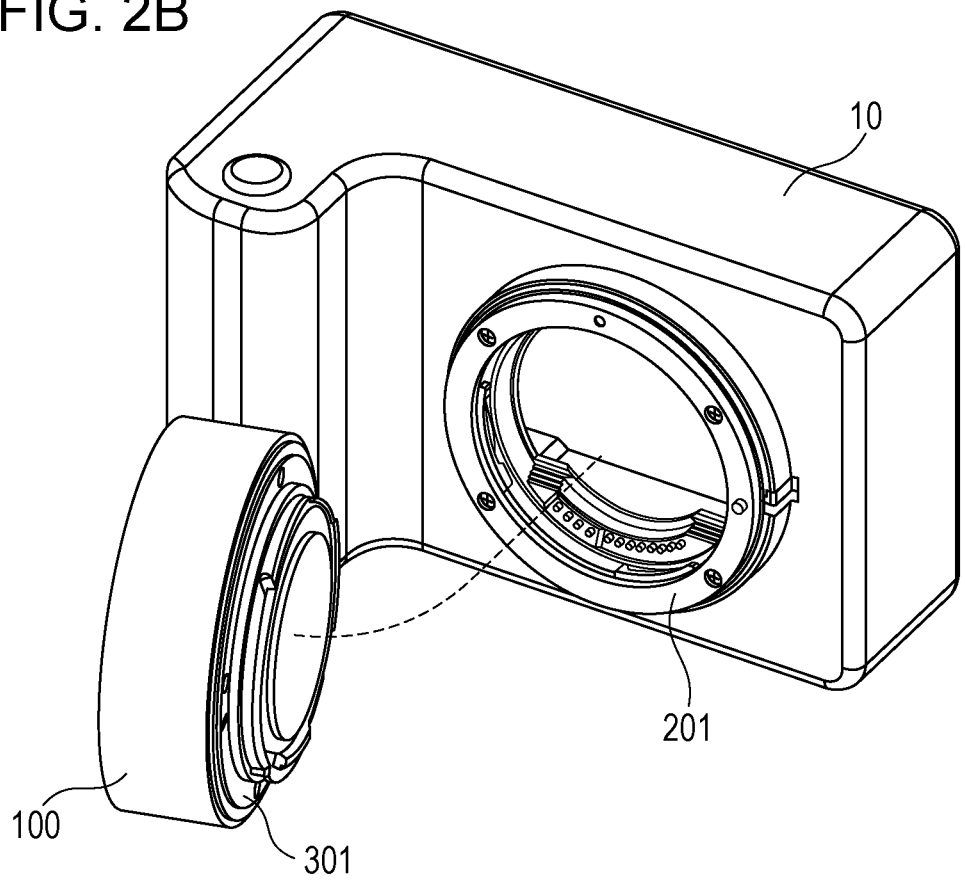
FIG. 2B is an external perspective view of a camera body 10 in a state where the first lens unit 100 is detached from the camera body 10 according to an embodiment of the present invention.

FIGS. 2A and 2B are external perspective views of the camera body 10 and first lens 100 according to the embodiment of the present invention. FIG. 2A illustrates a state in which the first lens 100 is mounted to the camera body 10, and FIG. 2B illustrates a state in which the first lens 100 has been removed from the camera body 10.

As illustrated in FIGS. 2A and 2B, the camera body 10 and first lens 100 have a ring-shaped camera mount 201 and ring-shaped lens mount 301, which each have contact faces that are parallel in a direction orthogonal to the optical axis. The camera mount 201 and the lens mount 301 do not necessarily have a ring shape, and the shape may be an arc-shape. For example, a part of the ring shaped contact face of the camera mount 201 illustrated in FIGS. 2A and 2B may be notched out. In the present embodiment, the center axis of the camera mount 201 and the center axis of the lens mount 301 are same as each optical axis of the camera mount 201 or lens mount 301. A configuration may be employed where the optical axis is different from the center axis. By rotating the camera body 10 and first lens 100 relative to each other, in a state where the reference faces of each of the camera mount 201 and lens mount 301 are in contact with each other, from an unlocked position to a locked position, the first lens 100 is mounted to the camera body 10. This will be described in detail below.

Figure 3A:
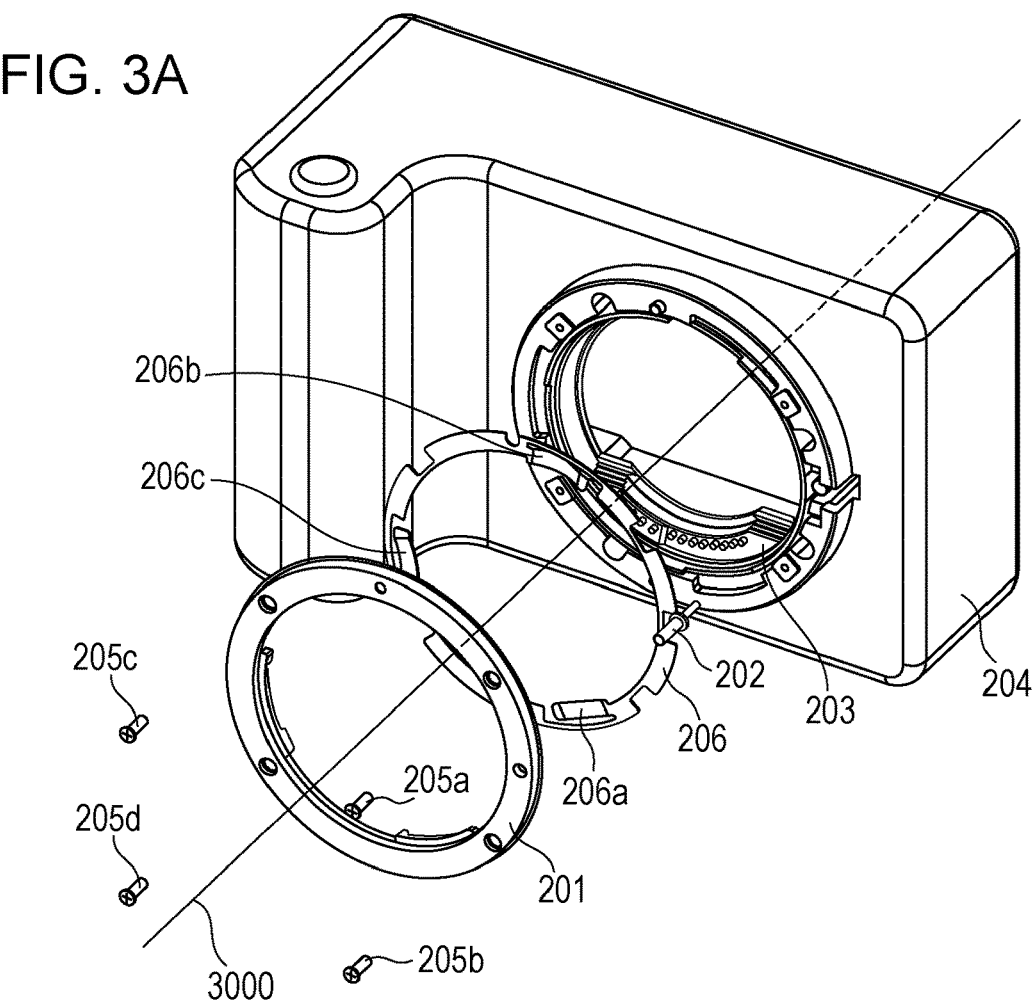
FIG. 3A is a disassembled perspective view of the camera body 10 according to an embodiment of the present invention.
Figure 3B:
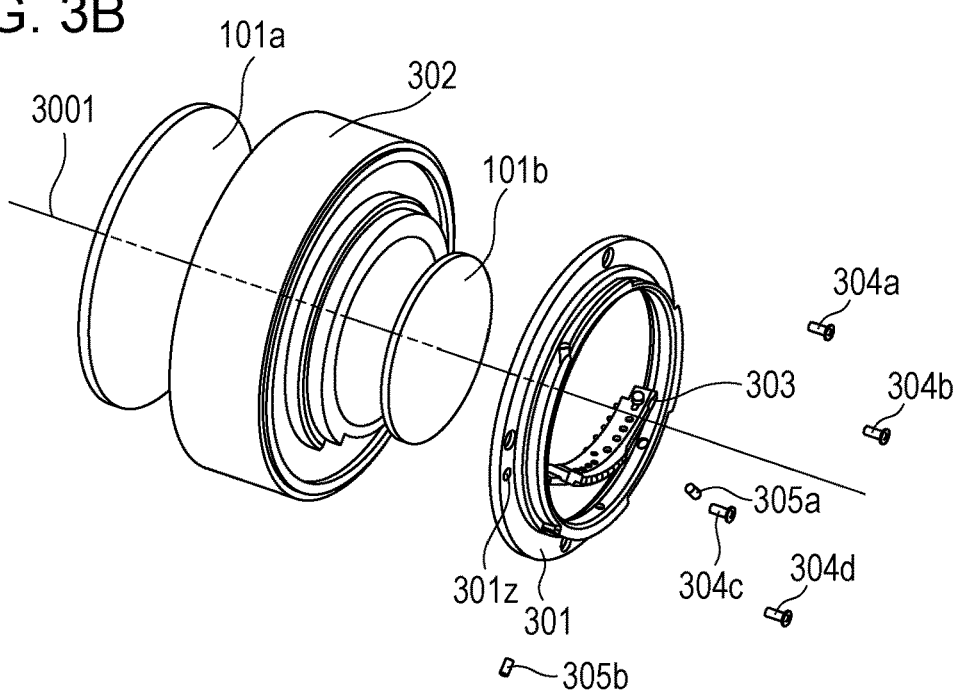
FIG. 3B is a disassembled perspective view of the first lens unit 100 according to an embodiment of the present invention.

FIG. 3 illustrates disassembled perspective views of the camera body 10 and first lens 100 according to the embodiment of the present invention. FIG. 3A illustrates a disassembled perspective view of the camera body 10, and FIG. 3B illustrates a disassembled perspective view of the first lens 100.

As illustrated in FIG. 3A, a first optical axis (a first center axis) 3000 indicates a light flux passing through the center of the camera mount 201 of the camera body 10. As illustrated in FIG. 3B, an optical axis 3001 is an axis for exemplarily describing a light flux representing an optical image of a subject guided by the first lens 100. When the first lens 100 is mounted to the camera body 10, the first optical axis 3000 and optical axis 3001 described above substantially match, and optical fluxes corresponding to these optical axes enter the imaging sensor 11 and are imaged, thereby imaging a subject image.

A lock pin 202 is a first restricting member (lock member) for restricting (locking) the mounted state of the camera body 10 and camera accessory as illustrated in FIG. 3A. The lock pin 202 is capable of advancing and retreating in a direction parallel to the first optical axis 3000. Specifically, when the first lens 100 is mounted to the camera body 10, the lock pin 202 enters a lock groove 301*z* a second restricting member provided to the lens mount 301, and locks the state of the first lens 100 being mounted to the camera body 10. The lock pin 202 is retracted from the lock groove 301*z* by the user operating a lock disengaging member (not illustrated) connected to the lock pin 202, thereby the locking of the first lens 100 mounted to the camera body 10 can be disengaged. Even in a case of further rotating the first lens 100 and camera body 10 relative to each other in the mounting direction with the lock disengaging member operated, rotation beyond a lock abutting face 301*y* is restricted (see FIG. 7A).

The contact holding member 203 is a holding unit for holding below-described (see FIG. 8) multiple contact pins (electrical communication contact group) 203*a* through 203*k* and 203*m*, provided on the camera body 10 side. In the present embodiment, the contact pins and contact faces corresponding to the above-described terminals are denoted by the same part numerals as the terminals for the sake of description.

A camera body member 204 is a camera housing that holds the members of the camera body 10. Specifically, the above-described camera mount 201 and contact holding member 203 are fastened to the camera body member 204 by camera mount fastening screws 205a through 205d and contact holding member fastening screws that are not illustrated. Camera mount fastening screws 205a through 205d are positioned where none of multiple leaf springs 206a, 206b, and 206c are positioned in the camera mount 201. The camera mount fastening screws 205a through 205d are exposed at the contact face of the camera mount 201, the contact face being contacted with the lens mount 301. Although the camera body member 204 holds an unillustrated imaging unit to which the aforementioned imaging sensor 11 is mounted and an unillustrated shutter unit, description will be omitted.

A lens mount biasing member 206 is a biasing unit at the imaging apparatus side to pull lens claws 301d and 301e, which are multiple bayonet claws provided to the below-described lens mount 301, toward the camera mount 201 side. Specifically, the lens mount biasing member 206 includes multiple leaf springs 206a, 206b, and 206c, and the bayonet claws provided to the first lens 100 are biased in the optical axis direction by the leaf springs. The lens mount biasing member 206 is held by both the camera mount 201 and camera body member 204 in a space formed therebetween.

A front lens 101a and rear lens 101b are optical members making up the photography lens group 101, as illustrated in FIG. 3B. While the photography lens group 101 has multiple lenses, only the front lens 101a disposed at the subject-side end and the rear lens 101b disposed at the camera body 10 side end are illustrated in the present embodiment to simplify description.

A lens barrel 302 is a holding member that holds the photography lens group 101. The lens mount 301 is fastened to the lens barrel 302 by lens mount fastening screws 304a through 304d. The lens mount fastening screws 304a through 304d are exposed at the contact face of the lens mount 301, the contact face being contacted with the camera mount 201.

A contact face holding member 303 is a holding unit for holding multiple contact faces (electrical communication contact group) 303a through 303k and 303m provided to a below-described (see FIG. 9) first lens 100 side. The contact face holding member 303 is fastened to the lens mount 301 by lens contact portion holding portion fastening screws 305a and 305b.

(Configuration of Bayonet Claws at Camera Body 10 Side)

Figure 4A:
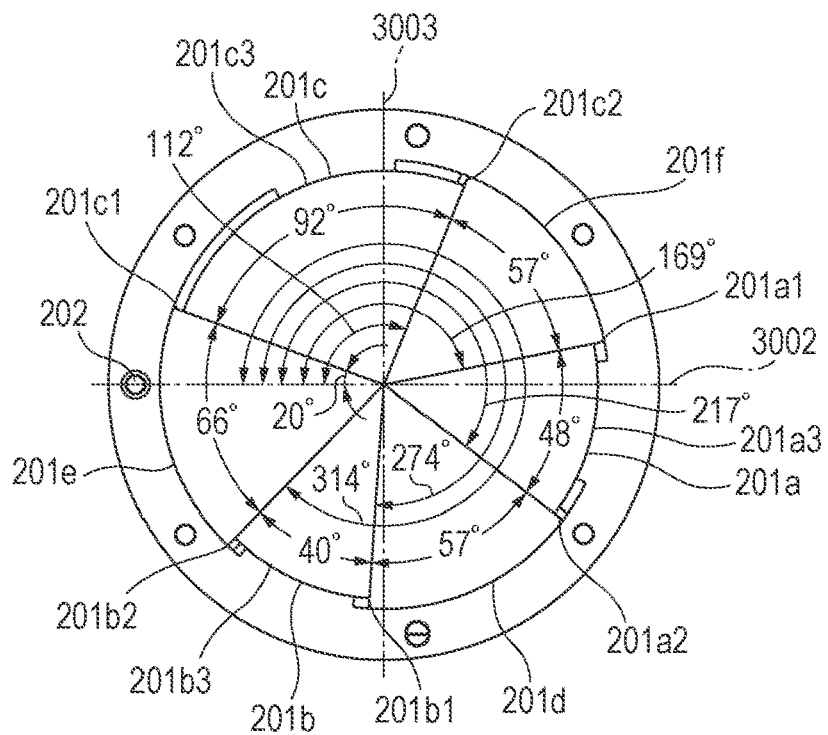
FIG. 4A is a diagram exemplarily describing angle ranges that camera mount claws and camera mount recesses having a lock pin 202 as a reference occupy in a case of viewing the camera mount 201 according to an embodiment of the present invention from the photographer side (rear face side of the camera body 10) of the camera body 10.
Figure 4B:
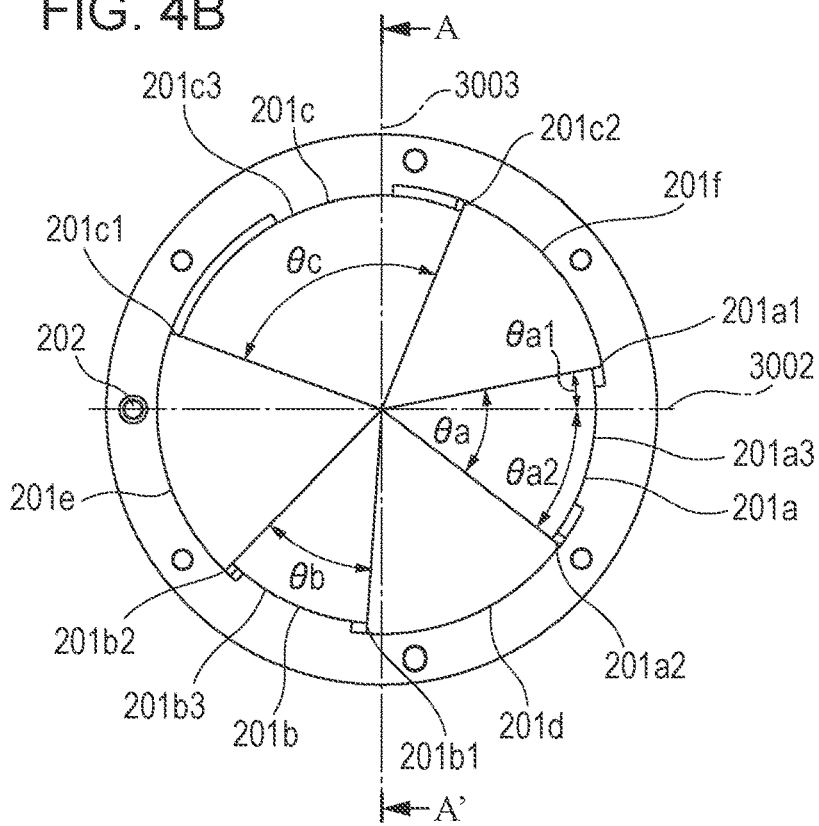
FIG. 4B is a diagram exemplarily describing angle ranges that a plurality of camera claws 201a to 201c occupies in a case of viewing the camera mount 201 according to an embodiment of the present invention from the photographer side (rear face side of the camera body 10) of the camera body 10.
Figure 4C:
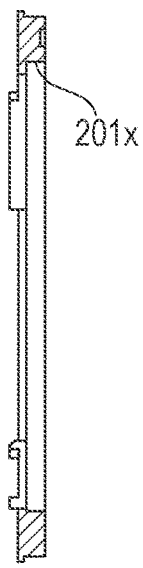
FIG. 4C is a cross-sectional diagram taken along a cross-section A-A' illustrated in FIG. 4B.

Next, the multiple bayonet claws provided to the camera mount 201 at the camera body 10 side will be described with reference to FIGS. 4 through 6. FIG. 4 illustrates diagrams exemplarily describing a case of viewing the camera mount 201 according to the embodiment of the present invention from the photographer side (rear face side of the camera body 10) of the camera body 10. FIG. 4A is a diagram illustrating angle ranges that camera mount claws (hereinafter referred to simply as camera claws) and camera mount recesses (hereinafter referred to simply as camera recesses) having the lock pin 202 as a reference occupy in the circumferential direction of the camera mount 201. The camera recesses of the camera mount 201 are notch portions between adjacent claws. Camera recesses of the mount are therefore formed further toward the outside in the radial direction with respect to the center axis of the mount than the claws of the camera mount 201. Lens recesses of the lens mount 301 are formed further toward the inside in the radial direction with respect to the center axis (parallel to the optical axis) of the mount than the lens claws. FIG. 4B is a diagram illustrating angle ranges that multiple camera claws 201a through 201c occupy in the circumferential direction of the camera mount 201. FIG. 4C is a cross-sectional diagram taken along a cross-section A-A' illustrated in FIG. 4B.

In the following description, protrusions protruding from recesses in the inner radial direction at the camera mount side will be referred to as camera claws, and protrusions protruding from recesses in the outer diameter direction at the below-described lens mount (accessory mount) side will be referred to as lens mount claws.

In the following description, the side of the camera mount 201 as viewed from the side of the photographer (rear face of the camera body 10) of the camera body 10 will be referred to as rear face side, and the opposite side will be referred to as front face side (or camera accessory side). It should be noted that in the following description, description will be made with a case of viewing the camera mount 201 from the rear face side as a reference, but in a case of viewing the camera mount 201 from the front face side, angles and directions in the following description stipulating angles (clockwise, etc.) will be reversed.

As illustrated in FIGS. 4A and 4B, a first camera claw 201a, second camera claw 201b, and third camera claw 201c are provided in order to the camera mount 201 in the circumferential direction (inner radial direction). When viewing the camera mount 201 from the rear face side as illustrated in FIG. 4, the camera claw provided at a position farthest from the lock pin 202 is the first camera claw 201a. The second camera claw 201b and third camera claw 201c are consecutively provided in order from the first camera claw 201a in a clockwise direction.

Recesses, which are a first camera recess 201d, second camera recess 201e, and third camera recess 201f, are provided in order to the camera mount 201 in the circumferential direction (inner radial direction). When viewing the camera mount 201 from the rear face side as illustrated in FIG. 4, the recess that is provided at a position nearest to the lock pin 202 is the second camera recess 201e. The third camera recess 201f and first camera recess 201d are consecutively provided in order from the second camera recess 201e in a clockwise direction.

As illustrated in FIG. 4C, a fitting member 201x, which restricts movement of the camera accessory in a direction parallel to the optical axis when the camera accessory is mounted, is provided to the camera mount 201 side in the circumferential direction. In the present embodiment, the diameter (i.e., the inner diameter of the fitting member 201x) in a direction orthogonal to the optical axis (approximately the same as the center axis) of the fitting member 201x at the camera mount 201 side is the mount diameter.

To mount the first lens 100 to the camera body 10, the camera claws of the camera body 10 are first inserted into the lens mount recesses of the first lens 100, and the lens mount claws at the first lens 100 side are inserted into the camera recesses at the camera body 10 side. This state is a mounting start state (first state). In the following description, accessory mount recesses will be referred to simply as accessory recesses, and accessory mount claws will be reference to simply as accessory claws. For example, in the case of the lens mount 301, this will be lens recesses and lens claws.

The camera mount 201 and lens mount 301 are then rotated relative to each other from the mounting start state, whereby the camera claws and lens claws engage in the radial direction orthogonal to the optical axis, and transition to a state where the lens claws are biased by the above-described lens mount biasing member 206. In this state, relative positional relation between the camera body 10 and the first lens 100 transitions to a locked position where the lock pin 202 has fit into the lock groove 301z as described above. This state is a mounting complete state (second state). In the mounting complete state, contact of corresponding terminals at the camera mount 201 and lens mount 301 is complete.

As described above, the camera claws and accessory claws are so-called bayonet claws, and as described above, have shapes such that the first lens 100 can be mounted (can be coupled) to the camera body 10 by the so-called bayonet coupling method by engaging of the camera claws and accessory claws.

For the description, the end portions of the camera claws 201a, 201b, and 201c, in the circumferential direction, will be referred to as first end portion 201a1, second end portion 201a2, third end portion 201b1, fourth end portion 201b2, fifth end portion 201c1, and sixth end portion 201c2, respectively. Each of the end portions are denoted with part numerals in order from the first camera claw 201a in the clockwise direction, when viewing the camera mount 201 from the rear face side, as described above. The camera claws 201a, 201b, and 201c include first, second, and third leaf spring disposition portions 201a3, 201b3, and 201c3 in which the above-described plurality of leaf springs 206a, 206b, and 206c of the lens mount biasing member 206 are disposed, respectively. In the present embodiment, the first, second, and third leaf spring disposition portions 201a3, 201b3, and 201c3 each correspond to the notch portions provided between the above-described end portions of each camera claw. The size of the notch portions is a size at which each of the plurality of leaf springs can be arranged For example, the first leaf spring disposition portions 201a3 is a notch (separation portion) provided in the camera claw 201a between the first end portion 201a1 and the second end portion 201a2 of the camera claw 201a.

As illustrated in FIG. 4A, the angles (angle ranges) that the camera claws and camera recesses occupy in the circumferential direction of the camera mount 201 are stipulated as follows in the present embodiment. For the first camera claw 201a, the angle θa=48°. For the second camera claw 201b, the angle θb=40°. For the third camera claw 201c, the angle θc=92°. Further, for the first camera recess 201d, the angle is 57°. For the second camera recess 201e, the angle is 66°. For the third camera recess 201f, the angle is 57°. In here, the angle range of the claw (bayonet claw) and the recess indicates an angle range in which each bayonet claw and the recess (notch portion) the bayonet claw can be inserted occupy in each mount. For example, if the camera mount 201 has a ring shape, the angle range occupied by the first camera claw 201a with respect to the entire camera mount 201 (360°) becomes 40°. Even in a case where the mount does not have a complete ring shape, the mount may be considered ring-shaped (360°) to define the angular range of the claws and recesses.

When viewing the camera claws from the rear face side of the camera body 10, the angles in the clockwise direction where the camera claws are disposed in the circumferential direction of the camera mount 201 with the position (referred to as reference position) of the lock pin 202 as a reference are stipulated as follows. The first camera claw 201a is disposed between 169° and 217° with the reference position as a start point. The second camera claw 201b is disposed between 274° and 314° with the reference position as a start point. The third camera claw 201c is disposed between 20° and 112° with the reference position as a start point.

When viewing the camera mount 201 from the optical axis direction in the present embodiment, of the multiple bayonet claws, the third camera claw 201c overlaps a first camera mount center line 3003 that extends in the vertical direction from the center axis, which is parallel to the optical axis, of the camera mount 201 in the radial direction of the camera mount 201. The first camera mount center line 3003 is a line that, in a normal position of the camera body 10 where the lock pin 202 is situated at the left side when viewing the camera mount 201 from the front face side, extends in the gravitational direction and the opposite direction from the gravitational direction, from the center (optical axis) of the camera mount 201. That is to say, the first camera mount center line 3003 is a vertical line that passes through the optical axis in a normal position of the camera. In other words, the first camera mount center line 3003 is a vertical line that passes though the center of the camera mount 201 and orthogonal to the center axis of the camera mount 201 when the camera body 10 is placed on a horizontal plane.

In contrast, a line that, in a vertical position of the camera body 10 where the lock pin 202 is situated at the top side when viewing the camera mount 201 from the front face side, extends in the gravitational direction and the opposite direction from the gravitational direction, from the center (optical axis) of the camera mount 201, is a second camera mount center line 3002. That is to say, the second lens mount center line 3002 is a horizontal line that passes through the optical axis when the camera body 10 is in the normal position.

The second camera mount center line 3002 overlaps the lock pin 202 and first camera claw 201a in the radial direction of the camera mount 201. The first camera mount center line 3003 and the second camera mount center line 3002 are substantially orthogonal.

Figure 5A:
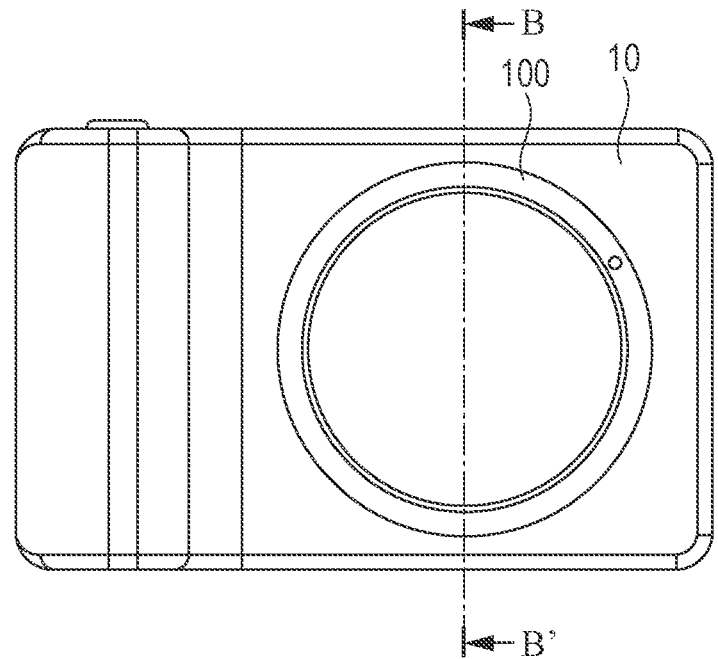
FIG. 5A is a diagram exemplarily describing engagement by camera claws at a normal position of the camera body 10 according to an embodiment of the present invention in a state where the first lens unit 100 is mounted to the camera body 10.
Figure 5B:
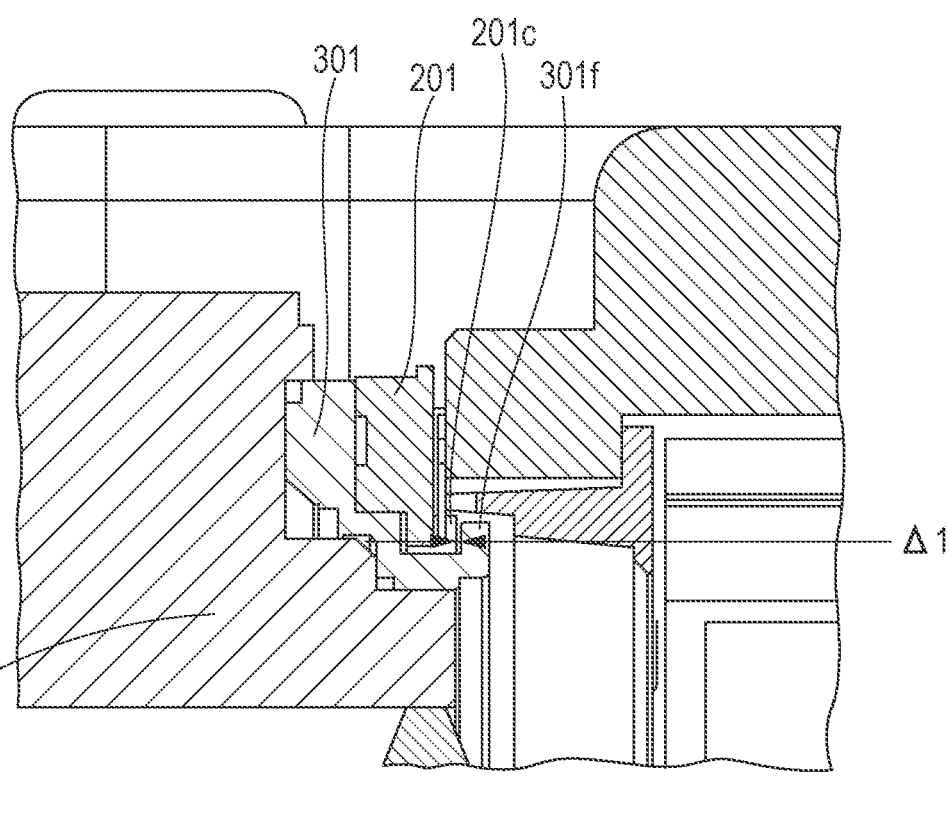
FIG. 5B is a partial cross-sectional view of the camera body 10 and the first lens 100 taken along a cross-section B-B' illustrated in FIG. 5A.

FIG. 5 illustrates diagrams exemplarily describing engagement of the camera body 10 and first lens 100 by camera claws at a normal position of the camera body 10 according to the embodiment of the present invention. FIG. 5A is a diagram illustrating a state where the first lens 100 is mounted to the camera body 10, when viewing from the front face side. FIG. 5B is a partial cross-sectional view of the camera body 10 and first lens 100 taken along a cross-section B-B' illustrated in FIG. 5A. In FIG. 5, the camera body 10 is positioned in the above-described normal position, and, in this state, a camera grip 204a provided to the camera body member 204 is situated to the left side when viewing the camera body 10 from the front face side.

Figure 6A:
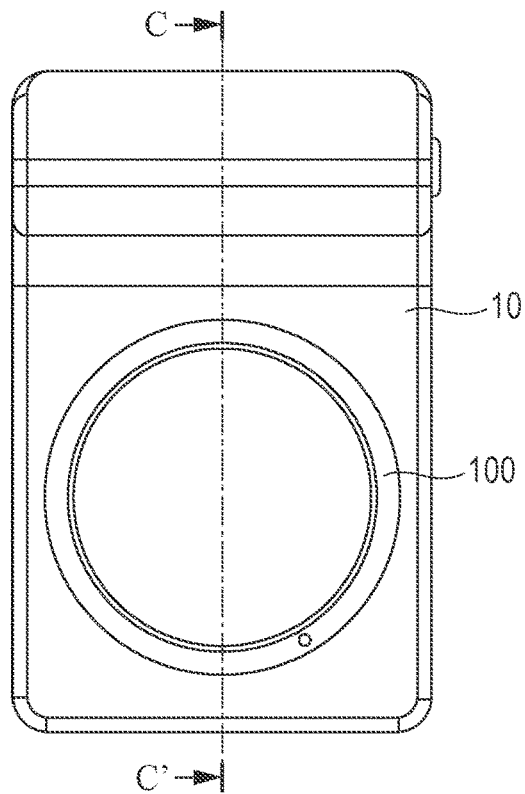
FIG. 6A is a diagram exemplarily describing engagement by lens claws at a vertical position of the camera body 10 according to an embodiment of the present invention in a state where the first lens unit 100 is mounted to the camera body 10.
Figure 6B:
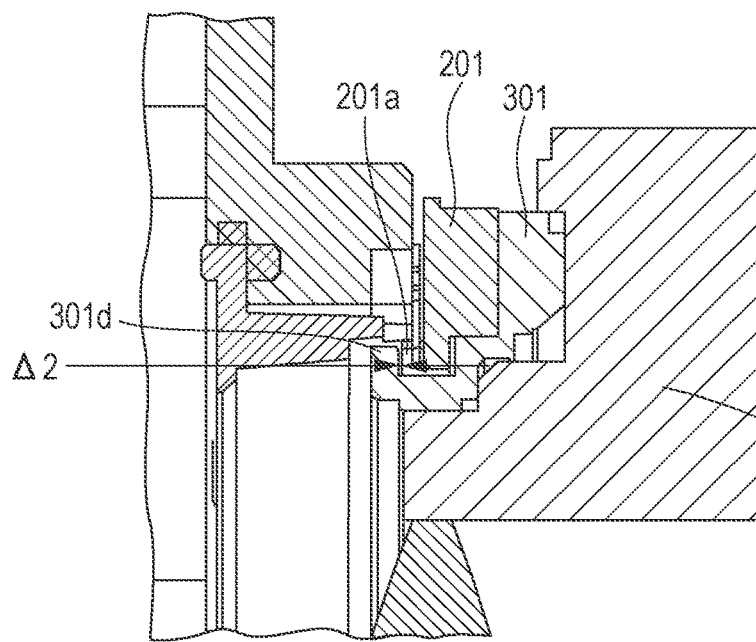
FIG. 6B is a partial cross-sectional view of the camera body 10 and first lens 100 taken along a cross-section C-C' illustrated in FIG. 6A.

FIG. 6 illustrates diagrams exemplarily describing engagement of the camera body 10 and first lens 100 by bayonet claws at a vertical position of the camera body 10 according to the embodiment of the present invention. FIG. 6A is a diagram illustrating a state where the first lens 100 is mounted to the camera body 10, when viewing from the front face side. FIG. 6B is a partial cross-sectional view of the camera body 10 and first lens 100 taken along a cross-section C-C' illustrated in FIG. 6A. In FIG. 6, the camera body 10 is positioned in the above-described vertical position, and the camera grip 204a in this state is situated to the top side when viewing the camera body 10 from the front face side.

In general, in a case of mounting an interchangeable lens to a camera, a gap occurs between the camera and interchangeable lens in a direction orthogonal to the optical axis, due to dimensional tolerance of the two, and looseness of the lens as to the camera increases due to this gap. Particularly, in a case of coupling a camera and interchangeable lens by bayonet coupling, the above-described looseness of the lens becomes greater the farther away from positions where the bayonet claws engage each other in the circumferential direction of the lens. Further, the looseness (bowing) in the gravitational direction of the interchangeable lens as to the camera becomes greater due to the weight of the interchangeable lens itself. Thus, if a subject is imaged in a case where the looseness of the interchangeable lens as to the camera is great, an unnatural image may be obtained, which is unintended by the user, due to the deviation of optical axis of the camera and optical axis of the lens.

In the present embodiment, the third camera claw 201c, which has the widest angle of the camera-side bayonet claws, overlaps the first camera mount center line 3003 in the radial direction of the camera mount 201, as illustrated in FIG. 5B. According to this configuration, when the first lens 100 is mounted to the camera body 10, the first camera mount center line 3003 overlaps the position where the third camera claw 201c and a later-described third lens claw 301f are engaged. In this case, looseness (bowing) of the camera accessory, such as the first lens 100 mounted to the camera body 10, in the gravitational direction can be suppressed in the normal position of which the frequency of usage is highest for operating the imaging apparatus, for example. Due to the above-described configuration, the gap 41 illustrated in FIG. 5B can be kept from becoming large, so looseness of the first lens 100 as to the camera body 10 in the direction indicated by the arrow illustrated in FIG. 5B can be suppressed.

In the present embodiment, the first camera claw 201a overlaps the second camera mount center line 3002 in the radial direction of the camera mount 201, as illustrated in FIG. 6B. According to this configuration, when the first lens 100 is mounted to the camera body 10, the second camera mount center line 3002 overlaps the position where the first camera claw 201a and a later-described first lens claw 301d are engaged. In this case, for example, looseness (bowing) of the camera accessory, such as the first lens 100 mounted to the camera body 10, in the gravitational direction can be suppressed even in the vertical position of the imaging apparatus. Due to the above-described configuration, since the gap 42 illustrated in FIG. 6B can be kept from becoming large, looseness of the first lens 100 as to the camera body 10 in the direction indicated by the arrow illustrated in FIG. 6B can be suppressed.

As illustrated in FIG. 4B, the angle of the third camera claw 201c in the circumferential direction of the camera mount 201, situated at the top side in a case where the camera body 10 is at the normal position, is greater than the sum of angles of the first claw 201a and second claw 201b situated at the lower side. More precisely, the total sum of angles in the circumferential direction of the camera claws provided to the camera mount 201 is greater at the upper side of the second camera mount center line as a reference as compared to the lower side. Specifically, the sum of angle $\theta c$ and the angle $\theta a1$ of the first camera claw 201a on the upper side of the second camera mount center line 3002 is larger than the sum of angle $\theta b$ and the angle $\theta a2$ of the first camera claw 201a on the lower side of the second camera mount center line 3002. That is to say, the layout of the camera claws and recesses is determined to satisfy the two following expressions:

$$\theta c \geq \theta a + \theta b \quad (1), \text{ and}$$

$$\theta a1 + \theta c > \theta a2 + \theta b \quad (2).$$

According to this configuration, in the normal position of the camera body 10 regarding which the frequency of usage is highest, the strength of camera claws at the upper side (opposite side from the gravitational direction) of the second camera mount center line 3002 that indicates the horizontal direction of the camera mount 201 can be made to be greater than the strength of the camera claws at the lower side (gravitational direction). Thus, in the normal position of the camera body 10 regarding which the frequency of usage is highest in a state where the first lens 100 is mounted, the camera body 10 according to the present embodiment can reduce looseness (bowing) of the first lens 100 as to the camera body 10 in the gravitational direction. According to the camera body 10 of the present embodiment, in the normal position of the camera body 10 regarding which the frequency of usage is highest in a state where the first lens 100 is mounted, deformation of camera claws and lens claws due to the weight of the first lens 100 itself can be suppressed.

(Configuration of Bayonet Claws at First Lens 100 Side)

Figure 7A:
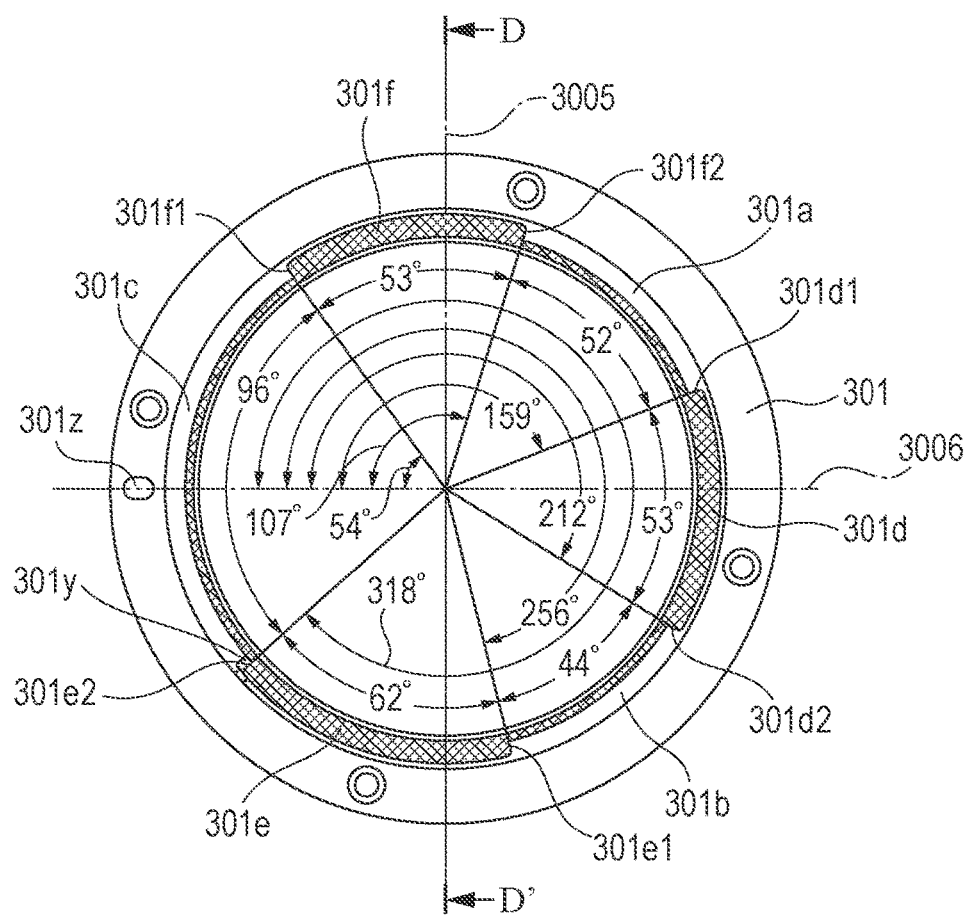
FIG. 7A is a diagram exemplarily describing angles of the claws and recesses in a circumferential direction at a lens mount 301 side in a case of viewing a lens mount 301 according to an embodiment of the present invention from the rear face side (side where the camera body is mounted) in a state where the first lens unit 100 is mounted to the camera body 10.
Figure 7B:
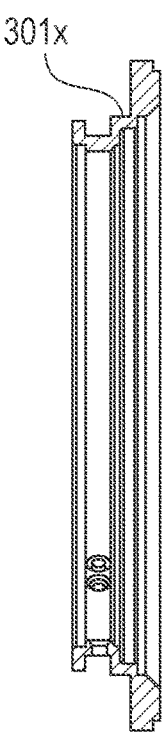
FIG. 7B is a cross-sectional view taken along a cross-section D-D' illustrated in FIG. 7A.

Next, multiple lens claws (accessory claws) provided to the lens mount 301 at the first lens 100 side will be described with reference to FIG. 7. FIG. 7 is a diagram exemplarily describing a case of viewing the lens mount 301 according to the embodiment of the present invention from the rear face side (side where the camera body 10 is attached) in a state where the first lens 100 is mounted to the camera body 10. FIG. 7A exemplarily describes angles of the claws and recesses in the circumferential direction at the lens mount 301 side. FIG. 7B is a cross-sectional view taken along a cross-section D-D' illustrated in FIG. 7A. In the following description, the camera body 10 is positioned in the normal position in the state illustrated in FIG. 7.

As illustrated in FIG. 7A, a first lens claw 301d, second lens claw 301e, and third lens claw 301f are provided in order to the lens mount 301 in the circumferential direction (inner radial direction). When viewing the lens mount 301 from the rear face side as illustrated in FIG. 7A, the lens claw provided at a position farthest from the lock groove 301z is the first lens claw 301d. The second lens claw 301e and third lens claw 301f are consecutively provided in order from the first lens claw 301d in a clockwise direction.

Recesses, which are a first lens recess 301a, second lens recess 301b, and third lens recess 301c, are provided in order, to the lens mount 301 in the circumferential direction (inner radial direction). When viewing the lens mount 301 from the rear face side, the recess provided at a position nearest to the lock groove 301z is the third lens recess 301c as illustrated in FIG. 7. The first lens recess 301a and second lens recess 301b are then consecutively provided in order from the third lens recess 301c in a clockwise direction.

As illustrated in FIG. 7B, a fitting member 301x, which restricts movement in a direction parallel to the optical axis of the imaging apparatus when mounted on the imaging apparatus, is provided to the lens mount 301 side in the circumferential direction. In the present embodiment, the diameter (i.e., the inner diameter of the fitting member 301x) in a direction orthogonal to the optical axis (approximately the same as the center axis) of the fitting member 301x at the lens mount 301 side is the mount diameter.

For the sake of description, the end portions of the lens claws 301d, 301e, and 301f, in the circumferential direction, will be referred to as first end portion 301d1, second end portion 301d2, third end portion 301e1, fourth end portion 301e2, fifth end portion 301f1, and sixth end portion 301f2. The end portions are denoted with part numerals in order from the first lens claw 301d in the clockwise direction, when viewing the lens mount 301 from the rear face side, as described above.

As illustrated in FIG. 7, the angles (angle ranges) that the lens claws and lens recesses occupy in the circumferential direction of the lens mount 301 are stipulated as follows in the present embodiment. For the first lens claw 301d, the angle θd=53°. For the second lens claw 301e, the angle θe=62°. For the third lens claw 301f, the angle θf=53°. Further, for the first lens recess 301a, the angle is 52°. For the second lens recess 301b, the angle is 44°. For the third lens recess 301c, the angle is 96°.

When viewing the lens claws from the rear face side, the angles where the lens claws are disposed in the circumferential direction of the lens mount 301 with the position (referred to as reference position) of the lock groove 301z as a reference in the clockwise direction are stipulated as follows. The first lens claw 301d is disposed between 159° and 212° with the reference position as a start point. The second lens claw 301e is disposed between 256° and 318° with the reference position as a start point. The third lens claw 301f is disposed between 54° and 107° with the reference position as a start point.

When viewing the lens mount 301 from the optical axis direction in the present embodiment, of the multiple bayonet claws, the second lens claw 301e overlaps a first lens mount center line 3005 that extends in the vertical direction of the lens mount 301, in the radial direction of the lens mount 301. When viewing the lens mount 301 from the rear face side and front face side in the present embodiment, of the multiple bayonet claws, the third lens claw 301f overlaps the first lens mount center line 3005 in the radial direction of the lens mount 301.

The first lens mount center line 3005 is a line that extends in the gravitational direction and the opposite direction from the gravitational direction, from the center (optical axis) of the camera mount 301, in a normal position of the camera body 10 to which the first lens 100 has been mounted. In other words, the first lens mount center line 3005 is a vertical line that passes through a center of the lens mount 301 and is orthogonal to the center axis of the lens mount 301 when the camera body 10 to which the first lens 100 is mounted is placed on a horizontal plane. In contrast, in a vertical position of the camera body 10 to which the first lens 100 has been mounted, a line that extends in the gravitational direction and the opposite direction from the gravitational direction, from the center (optical axis) of the camera mount 301, is a second lens mount center line 3006. This second lens mount center line 3006 overlaps the lock groove 301z and first lens claw 301d in the radial direction of the lens mount 301. The first lens mount center line 3005 and second lens mount center line 3006 are mutually orthogonal.

In the present embodiment, when the first lens 100 is mounted to the camera body 10, the second lens claw 301e and third lens claw 301f overlap the first lens mount center line 3005 in the radial direction of the lens mount 301, as illustrated in FIG. 7. According to this configuration, the first lens mount center line 3005 overlaps two positions of engaging positions between lens claws and camera claws, when the first lens 100 is mounted to the camera body 10. In this case, for example, in the normal position of the camera body 10 regarding which the frequency of usage is highest, looseness (bowing) of the first lens 100 mounted to the camera body 10 in the gravitational direction can be reduced. In a case where the first lens 100 is mounted to the camera body 10, the third leaf spring arrangement portion 201c3 described above in FIGS. 4A and 4B overlaps with the first lens mount center line 3005 in the radial direction of the lens mount 301. Specifically, in the case where the first lens 100 is mounted to the camera body 10, the region where the third lens claw 301f is biased by the leaf spring 206c overlaps with the first lens mount center line 3005, and thus the rattling of the first lens 100 can be suppressed more effectively.

In the present embodiment, when the first lens 100 is mounted to the camera body 10, the first lens claw 301d overlaps the second lens mount center line 3006 in the radial direction of the lens mount 301, as illustrated in FIG. 7A. According to this configuration, when the first lens 100 is mounted to the camera body 10, the second lens mount center line 3006 overlaps the position where the first lens claw 301d and the first camera claw 201a engage. In this case for example, even in the vertical position of the imaging apparatus, looseness (bowing) of the first lens 100 mounted to the camera body 10 in the gravitational direction can be reduced. In a case where the first lens 100 is mounted to the camera body 10, the first leaf spring arrangement portion 201a3 described above in FIGS. 4A and 4B overlaps with the second lens mount center line 3006 in the radial direction of the lens mount 301. Specifically, in the case where the first lens 100 is mounted to the camera body 10, the region where the first lens claw 301d is biased by the leaf spring 206a overlaps with the first lens mount center line 3006, and thus the rattling of the first lens 100 can be suppressed more effectively.

In a state where the first lens 100 is mounted to the camera body 10, the second camera mount center line 3002 and second lens mount center line 3006 overlap a lock region where the lock pin 202 and lock groove 301z are fit, as described above. According to this configuration, in the vertical position of the camera body 10, the engaging position of the first camera claw 201a and first lens claw 301d and the above-described lock region overlap the mount center lines extending in the gravitational direction and the opposite direction thereof. According to this configuration, in the vertical position of the imaging apparatus, for example, looseness (bowing) of the first lens 100 mounted to the camera body 10 in the gravitational direction can be suppressed even more effectively.

(Configuration of Contact Pins in Camera Body 10)

Figure 8A:
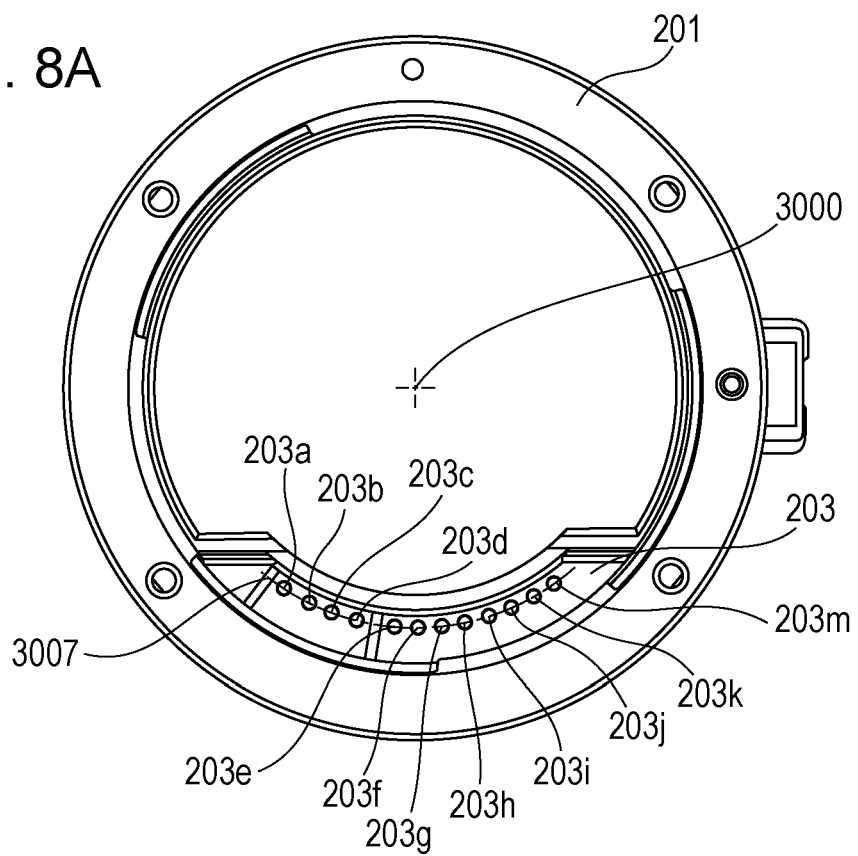
FIG. 8A is an external perspective view of the camera mount 201 according to an embodiment of the present invention as viewed from the front face side (subject side).
Figure 8B:
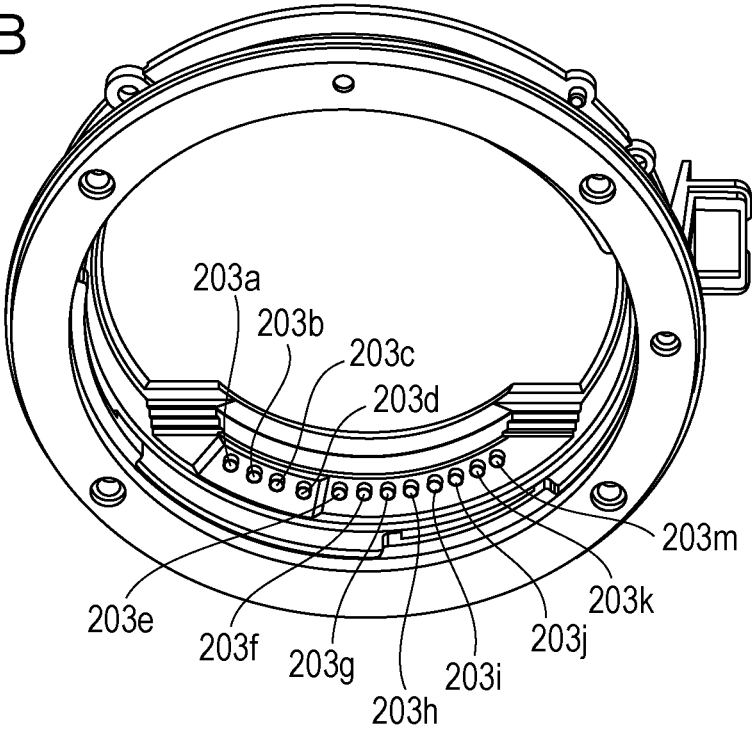
FIG. 8B is an external perspective view of the camera mount 201 according to an embodiment of the present invention as viewed from above.

The configuration of the contact pins provided to the camera body 10 side will be described with reference to FIG. 8 below. FIG. 8 illustrates external perspective views viewing a camera mount 201 according to the embodiment of the present invention from the front face side (subject side). FIG. 8A is an external view of the camera mount 201 from the optical axis direction. FIG. 8B is an external perspective view of the camera mount 201 from above.

The contact holding member 203, and contact pins 203a through 203k and 203m held by the contact holding member 203 are disposed following the circumferential direction of the camera mount 201 on the inner side of the camera mount 201, as illustrated in FIG. 8A. FIG. 8A illustrates an array line on which the contact points are disposed as an array line 3007.

The contact pins 203a through 203k and 203m are movable pins that can advance and retreat (protrude and retract) in a direction parallel to the optical axis 3000, and are biased from behind toward the first lens 100 side by leaf springs (not illustrated). As described above, the contact pins 203a through 203k and 203m have the functions of the above-described respective terminals, and the part numerals by which the contact pins are denoted are the same as those of the terminals, to facilitate description.

As illustrated in FIG. 8B, out of the contact pins 203a through 203k and 203m, the contact pins 203a, 203b, 203c, and 203d are higher in the direction (toward the front face) parallel to the optical axis 3000 as compared to the other contact pins. The above-described configuration is realized by differing the amount of protrusion from the contact holding member 203 in the optical axis direction in the present embodiment. Alternatively, a configuration may be employed where this is realized by differing the amount of protrusion of the contact pins from the contact holding member 203.

In general, in a case of employing the bayonet coupling method and attaching/detaching an interchangeable lens to/from a camera, the contact pins at the camera side and the contact face on the lens side slide over each other. For example, at the camera side, contact pins other than the contact pin situated at the edge in the rotational direction to complete mounting of the interchangeable lens slide over one or another contact face provided to the lens side. Thus, the more times the camera accessory is attached to and detached from the camera, the more the contact pins and contact faces are worn.

The greater the number of terminals there is, the more pronounced this problem is, and the number of times of sliding between contact pins and contact faces increases. Voltage drop increases due to the contact impedance of the terminals rising due to wearing of the contact pins and contact faces, and the interchangeable lens may malfunction, for example, due to the voltage dropping below the allowable voltage range for operation of the electric circuits.

To decrease the number of times of sliding of the contact pins, the contact height of the camera-side contact pins and the interchangeable-lens-side contact faces are differed in a direction parallel to the optical axis 3000, between an upper tier and a lower tier, in the present embodiment. Specifically, the contact holding member 203 has a step in a direction parallel to the optical axis 3000, with the contact pins 203a through 203d being provided to the upper tier, and the contact pins 203e through 203k and 203m being provided to the lower tier. The contact face holding member 303 also is stepped in a direction parallel to the optical axis 3001, with the contact faces 303a through 303d provided to the lower tier, and the contact faces 303e through 303k and 303m provided to the upper tier.

The upper tier of the contact holding member 203 at the camera mount 201 side is a tier protruding toward the front face side (subject side) of the camera body 10 namely the side the lens mount 301 is coupled when the first lens 100 is mounted to the camera body 10. The lower tier of the contact holding member 203 is a tier recessed toward the rear face side (imaging sensor 11 side) of the camera body 10. The upper tier of the contact face holding member 303 at the lens mount 301 side is a tier protruding toward the rear face side (imaging sensor 11 side) of the camera body 10 namely the side the camera mount 201 is coupled when the first lens 100 is mounted to the camera body 10. The lower tier of the contact face holding member 303 is a tier recessed to the front face side (subject side) of the camera body 10.

In a case where the lens mount 301 is mounted to the camera mount 201, the contact pins provided to the upper tier side of the contact holding member 203 and the contact faces provided to the lower tier side of the contact face holding member 303 are electrically in contact among corresponding terminals. In a case where the lens mount 301 is mounted to the camera mount 201, the contact pins provided to the lower tier side of the contact holding member 203 and the contact faces provided to the upper tier side of the contact face holding member 303 are electrically in contact among corresponding terminals. Thus, the steps at the camera mount 201 side and lens mount 301 side have a mutually engageable shape, and the contact pins at the camera side and contact faces at the lens side that are provided to different steps do not come into contact when mounting the lens mount 301 to the camera mount face A.

According to this configuration, the contact pins 203e through 203k and 203m do not come into contact with the contact faces 303a through 303d, when relatively rotating the first lens 100 as to the camera body 10 from the mounting start state to the mounting completed state. Even when relatively rotating the first lens 100 as to the camera body 10 from the mounting completed state to the mounting start state, the contact pins 203e through 203k and 203m do not come into contact with the contact faces 303a through 303d. That is to say, the number of times of sliding between contact pins and contact faces can be reduced on both the camera mount 201 side and lens mount 301 side.

The contact pins at the camera body 10 side and the contact faces at the first lens 100 side are all in a non-contact state in the mounting start state of the first lens 100 as to the camera body 10, and thereby short-circuiting among terminals before completion of mounting of the first lens 100 can be prevented.

(Configuration of Contact Faces in First Lens 100)

Figure 9A:
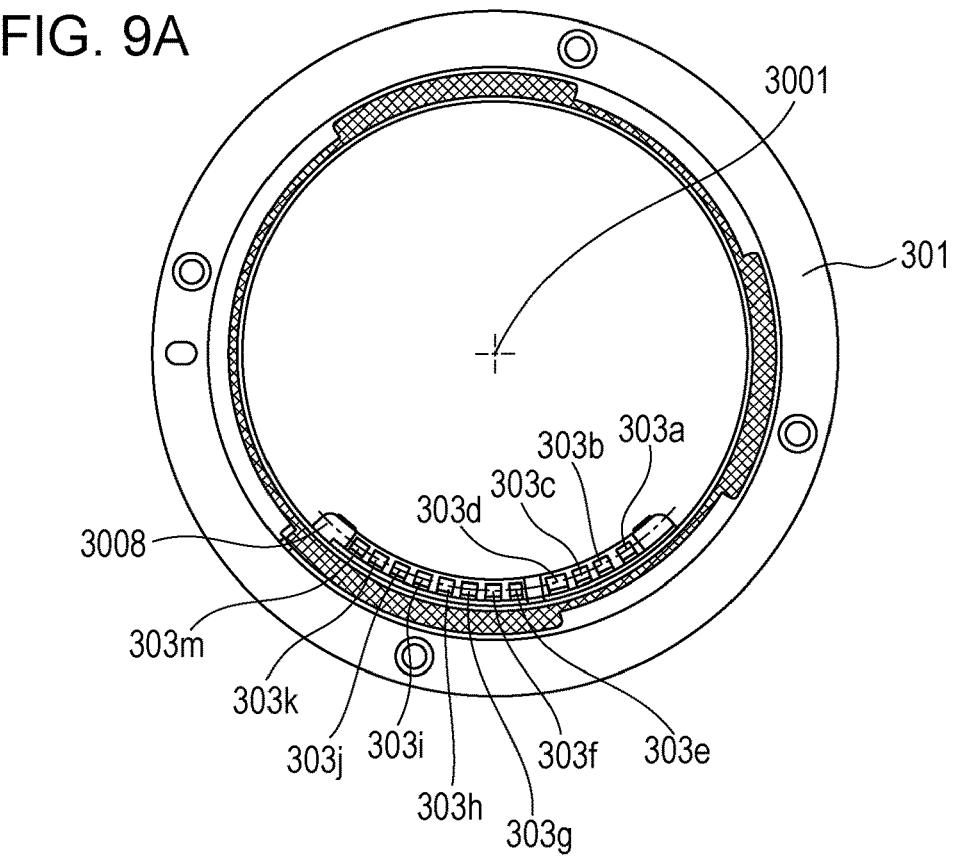
FIG. 9A is an external perspective view of the lens mount 301 according to an embodiment of the present invention as viewed from the side (rear face side) to which the camera mount 201 is mounted.
Figure 9B:
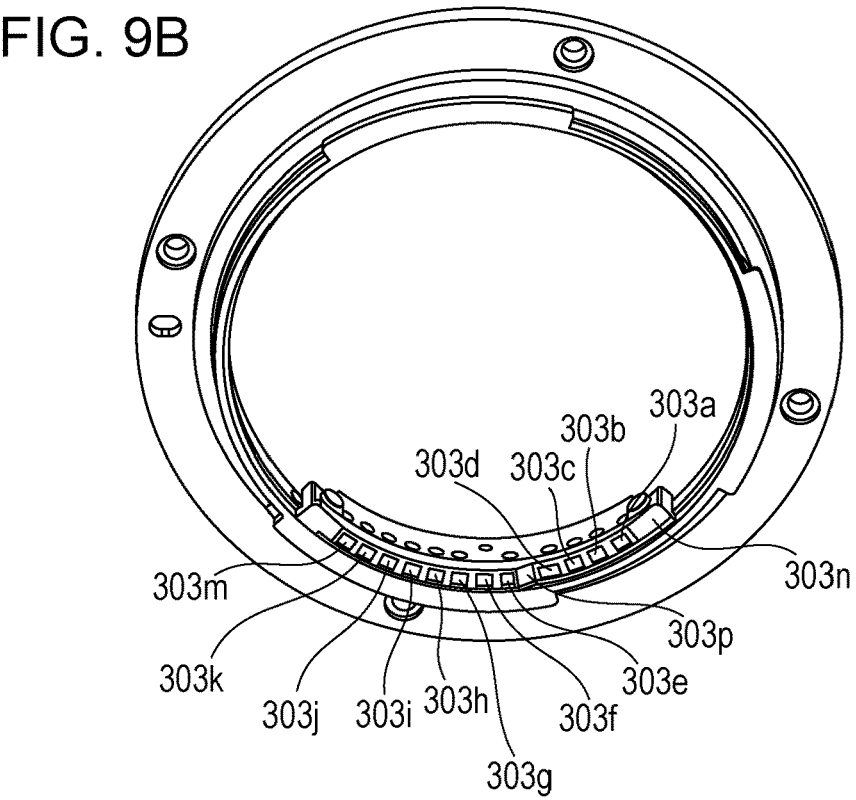
FIG. 9B is an external perspective view of the camera mount 301 according to an embodiment of the present invention as viewed from above.

The following is a description regarding the configuration of the contact faces provided to the first lens 100 side, with reference to FIG. 9. FIG. 9 illustrates external perspective views of the lens mount 301 according to the embodiment of the present invention, as viewed from the side (rear face side) to which the camera mount 201 is mounted. FIG. 9A is an external view of the lens mount 301 from the optical axis direction. FIG. 9B is an external perspective view of the lens mount 301 from above.

The contact face holding member 303, and contact faces 303a through 303k and 303m held by the contact face holding member 303 are disposed on the inner side of the lens mount 301, following the circumferential direction of the lens mount 301, as illustrated in FIG. 9A. An array line on which the contact points are disposed is illustrated in FIG. 9A as an array line 3008. As described above, the contact faces 303a through 303k and 303m have the functions of the above-described respective terminals, and the part numerals by which the contact faces are denoted are the same as those of the terminals, to facilitate description.

As illustrated in FIG. 9B, out of the contact faces 303a through 303k and 303m, the contact faces 303a, 303b, 303c, and 303d are lower in height in the direction parallel to the optical axis 3001 as compared to the other contact faces. In the present embodiment, the above-described configuration is realized by differing the amount of protrusion of the contact face holding member 303 in the optical axis direction.

According to the configuration described above, the contact faces 303a through 303d do not come into contact with the contact pins 203e through 203k and 203m, when relatively rotating the first lens 100 as to the camera body 10 from the mounting start state to the mounting completed state. Even when relatively rotating the first lens 100 as to the camera body 10 from the mounting completed state to the mounting start state, the contact faces 303*a* through 303*d* do not come into contact with the contact pins 203*e* through 203*k* and 203*m*. That is to say, the number of times of sliding between contact pins and contact faces can be reduced at both the camera mount 201 side and lens mount 301 side.

The contact face holding member 303 has a first inclined guiding face 303*n* and a second inclined guiding face 303*p* for drawing corresponding contact pins toward the rear face direction (imaging sensor 11 side) when mounting the first lens 100 to the camera body 10, as illustrated in FIG. 9B. According to this configuration, the contact pressure of the contact pins provided to the camera body 10 side as to the contact face holding member 303 gradually changes, whereby deformation and wear of the contact pins provided to the camera body 10 can be reduced.

(Operations of Attaching First Lens 100 to Camera Body 10)

Next, the operations at the time of mounting the first lens 100 to the camera body 10 will be described with reference to FIG. 10.

Figure 10A:
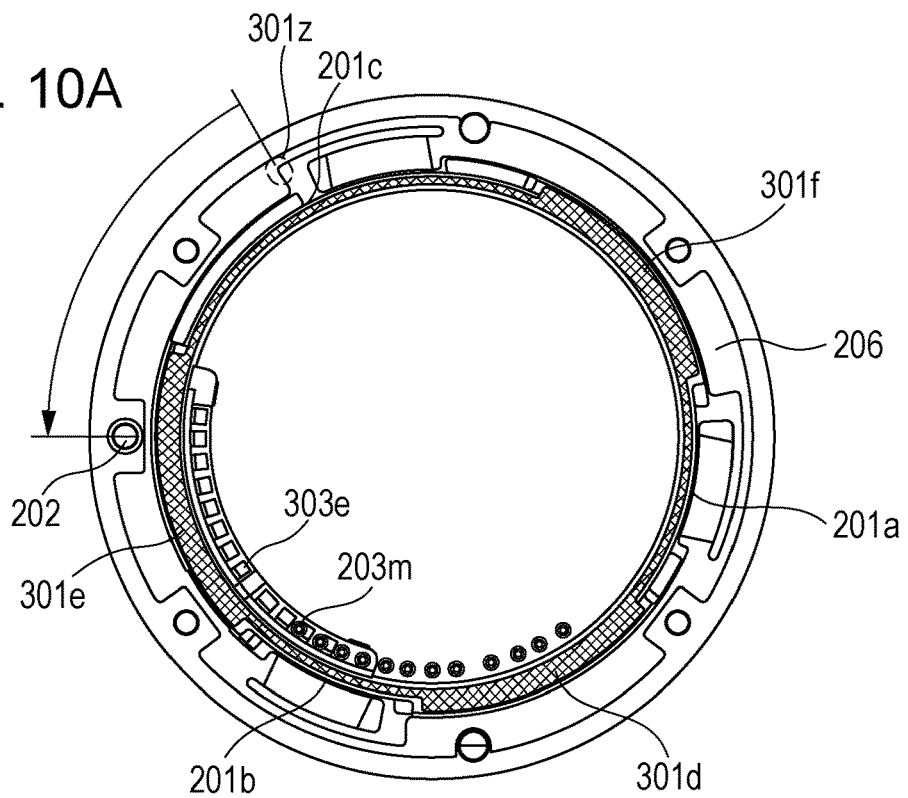
FIG. 10A is a diagram exemplarily describing a contact state between terminals on the camera body 10 and the first lens unit 100 according to an embodiment of the present invention in a mounting start state where mounting of the first lens 100 to the camera body 10 has been started.
Figure 10B:
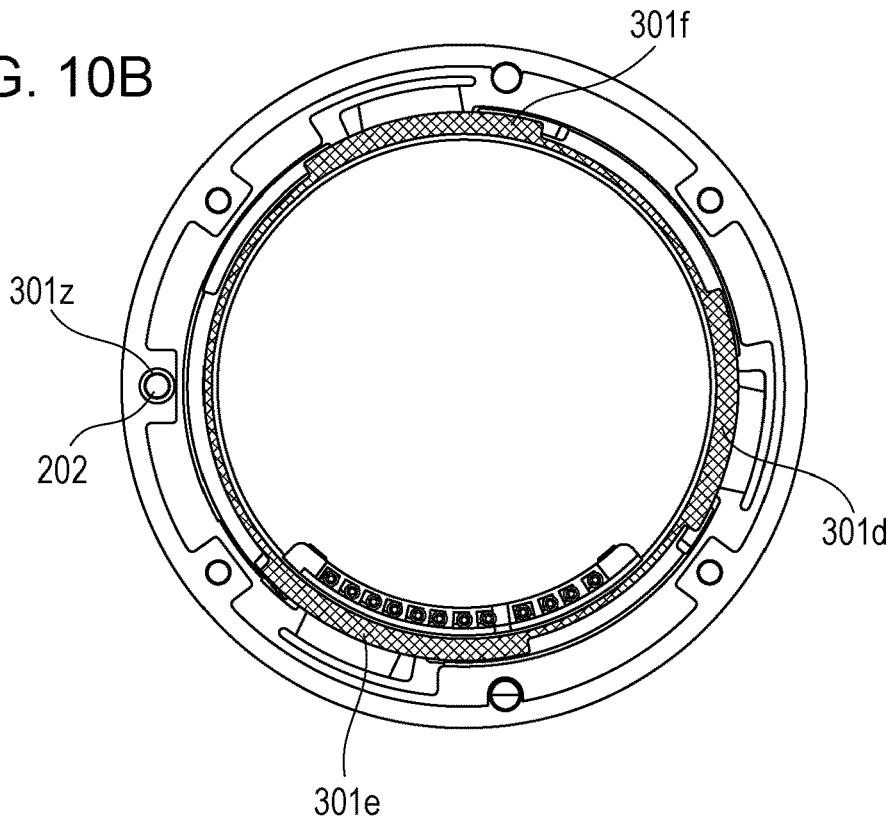
FIG. 10B is a diagram exemplarily describing a contact state between terminals on the camera body 10 and the first lens unit 100 according to an embodiment of the present invention in a mounting completed state where mounting of the first lens 100 to the camera body 10 has been completed.

FIG. 10 illustrates diagrams exemplarily describing a contact state between terminals on the camera body 10 and first lens 100 according to the embodiment of the present invention. FIG. 10A is a diagram for describing the contact state between each terminal in the mounting start state where mounting of the first lens 100 to the camera body 10 has been started. FIG. 10B is a diagram for describing the contact state between each terminal in the mounting completed state where mounting of the first lens 100 to the camera body 10 has been completed. In the state illustrated in FIG. 10A, the contact pins 203*a* and 203*b* at the camera mount 201 side in the optical axis direction overlap the contact faces 303*a* and 303*b* at the lens mount face B side. However, since the height of the contact holding member 203 and the contact face holding member 303 in the direction parallel with the optical axis is made to differ for each region, as described above, none of the contact pins and contact faces come into contact in the state illustrated in FIG. 10A.

The state illustrated in FIG. 10B is a state where the first lens 100 has been rotated by approximately 60° as to the camera body 10 from the state illustrated in FIG. 10A toward the direction indicated by the arrow (see FIG. 10A). That is to say, in the present embodiment, the relative rotational angle of the camera body 10 and first lens 100 from the mounting start state to the mounting completed state is approximately 60°. In the state illustrated in FIG. 10B, the lock pin 202 is in the state of fitting (locked) the lock groove 301*z*.

Rotating the first lens 100 by approximately 60° as to the camera body 10 guides the first lens claw 301*d* into the rear face side (imaging sensor 11 side) of the first camera claw 201*a*, and these are engaged with each other in the optical axis direction. In this state, the second lens claw 301*e* is guided into the rear face side (imaging sensor 11 side) of the second camera claw 201*b*, and these are engaged with each other in the optical axis direction. In the is state, the third lens claw 301*f* is guided into the rear face side (imaging sensor 11 side) of the third camera claw 201*c*, and these are engaged with each other in the optical axis direction. Further, the positions of the lens claws provided to the first lens 100 are positioned by being biased toward the rear face side by the lens mount biasing member 206 provided to the camera mount 201 side, thereby coupling the camera body 10 and the first lens 100.

The contact pins at the camera body 10 side are pressed toward the rear face side (imaging sensor 11 side) by the first guiding face 303*n* and second guiding face 303*p*. The contact pins of the camera body 10 side come into contact with corresponding places on the contact faces 303*a* through 303*k* and 303*m* at the lens mount 301 side in a state of being pressed, and come into contact with the respectively corresponding contact faces in the mounting completed state. At this time, the contact pin 203*m* provided to the camera mount 201 side and the contact face 303*e* provided to the lens mount 301 side firstly start coming into contact.

(Basic Configuration of Conversion Adapter)

Next, the basic configuration of a conversion adapter (adapter device) a camera accessory mountable to the camera mount 201 of the above-described camera body 10 will be described with reference to FIGS. 11 through 12.

Figure 11A:
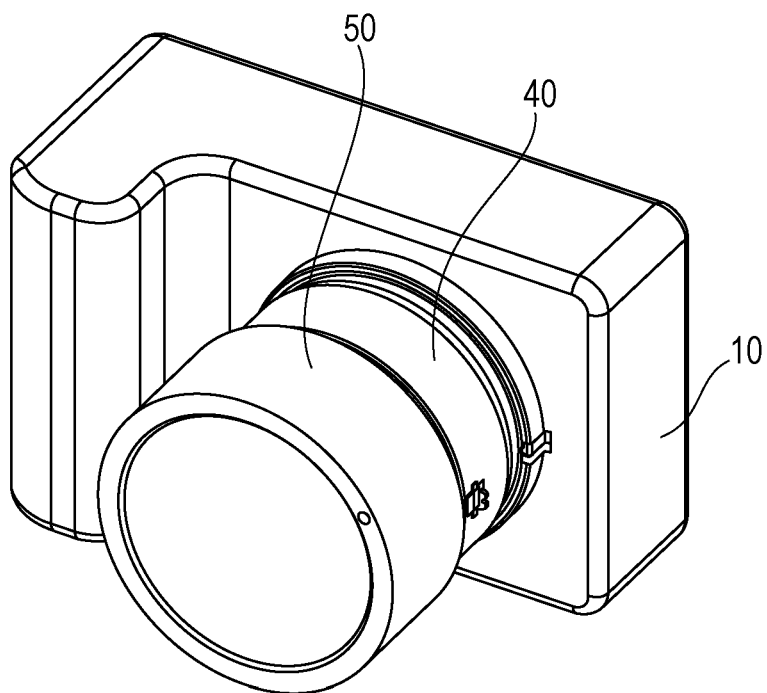
FIG. 11A illustrates an external perspective view of a second lens unit 50 having been mounted to the camera body 10 via a first conversion adapter 40.
Figure 11B:
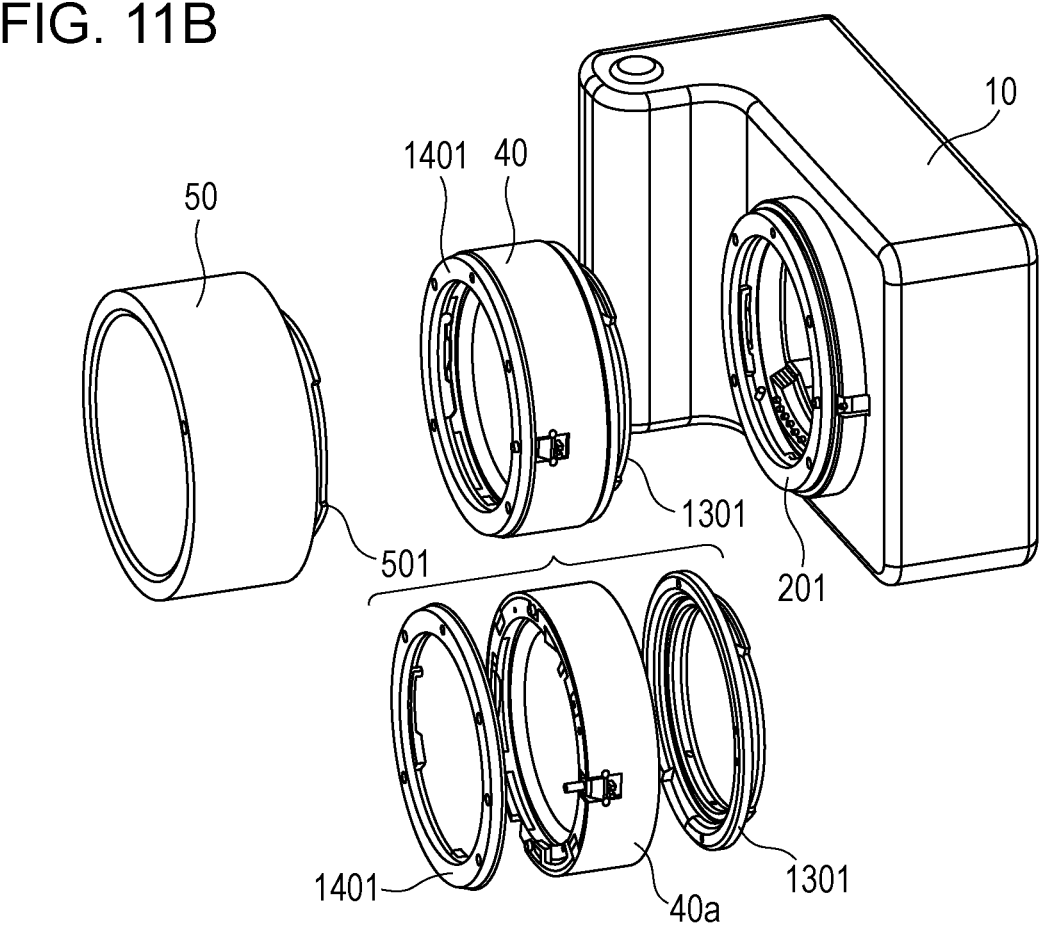
FIG. 11B illustrates an external perspective view of a state where the camera body 10, first conversion adapter 40, and second lens unit 50 have each been detached.

FIG. 11 illustrates diagrams describing the first conversion adapter 40 mountable to the camera body 10, and a second lens unit 50. FIG. 11A illustrates an external perspective view of the second lens unit 50 having been mounted to the camera body 10 via the first conversion adapter 40. FIG. 11B illustrates an external perspective view of a state where the camera body 10, first conversion adapter 40, and second lens unit 50 have each been detached. The second lens unit (hereinafter referred to as second lens) 50 has a lens mount 501 that is short in flange focal distance, but has the same mount diameter as the camera mount 201, as to the camera body 10. That is to say, the second lens 50 has the same mount diameter as the above-described first lens 100, but unlike the first lens 100, is a camera accessory not compatible with direct mounting to the camera body 10.

Figure 12A:
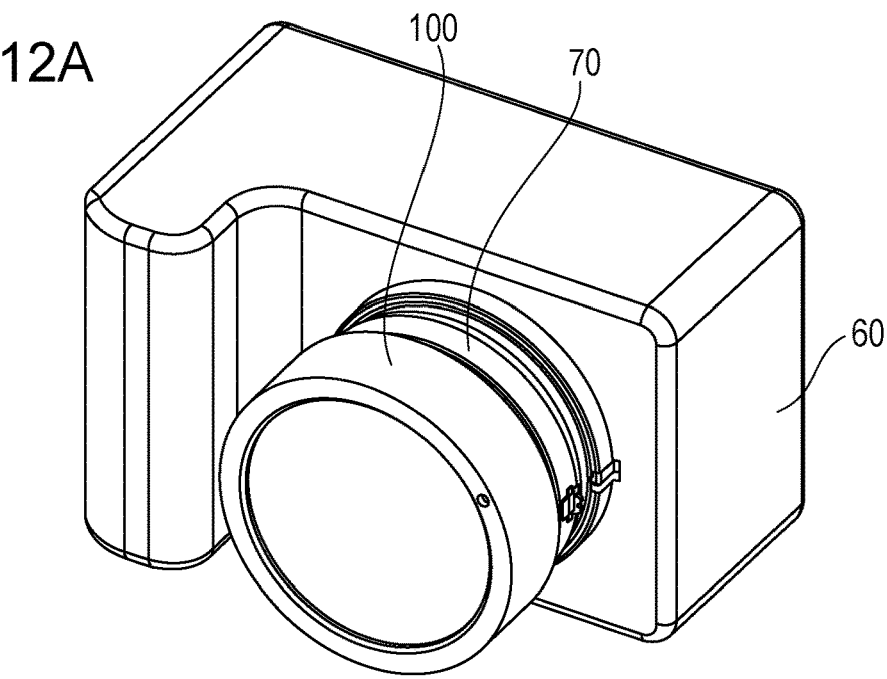
FIG. 12A illustrates an external perspective view of a state where the first lens 100 is mounted to a camera body 60 via a second conversion adapter 70.
Figure 12B:
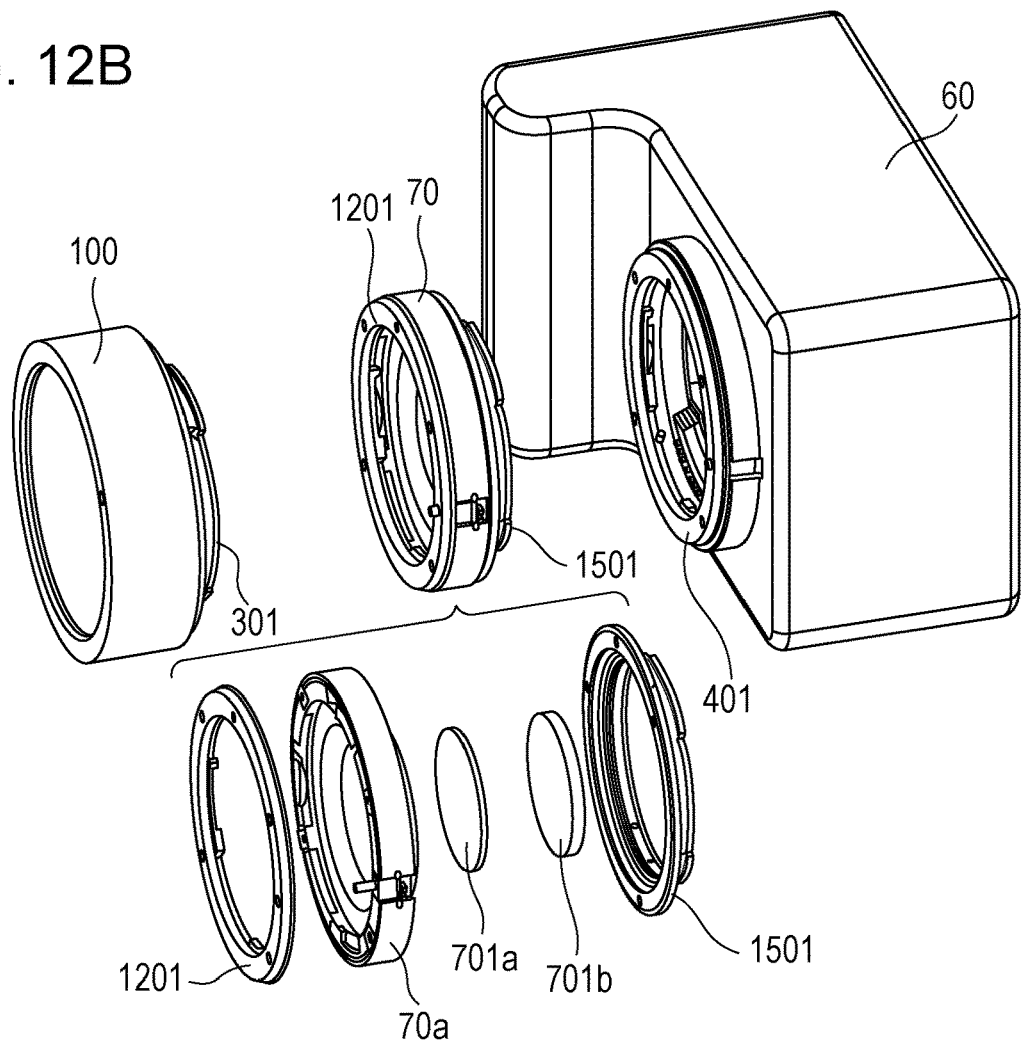
FIG. 12B illustrates an external perspective view where the camera body 60, second conversion adapter 70, and the first lens 100 have each been detached.

FIG. 12 illustrates diagrams for describing the second conversion adapter 70 mountable to a camera body 60 and the first lens 100. FIG. 12A illustrates an external perspective view of a state where the first lens 100 is mounted to the camera body 60 via the second conversion adapter 70. FIG. 12B illustrates an external perspective view where the camera body 60, second conversion adapter 70, and first lens 100 have each been detached.

In a case where a lens unit with a long flange focal distance is directly mounted to an imaging apparatus with a short flange focal distance, trouble, such as the focal point not being formed at an accurate position, will occur, and imaging a subject in this way will result in an unnatural image being obtained. For example, the above problem will occur if the second lens unit 50 having a long flange focal distance is mounted to the above-described camera body 10.

In the same way, in a case where a lens unit with a short flange focal distance is directly mounted to an imaging apparatus with a long flange focal distance, trouble, such as the focal point not being formed at an accurate position, will occur, and imaging a subject in this way will result in an unnatural image being obtained. For example, the above problem will occur if the first lens 100 having a short flange focal distance is mounted to the camera body 60 serving as a second imaging apparatus and having a longer flange focal distance than the above-described camera body 10.

Particularly, the camera body 10 and camera body 60, and the first lens 100 and second lens 50, have the same mount diameters, and therefore it is difficult for a user to judge which imaging apparatuses and which lens units have flange focal distances that are compatible for direct mounting.

It is thereby preferable that only lens units that are compatible can be directly mounted to a certain imaging apparatus, so that imaging apparatuses and lens units that have mutually incompatible flange focal distances are not erroneously directly mounted.

In a case of mounting an incompatible lens unit to an imaging apparatus, a conversion adapter needs to be interposed between the two to adjust the flange focal distance. However, in a state where one side of the conversion adapter is mounted to the imaging apparatus, if a lens unit compatible with direct mounting to the imaging apparatus is mounted to the other side of the conversion adapter, the focal point may not be accurately formed, as described above. Thus, the one side and other side of the conversion adapter preferably have configurations to restrict imaging apparatuses and camera accessories that are directly mountable.

Specifically, in a case of mounting a lens unit having a long flange focal distance to an imaging apparatus having a short flange focal distance, a conversion adapter is preferable where one end side is only mountable to this imaging apparatus, and the other end side is only mountable to this lens unit. In a case of mounting a lens unit having a short flange focal distance to an imaging apparatus having a long flange focal distance, a conversion adapter is preferable where one end side is only mountable to this imaging apparatus, and the other end side is only mountable to this lens unit.

The first conversion adapter 40 has the lens mount 1301 attached to an adapter barrel 40a by a plurality of fastening screws (not illustrated), at one end side in the optical axis direction. The plurality of fastening screws are the same as the lens mount fastening screws 304a to 304d in the lens mount 301 of the first lens unit 100 described above. This lens mount 1301 is an accessory mount attachable to and detachable from the camera mount 201 provided to the camera body 10 described above.

A camera mount 1401 is attached to the adapter barrel 40a by fastening screws (not illustrated), at the other end side of the first conversion adapter 40 in the optical axis direction. This camera mount 1401 is a camera mount that is attachable to and detachable from the lens mount 501 of the second lens 50. The camera mount 1401 of the first conversion adapter 40 is attached such that the imaging plane of the imaging sensor 11 of the camera body 10 will be situated at a position corresponding to the flange focal distance of the second lens 50.

The second conversion adapter 70 has the lens mount 1501 attached to an adapter barrel 70a by fastening screws (not illustrated), at one end side in the optical axis direction. This lens mount 1501 is an accessory mount that is attachable to and detachable from the camera mount 401 provided to the camera body 60.

The second conversion adapter 70 has the camera mount 1201 attached to the adapter barrel 70a by a plurality of fastening screws (not illustrated), at the other end side in the optical axis direction. The plurality of fastening screws are the same as the camera mount fastening screws 205a to 205d in the camera mount 201 of the camera body 10 described above. This camera mount 1201 is a camera mount that is attachable to and detachable from the lens mount 301 of the first lens 100, as described above. As described above, the members having the same mount are the camera mount 201 of the camera body 10 and the camera mount 1201 of the second conversion adapter 70, the lens mount 301 of the first lens 100 and the lens mount 1301 of the first conversion adapter 40, the camera mount 401 of the camera body 60 and the camera mount 1401 of the first conversion adapter, and the lens mount 501 of the second lens 50 and the lens mount 1501 of the second conversion adapter 70. In the following description, assume that each mount has the same configuration, and thus duplicated description will be omitted.

A first optical member 701a and a second optical member 701b are provided to the second conversion adapter 70, between the adapter barrel 70a and the lens mount 1501 in the optical axis direction. The first optical member 701a and second optical member 701b enable the second conversion adapter 70 to extend length of the flange focal distance of the first lens 100 in accordance with the imaging plane of the imaging sensor disposed in the camera body 60. While the optical members have been illustrated as two lenses for the sake of convenience, this is not restrictive.

(Configuration of First Conversion Adapter 40)

Next, the angles (phases) at which bayonet claws are disposed on the circumferential direction of the camera mount and lens mount of the first conversion adapter 40 will be described with reference to FIG. 13 through FIG. 17. The description of the lens mount 1301 described below is synonymous with the description of the lens mount 301. Further, the description of the camera mount 1401 described below is synonymous with the description of the camera mount 401.

Figure 13A:
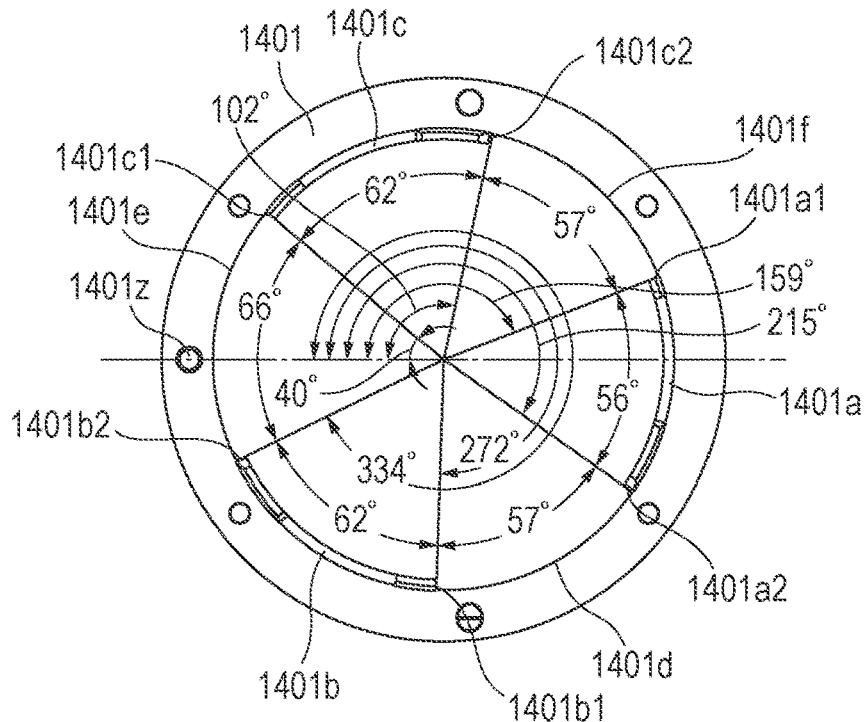
FIG. 13A is a diagram exemplarily illustrating angle ranges that camera claws and camera recesses occupy in the circumferential direction of a camera mount 1401 with a lock pin 1401z as a reference, as viewed from the rear face side (camera body 10 side).
Figure 13B:
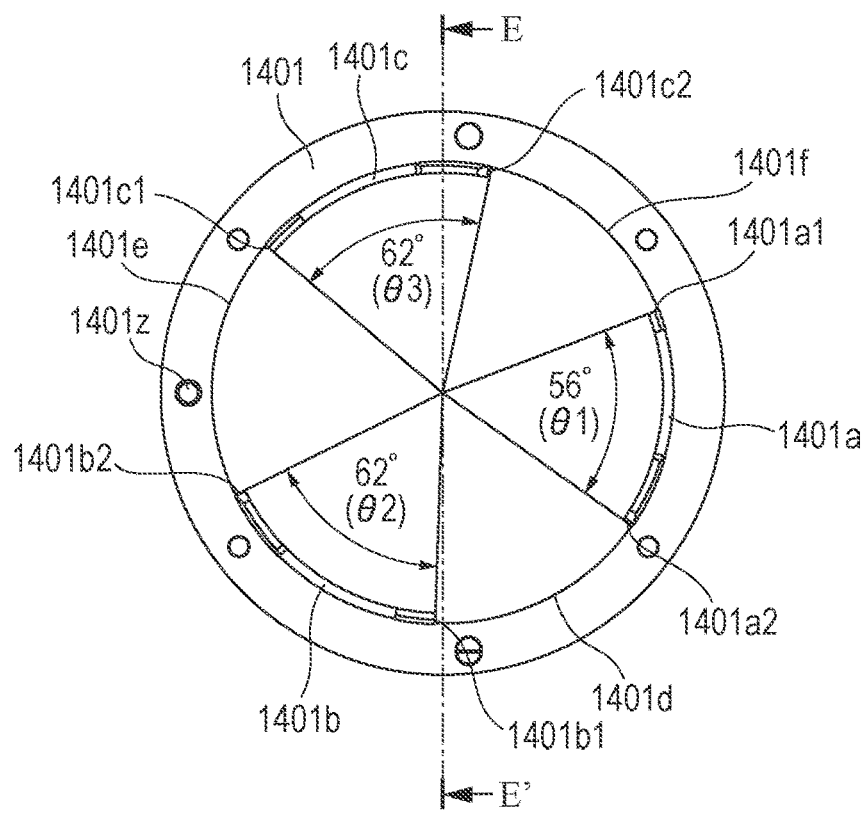
FIG. 13B is a diagram exemplarily illustrating angle ranges that multiple camera claws 1401a through 1401c occupy in the circumferential direction of the camera mount 1401, as viewed from the rear face side (camera body 10 side).
Figure 13C:
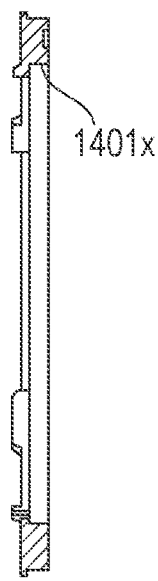
FIG. 13C is a cross-sectional diagram taken along a cross-section E-E' illustrated in FIG. 13B.

FIG. 13 illustrates diagrams for exemplarily describing displacement angles of bayonet claws in the camera mount 1401 provided on one end of the first conversion adapter 40. FIG. 13A is a diagram illustrating angle ranges that camera claws and camera recesses occupy in the circumferential direction of the camera mount 1401 with the lock pin 1401z as a reference, as viewed from the rear face side (camera body 10 side). FIG. 13B is a diagram illustrating angle ranges that multiple camera claws 1401a through 1401c occupy in the circumferential direction of the camera mount 1401, as viewed from the rear face side (camera body 10 side). FIG. 13C is a cross-sectional diagram taken along a cross-section E-E illustrated in FIG. 13B.

The first conversion adapter 40 is a mount adapter used for mounting the second lens unit 50 having a long flange focal distance to the camera body 10 having a short flange focal distance. Thus, it is preferable for the first conversion adapter 40 to be configured such that the camera body 60 having a long flange focal distance cannot be directly mounted to the lens mount 1301, and the first lens 100 having a short flange focal distance cannot be directly mounted to the camera mount 1401. According to this configuration, the positional relation of claws and recesses can be realized such that the lens mount 1301 provided to one end (first end) of the first conversion adapter 40 and the camera mount 1401 provided to the other end (second end) cannot each be directly mounted.

A first camera claw 1401a, second camera claw 1401b, and third camera claw 1401c, are provided in order, to the camera mount 1401 in the circumferential direction (inner radial direction). When viewing the camera mount 1401 from the rear face side as illustrated in FIG. 13A, the camera claw provided at a position farthest from the lock pin 1401z is the first camera claw 1401a. The second camera claw 1401b and third camera claw 1401c are consecutively provided in order from the first camera claw 1401a in a clockwise direction.

A first camera recess 1401d, second camera recess 1401e, and third camera recess 1401f are provided in order, to the camera mount 1401 in the circumferential direction (inner radial direction). When viewing the camera mount 1401 from the rear face side as illustrated in FIG. 13A, the recess provided at a position nearest to the lock pin 1401z is the second camera recess 1401e. The third camera recess 1401f and first camera recess 1401d are consecutively provided in order from the second camera recess 1401e in a clockwise direction.

As illustrated in FIG. 13C, a fitting member 401x that restricts movement of the camera accessory in a direction parallel to the optical axis when the camera accessory is mounted, is provided to the camera mount 1401 side. In the present embodiment, the diameter (i.e., the inner diameter of the fitting member 401x) in a direction orthogonal to the optical axis (approximately the same as the center axis) of the fitting member 401x at the camera mount 401 side is the mount diameter.

The way of bayonet coupling of the first conversion adapter 40 and second lens 50 is approximately the same as the way of bayonet coupling of the camera body 10 and first lens 100 described above, and thus description will be omitted.

For the sake of description, each of the end portions of the camera claws 1401a, 1401b, and 1401c in the circumferential direction will be referred to as a first end portion 1401a1, second end portion 1401a2, third end portion 1401b1, fourth end portion 1401b2, fifth end portion 1401c1, and end portion 1401c2. Each of the end portions are denoted with part numerals in order from the first camera claw 1401a in the clockwise direction, when viewing the camera mount 1401 from the rear face side, as described above.

As illustrated in FIG. 13A, the angles (angle ranges) that the camera claws and camera recesses occupy in the circumferential direction of the camera mount 1401 in the first conversion adapter 40 according to the present embodiment are stipulated as follows. For the first camera claw 1401a, the angle θ1=56°. For the second camera claw 1401b, the angle θ2=62°. For the third camera claw 1401c, the angle θ3=62°. Further, for the first camera recess 1401d, the angle is 57°. For the second camera recess 1401e, the angle is 66°. For the third camera recess 1401f, the angle is 57°. That is to say, the camera mount 1401 has different angles for the camera claws with respect to the above-described camera mount 201 of the camera body 10, but the angles of the camera recesses are the same.

When viewing the camera claws from the rear face side of the first conversion adapter 40, the angles where the camera claws are disposed on the circumferential direction of the camera mount 1401 with the position (referred to as reference position) of the lock pin 1401z as a reference are stipulated as follows. The first camera claw 1401a is disposed between 159° and 215° with the reference position as a start point. The second camera claw 1401b is disposed between 272° and 334° with the reference position as a start point. The third camera claw 1401c is disposed between 40° and 102° with the reference position as a start point.

Figure 14A:
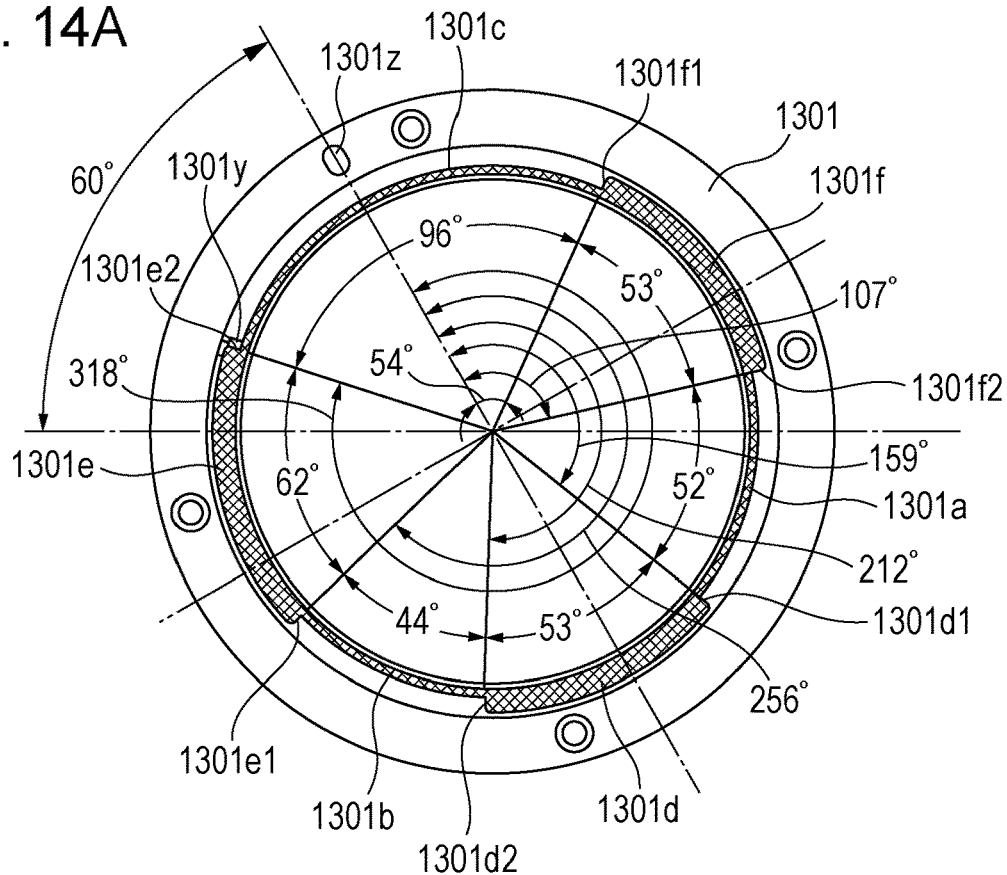
FIG. 14A is a diagram exemplarily illustrating angle ranges that lens claws and lens recesses occupy in the circumferential direction of a lens mount 1301 with a lock groove 1301z as a reference, as viewed from the rear face side.
Figure 14B:
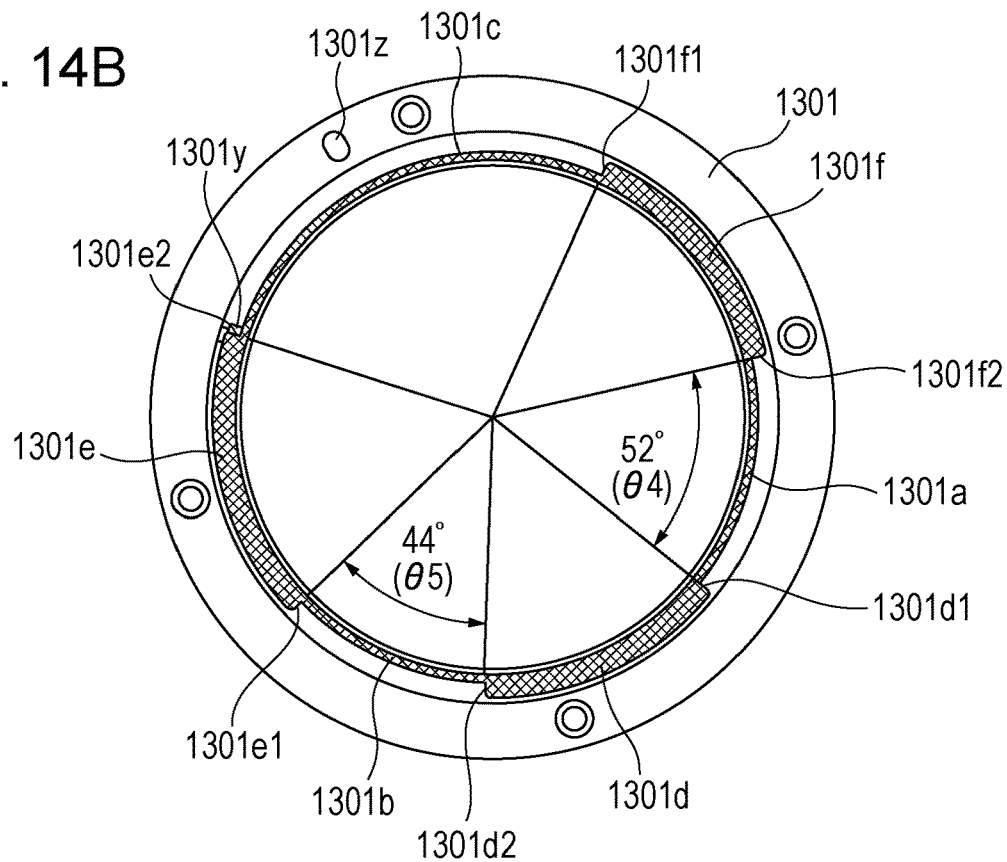
FIG. 14B is a diagram exemplarily illustrating angle ranges that multiple lens recesses 1301a through 1301c occupy in the circumferential direction of the lens mount 1301, as viewed from the rear face side.

FIG. 14 illustrates diagrams exemplarily describing angles of disposing the bayonet claws on the lens mount 1301 provided to the other end of the first conversion adapter 40. FIG. 14A is a diagram illustrating angle ranges that lens claws and lens recesses occupy in the circumferential direction of the lens mount 1301 with the lock groove 1301z as a reference, as viewed from the rear face side. FIG. 14B is a diagram illustrating angle ranges that multiple lens recesses 1301a through 1301c occupy in the circumferential direction of the lens mount 1301, as viewed from the rear face side.

The angles (angle ranges) that the lens recesses occupy in the circumferential direction of the lens mount 1301 are, represented by θ4 as the angle of the first lens recess 1301a and θ5 as the angle of the second lens recess 1301b, as illustrated in FIG. 14B. The angle of disposing the claws and recesses on the lens mount 1301 of the first conversion adapter 40 is the same as the lens mount 301 of the first lens 100 described above, and therefore description will be omitted.

The angles of the claws and recesses in the circumferential direction, on the lens mount 1301 and camera mount 1401 provided to the first conversion adapter 40, will be compared. For example, at the lens mount 1301 side, the angle θ5 of the second lens recess 1301b having the smallest angle is 44°. Whereas, at the camera mount 1401 side, the angle θ1 of first camera claw 1401a having the smallest angle is 56°. That is to say, the claw having the smallest angle at the camera mount 1401 side is larger than the recess having the smallest angle at the lens mount 1301 side (θ5<θ1). In this case, of the recesses on the lens mount 1301 side and the claws on the camera mount 1401 side, at least one or more lens recess and camera claws will interfere with each other. Thus, even if an attempt is made to mount the lens unit to the camera body such that the optical axes at the camera mount 1401 side and lens mount 1301 side are approximately parallel, the claws and recesses interfere, and thereby the lens unit cannot be mounted to the camera body.

Figure 15A:
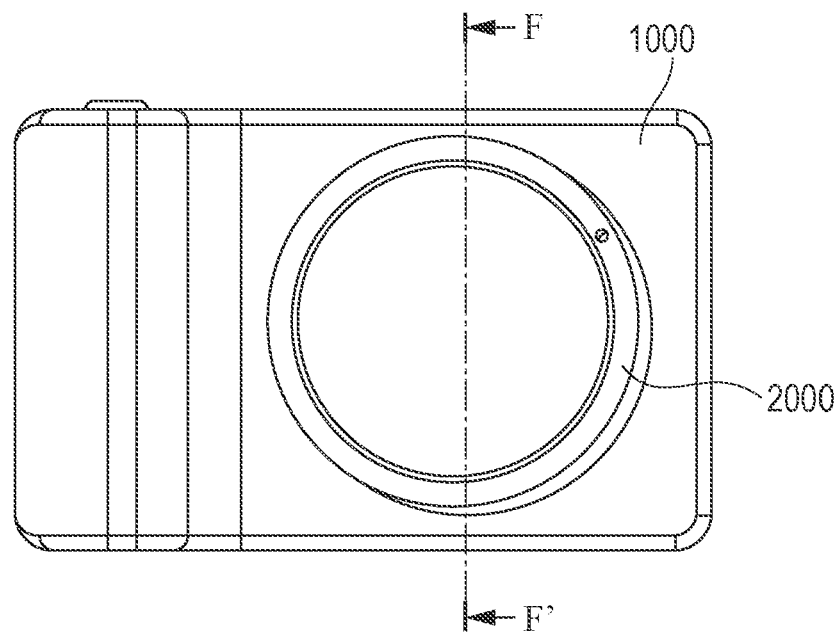
FIG. 15A is a diagram exemplarily describing a frontal view of partway through mounting a predetermined lens unit to a predetermined imaging apparatus that have claws and recesses that interfere with each other.
Figure 15B:
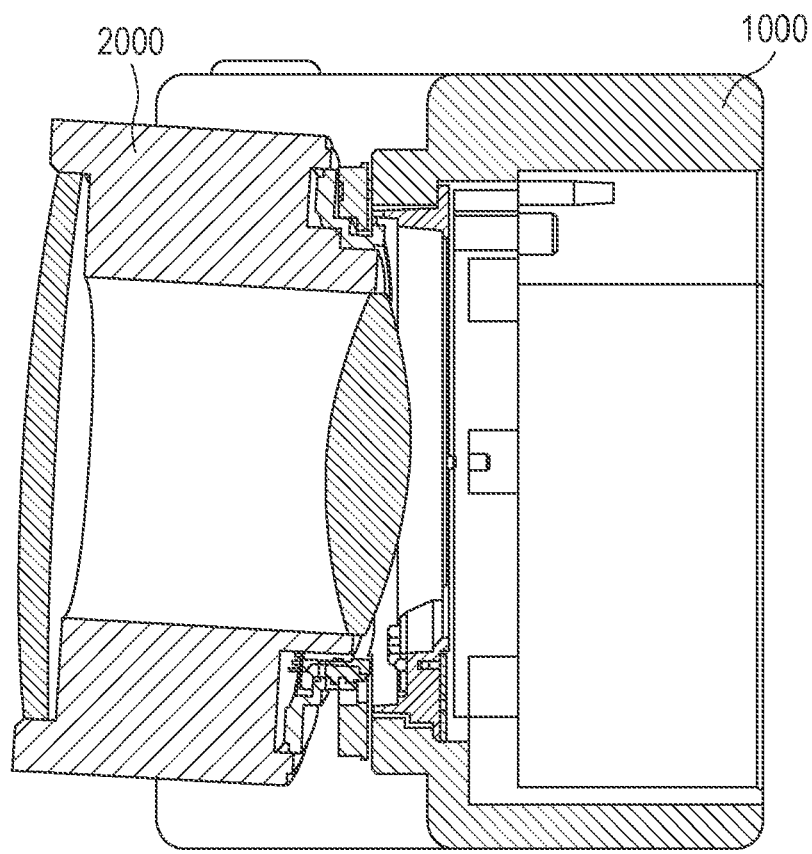
FIG. 15B is a cross-sectional view taken along a cross-section F-F' illustrated in FIG. 15A.

However, if only one claw and recess are interfering, there may be cases where claws of the camera mount side can be inserted into recesses of the lens mount side. FIG. 15 illustrates diagrams exemplarily describing a mounting method of a predetermined imaging apparatus 1000 and a predetermined lens unit 2000 having claws and recesses that interfere with each other. FIG. 15A is a diagram exemplarily describing a frontal view of partway through mounting a predetermined lens unit to a predetermined imaging apparatus having claws and recesses that interfere with each other. FIG. 15B is a cross-sectional view taken along a cross-section F-F' illustrated in FIG. 15A.

For example, in a state where the optical axis of the lens mount side is obliquely inclined as to the optical axis of the camera mount side, one end of a camera claw is inserted into a lens recess, and from this state, the lens mount and camera mount are rotated relatively to each other, as illustrated in FIGS. 15A and 15B. In this case, even if the camera claws and lens recesses originally interfere with each other, this interference with each other is resolved during the relative rotation of the lens mount and camera mount, and transition can be made to a state where the camera claw is inserted into this lens recess. In this case, if there are no other camera claws and lens recesses interfering, the lens unit can be mounted to the camera body.

In the present embodiment, the claws and recesses on the lens mount 1301 side and camera mount 1401 side are disposed such that the angle of a predetermined lens recess adjacent to a reference lens claw is smaller than the angle of two camera claws adjacent to a reference camera recess.

Specifically, in the present embodiment, the angles θ4 and θ5 of the first lens recess 1301a and second lens recess 1301b adjacent to the first lens claw 1301d are smaller than the angles θ1 and θ2 of the first camera claw 1401a and second claw 1401b adjacent to the first camera recess 1401d. That is to say, θ4 (52°) is smaller than θ1 (56°), and θ5 (44°) is smaller than θ2 (62°) θ4<θ1, θ5<θ2.

Thus, even if an attempt is made to insert the first lens claw 1301d (301d) into the first camera recess 401d (1401d), the second lens claw 1301e (301e) interferes with the second camera claw 401b (1401b) in a sure manner, as well does the third lens claw 1301f (301f) with the first camera claw 401a (1401a), as illustrated in FIG. 16.

Figure 16A:
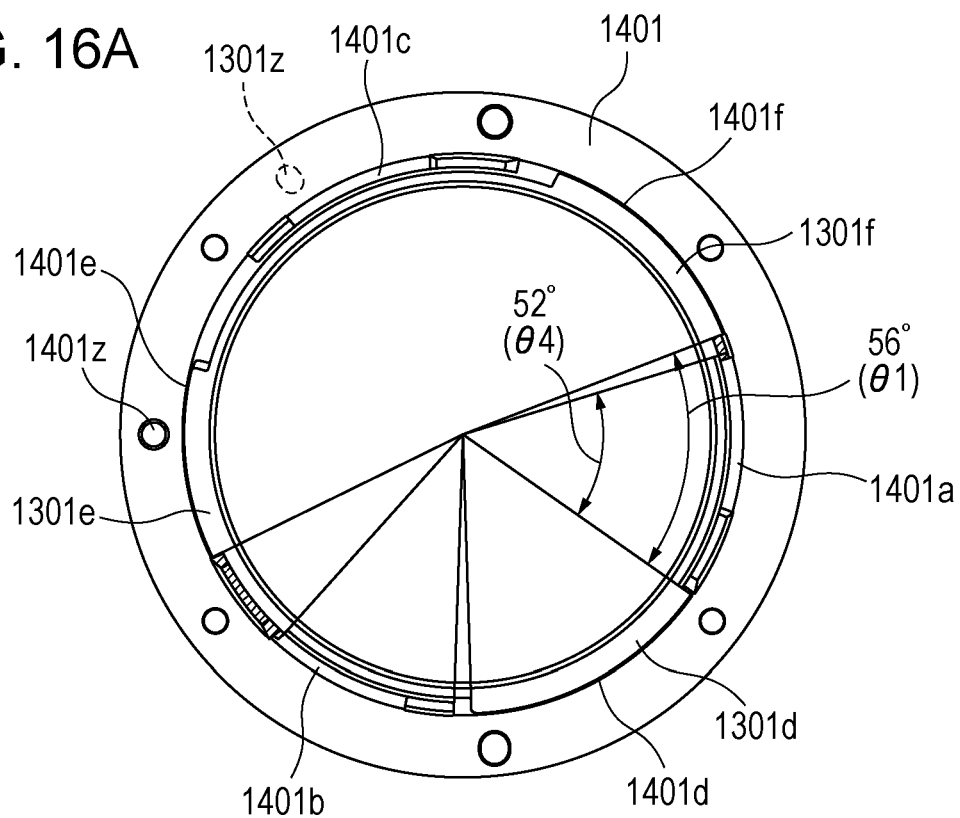
FIG. 16A illustrates a way in which a third lens claw and a first camera claw interfere when the lens mount 301 side is attempted to mount to the camera mount 401 side according to the embodiment of the present invention.
Figure 16B:
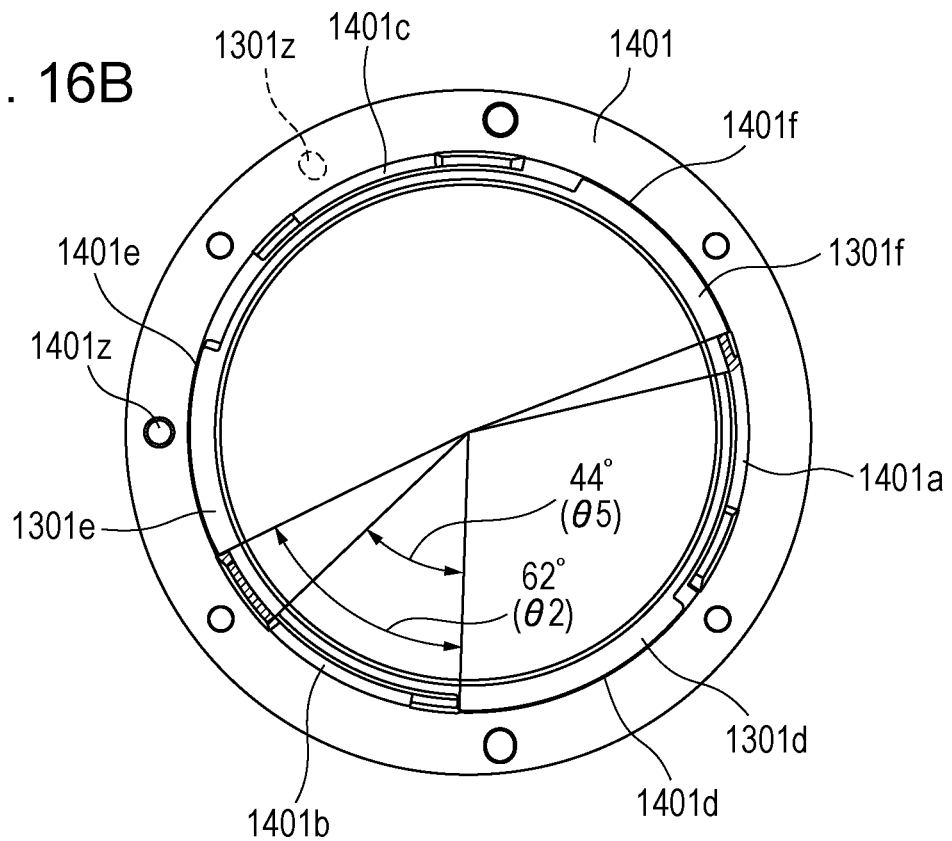
FIG. 16B illustrates a way in which the second lens claw and the second camera claw interfere when the lens mount 301 side is attempted to mount to the camera mount 401 side according to the embodiment of the present invention.
Figure 17A:
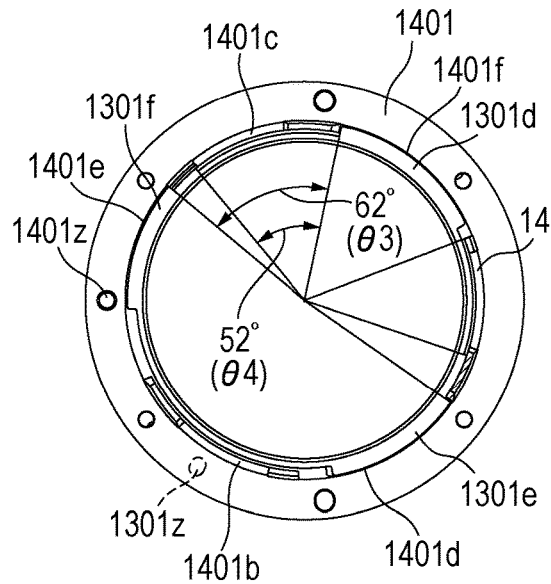
FIG. 17A is a diagram exemplarily describing a way in which the third lens claw and the third camera claw interfere in a case of attempting to insert the first lens claw into the third camera recess, in a case of attempting to insert incompatible claws into recesses at a lens mount 301 side and a camera mount 401 side according to the embodiment of the present invention.
Figure 17C:
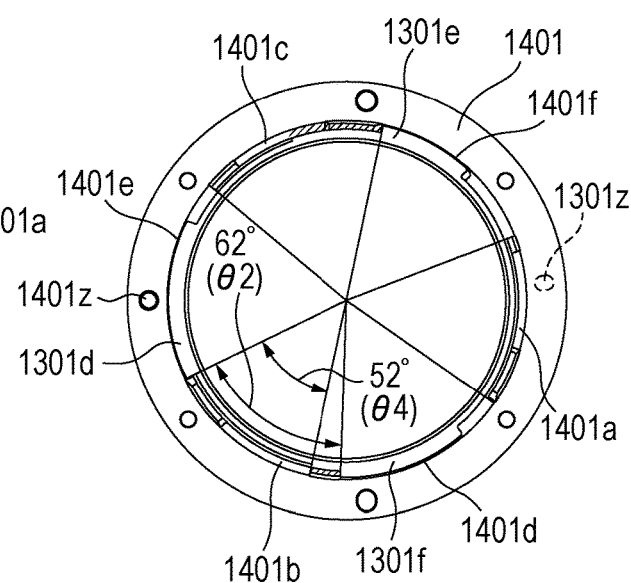
FIG. 17C is a diagram exemplarily describing a way in which the third lens claw and the second camera claw interfere in a case of attempting to insert the first lens claw into the second camera recess, in a case of attempting to insert incompatible claws into recesses at a lens mount 301 side and a camera mount 401 side according to the embodiment of the present invention.
Figure 17B:
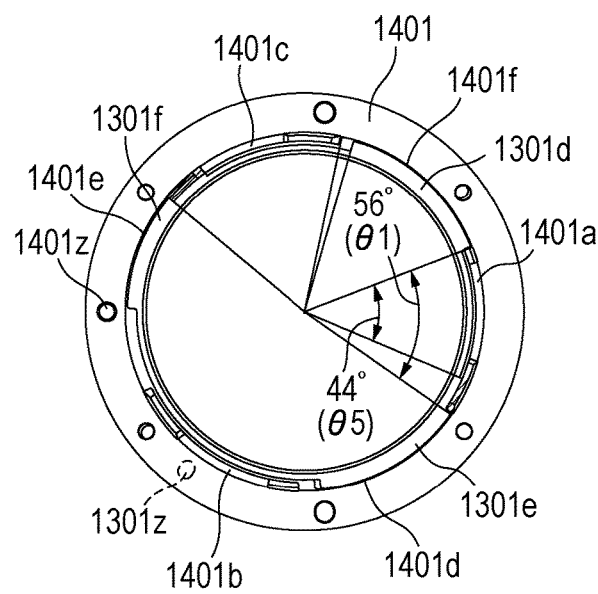
FIG. 17B is a diagram exemplarily describing a way in which the second lens claw and the first camera claw interfere in a case of attempting to insert the first lens claw into the third camera recess, in a case of attempting to insert incompatible claws into recesses at a lens mount 301 side and a camera mount 401 side according to the embodiment of the present invention.
Figure 17D:
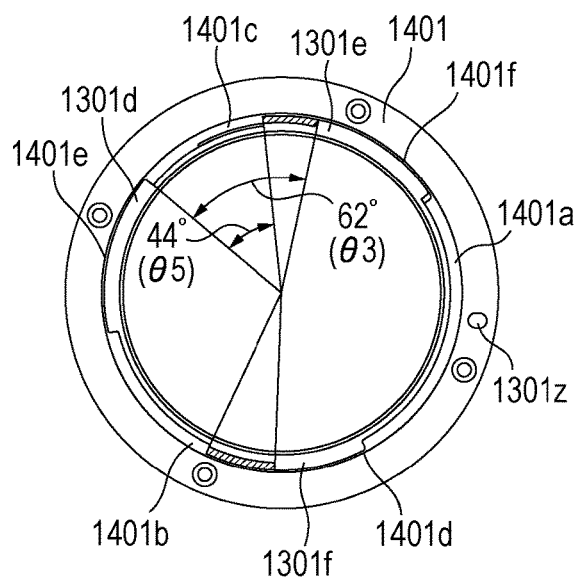
FIG. 17D is a diagram exemplarily describing a way in which the second lens claw and the third camera claw interfere in a case of attempting to insert the first lens claw into the second camera recess, in a case of attempting to insert incompatible claws into recesses at a lens mount 301 side and a camera mount 401 side according to the embodiment of the present invention.

FIG. 16 illustrates diagrams exemplarily describing the way in which claws interfere with each other when attempting to mount the lens mount 301 (1301) side to the camera mount 1401 (401) side according to the embodiment of the present invention. FIG. 16A illustrates the way in which the third lens claw 1301$f$ (301$f$) and the first camera claw 401$a$ (1401$a$) interfere. FIG. 16B illustrates the way in which the second lens claw 1301$e$ (301$e$) and the second camera claw 401$b$ (1401$b$) interfere.

As described above, incompatible lens units and imaging apparatuses, and the mount portions of conversion adapters are configured such that two claws of each other out of the claws that an incompatible lens unit and imaging apparatus have interfere with each other, in the present embodiment. According to this configuration, the risk of an incompatible lens unit being erroneously mounted to an imaging apparatus, or an incompatible lens unit and imaging apparatus being erroneously mounted to mount units provided to both ends of a conversion adapter, can be reduced.

However, even in a case where the above conditions are satisfied, there may be cases where, when attempting to insert three claws into incompatible recesses, for example, two claws are inserted into recesses depending on the angles of the claws and recesses.

In the present embodiment further takes a configuration where the angles of at least two adjacent lens recesses are smaller than the angles of all camera claws. Specifically, in the present embodiment, the angles $\theta 4$ and $\theta 5$ of the first lens recess 1301$a$ and second lens recess 1301$b$ in the circumferential direction are smaller than the angles $\theta 1$ through $\theta 3$ of the first through third camera claws 1401$a$ through 1401$c$ in the circumferential direction. That is to say, the relation between the claws and recesses at the lens mount 1301 side and the camera mount 1401 side according to the present embodiment satisfy $\theta 4<\theta 1$, $\theta 4<\theta 2$, $\theta 4<\theta 3$, $\theta 5<\theta 1$, $\theta 5<\theta 2$, and $\theta 5<\theta 3$.

FIG. 17 illustrates diagrams exemplarily describing a case of attempting to insert incompatible claws into recesses at the lens mount 1301 side and camera mount 1401 side according to the embodiment of the present invention. FIG. 17A illustrates the way in which the third lens claw 1301$f$ (301$f$) and third camera claw 401$c$ (1401$c$) interfere in a case of attempting to insert the first lens claw 1301$d$ (301$d$) into the third camera recess 401$f$ (1401$f$). FIG. 17B illustrates the way in which second lens claw 1301$e$ (301$e$) and first camera claw 401$a$ (1401$a$) interfere in a case of attempting to insert the first lens claw 1301$d$ (301$d$) into the third camera recess 401$f$ (1401$f$). FIG. 17C illustrates the way in which the third lens claw 1301$f$ (301$f$) and second camera claw 401$b$ (1401$b$) interfere in a case of attempting to insert the first lens claw 1301$d$ (301$d$) into the second camera recess 401$e$ (1401$e$). FIG. 17D illustrates the way in which the second lens claw 1301$e$ (301$e$) and third camera claw 401$c$ (1401$c$) interfere in a case of attempting to insert the first lens claw 1301$d$ (301$d$) into the second camera recess 401$e$ (1401$e$).

As illustrated in FIGS. 17A through 17D, the lens claws and camera claws interfere in at least two places in the present embodiment, regardless of the relative rotational angle of the lens mount 1301 and camera mount 1401. According to this configuration, erroneous mounting of a lens unit and conversion adapter having the lens mount 301 or the lens mount 1301 to an imaging apparatus and conversion adapter having the camera mount 401 or the camera mount 1401 can be prevented even more effectively.

(Configuration of Second Conversion Adapter 70)

Next, the angles (phases) at which bayonet claws are disposed in the circumferential direction of the camera mount and lens mount of the second conversion adapter 70 will be described with reference to FIGS. 18 through 21. The description of the camera mount 1201 described below is synonymous with the description of the camera mount 201. The description of the lens mount 1501 described below is also synonymous with the description of the lens mount 501.

The second conversion adapter 70 is a mount adapter used for mounting the first lens 100, which has a short flange focal distance to the camera body 60 having a long flange focal distance. The lens mount 1501 is provided at one end (third end) side of the second conversion adapter 70, and the camera mount 1201 is provided at the other end (fourth end). The camera mount 1201 of the second conversion adapter 70 has the same configuration as the camera mount 201 of the camera body 10 the first imaging apparatus described above. The lens mount 1501 of the second conversion adapter 70 has the same configuration as the lens mount 501 of the second lens 50 described above.

It is therefore preferable for the second conversion adapter 70 to be configured such that the camera body 10 having a short flange focal distance cannot be directly mounted to the lens mount 1501, and the second lens 50 having a long flange focal distance cannot be directly mounted to the camera mount 1201. This configuration can be realized by satisfying the positional relation of claws and recesses such that the lens mount 1501 provided to one end (third end) of the second conversion adapter 70 and the camera mount 1201 provided to the other end (fourth end) each cannot be directly mounted.

Figure 18A:
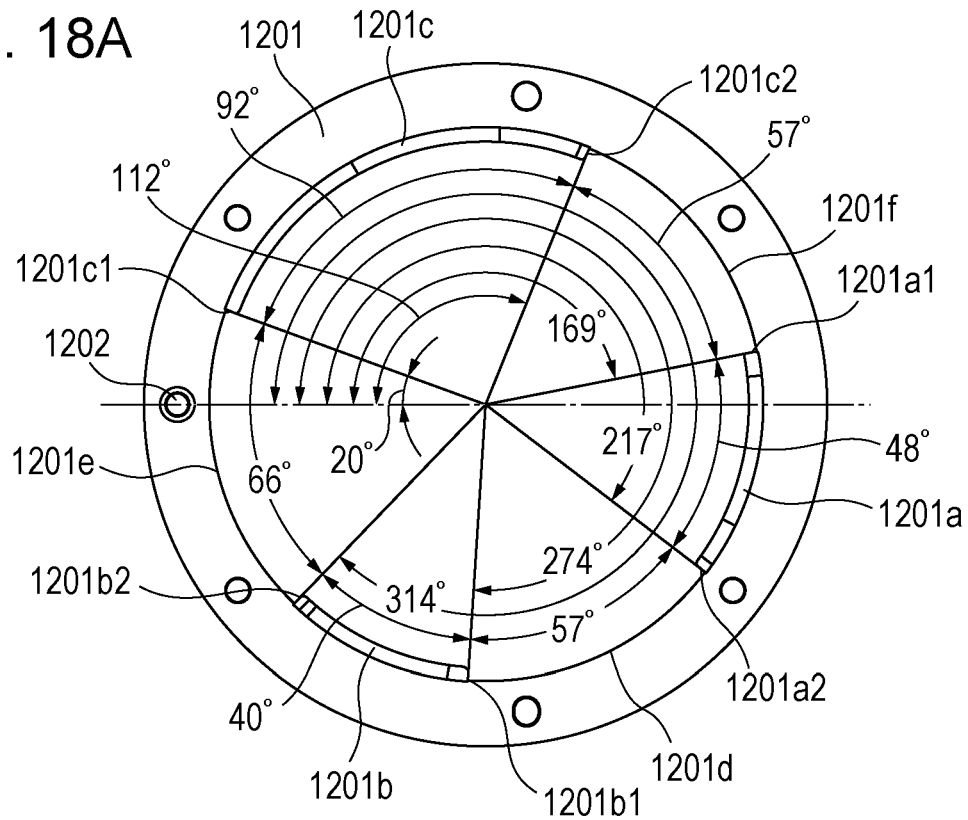
FIG. 18A is a diagram exemplarily illustrating angle ranges that camera claws and camera recesses occupy in the circumferential direction of the camera mount 1201 with a lock pin 1202 as a reference, as viewed from the rear face side.
Figure 18B:
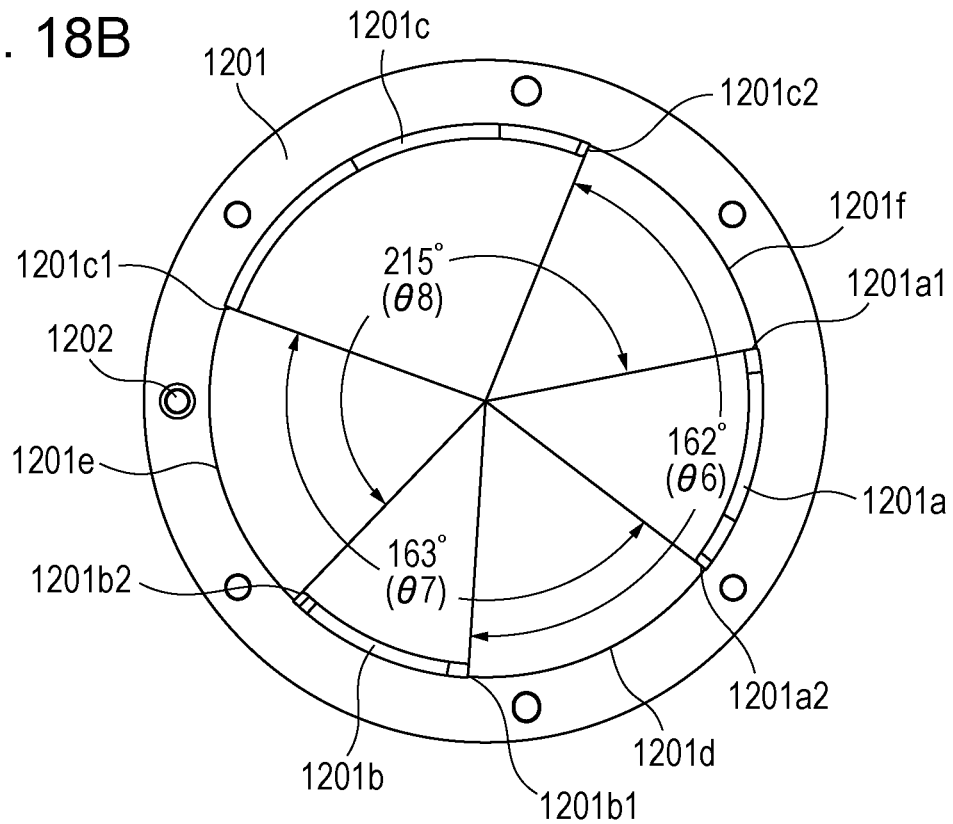
FIG. 18B is a diagram exemplarily illustrating angle ranges that, regarding multiple camera claws 1201a through 1201c, the claws occupy in the circumferential direction of the camera mount 1201, as viewed from the rear face side.

FIG. 18 illustrates diagrams exemplarily describing angles of disposing bayonet claws in the camera mount 1201 provided on one end of the second conversion adapter 70. FIG. 18A is a diagram illustrating angle ranges that camera claws and camera recesses occupy in the circumferential direction of the camera mount 1201 with the lock pin 202 as a reference, as viewed from the rear face side. FIG. 18B is a diagram illustrating angle ranges that, regarding multiple camera claws 1201$a$ through 1201$c$, the claws occupy in the circumferential direction of the camera mount 1201, as viewed from the rear face side. The angles of disposing the claws and recesses on the camera mount 1201 of the second conversion adapter 70 are the same as the camera mount 1201 of the camera body 10 described earlier, and thus description will be omitted.

As illustrated in FIG. 18B, the angle ranging from the sixth end 1201$c$2 of the third camera claw 1201$c$ to the third end 1201$b$1 of the second camera claw 1201$b$, in the circumferential direction of the camera mount 1201 including the first camera claw 1201$a$, is $\theta 6$ (162°). The angle ranging from the second end 1201$a$2 of the first camera claw 1201$a$ to the fifth end 1201$c$1 of the third camera claw 1201$c$, in the circumferential direction of the camera mount 1201 including the second camera claw 1201$b$, is $\theta 7$ (163°). The angle ranging from the fourth end 1201$b$2 of the second camera claw 1201$b$ to the first end 1201$a$1 of the first camera claw 1201$a$, in the circumferential direction of the camera mount 1201 including the third camera claw 1201$c$, is $\theta 8$ (215°).

Figure 19A:
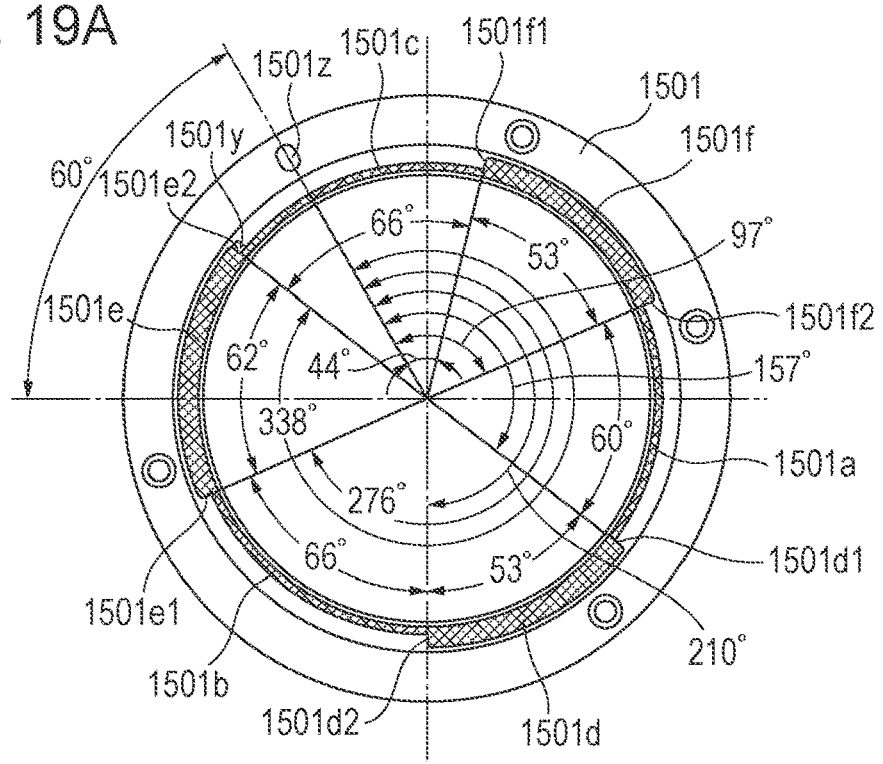
FIG. 19A is a diagram exemplarily illustrating angle ranges that lens claws and lens recesses occupy in the circumferential direction of the lens mount 1501 with a lock pin 1501z as a reference, as viewed from the rear face side.
Figure 19B:
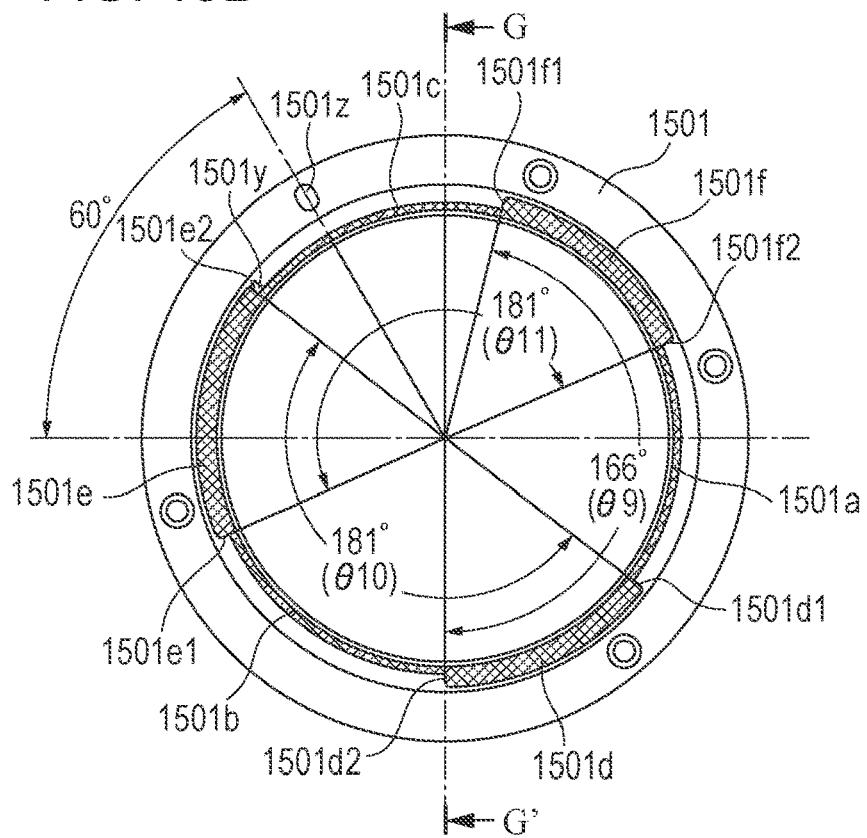
FIG. 19B is a diagram exemplarily illustrating angle ranges where recesses are provided regarding the multiple lens recesses 1501a through 1501c in the circumferential direction of the lens mount 1501, as viewed from the rear face side.
Figure 19C:
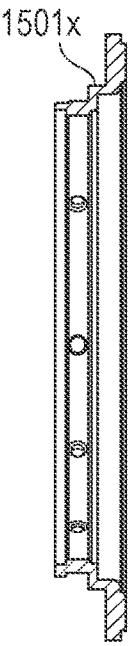
FIG. 19C is a cross-sectional diagram taken along a cross-section G-G' illustrated in FIG. 19B.

FIG. 19 illustrates diagrams exemplarily describing angle of disposing bayonet claws in a lens mount 1501 provided on the other end of the second conversion adapter 70. FIG. 19A is a diagram illustrating angle ranges that lens claws and lens recesses occupy in the circumferential direction of the lens mount 1501 with the lock pin 1501$z$ as a reference, as viewed from the rear face side. FIG. 19B is a diagram illustrating angle ranges where recesses are provided regarding the multiple lens recesses 1501$a$ through 1501$c$ in the circumferential direction of the lens mount 1501, as viewed from the rear face side. FIG. 19C is a cross-sectional diagram taken along a cross-section G-G' illustrated in FIG. 19B.

A first lens claw 1501d, second lens claw 1501e, and third lens claw 1501f are provided in order to the lens mount 1501 in the circumferential direction (inner radial direction). In a case of viewing the lens mount 1501 from the rear face side as illustrated in FIG. 19A, the lens claw provided at a position farthest from the lock groove 1501z is the first lens claw 1501d. The second lens claw 1501e and third lens claw 1501f are consecutively provided in order from the first lens claw 1501d in a clockwise direction.

A first lens recess 1501a, second lens recess 1501b, and third lens recess 1501c are provided in order, to the lens mount 1501 in the circumferential direction (inner radial direction). In a case of viewing the lens mount 1501 from the rear face side as illustrated in FIG. 19A, the recess provided at a position nearest to the lock groove 1501z is the third lens recess 1501c. The first lens recess 1501a and second lens recess 1501b are consecutively provided in order from the third lens recess 1501c in a clockwise direction.

For the sake of description, the end portions of the lens claws 1501d, 1501e, and 1501f, in the circumferential direction, will be referred to as first end portion 1501d1, second end portion 1501d2, third end portion 1501e1, fourth end portion 1501e2, fifth end portion 1501f1, and sixth end portion 1501f2. The end portions are denoted with part numerals in order from the first lens claw 1501d in the clockwise direction, when viewing the lens mount 1501 from the rear face side, as described above.

As illustrated in FIG. 19A, the angles (angle ranges) that the lens claws and lens recesses occupy in the circumferential direction of the lens mount 1501 are stipulated as follows. The angle of the first lens claw 1501d is 53°, the angle of the second lens claw 1501e is 62°, and the angle of the third lens claw 1501f is 53°. That is to say, the angles of the lens claws on the lens mount 1501 side are the same as the angles of the lens claws on the lens mount 1301 side described above.

In contrast, the angles of the lens recesses at the lens mount 1501 side differ from the angles of the lens recesses at the lens mount 1301 (301) side described above. Specifically, the angle of the first lens recess 1501a is 60°, the angle of the second lens recess 1501b is 66°, and the angle of the third lens recess 1501c is 66°.

When viewing the lens claws from the rear face side, the angles in the clockwise direction where the lens claws are disposed on the circumferential direction of the lens mount 1501 with the position (referred to as reference position) of the lock groove 1501z as a reference are stipulated as follows. The first lens claw 1501d is disposed between 157° and 210° with the reference position as a start point. The second lens claw 1501e is disposed between 276° and 338° with the reference position as a start point. The third lens claw 1501f is disposed between 44° and 97° with the reference position as a start point.

As illustrated in FIG. 19C, a fitting member 1501x, which restricts movement of the imaging apparatus in a direction parallel to the optical axis when mounted to the imaging apparatus, is provided to the lens mount 1501 side. In the present embodiment, the diameter (i.e., the inner diameter of the fitting member 1501x) in a direction orthogonal to the optical axis (approximately the same as the center axis) of the fitting member 1501x at the lens mount 1501 side is the mount diameter. The mount diameters of the camera mounts and lens mounts described above are approximately the same length.

As illustrated in FIG. 19B, the angle ranging from the fifth end 1501f1 of the third lens claw 1501f to the second end 1501d2 of the first lens claw 1501d, in the circumferential direction of the lens mount 1501 including the first lens recess 1501a, is θ9 (166°). The angle ranging from the first end 1501d1 of the first lens claw 1501d to the fourth end 1501e2 of the second lens claw 1501e, in the circumferential direction of the lens mount 1501 including the second lens recess 1501b, is θ10 (181°). The angle ranging from the third end 1501e1 of the second lens claw 1501e to the sixth end 1501f2 of the third lens claw 1501f, in the circumferential direction of the lens mount 1501 including the third lens recess 1501c, is θ11 (181°).

The angles of the claws and recesses in the circumferential direction will be compared between the camera mount 1201 and lens mount 1501 provided to the second conversion adapter 70. For example, the angle (92°) of the third camera claw at the camera mount 1201 side is larger than the angles (66°) of the second and third lens recesses 1501b and 1501c that are the largest angle of the lens recesses at the lens mount 1501 side. That is to say, the angle of at least one camera claw at the camera mount 1201 side is larger than the angle of the lens recess having the largest angle at the lens mount 1501 side.

In this case, of the claws at the camera mount 1201 side and recesses at the lens mount 1501 side, at least one or more camera claws and lens recesses interfere with each other. Thus, even if an attempt is made to mount the lens unit to the camera body such that the optical axis at the camera mount 1201 side and lens mount 1501 side are approximately parallel to each other, the claws and recesses interfere, and therefore the lens unit cannot be mounted to the camera body.

However, if only one claw and recess are interfering, there may be cases where claws of the camera mount side can be inserted into recesses of the lens mount side, in the same way as the above description of the first conversion adapter. For example, there are cases where, in a state where the optical axis of the lens mount side is obliquely inclined as to the optical axis of the camera mount side, one end of a camera claw is inserted into a lens recess, and the lens mount and camera mount are rotated relative to each other, and the lens unit can be mounted to the camera body.

Figure 20A:
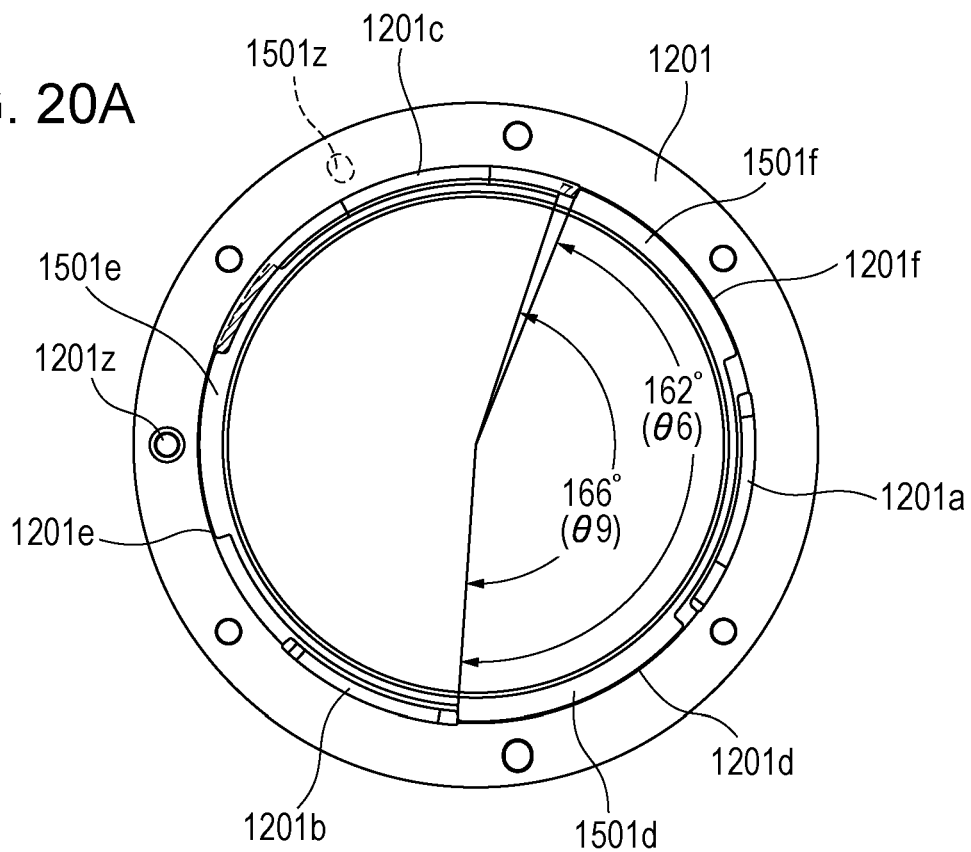
FIG. 20A is a diagram exemplarily describing a way in which the third lens claw interfere with the third camera claw, when attempting to mount a reference claw at the lens mount 501 side to a reference recess at the camera mount 201 side according to an embodiment of the present invention.
Figure 20B:
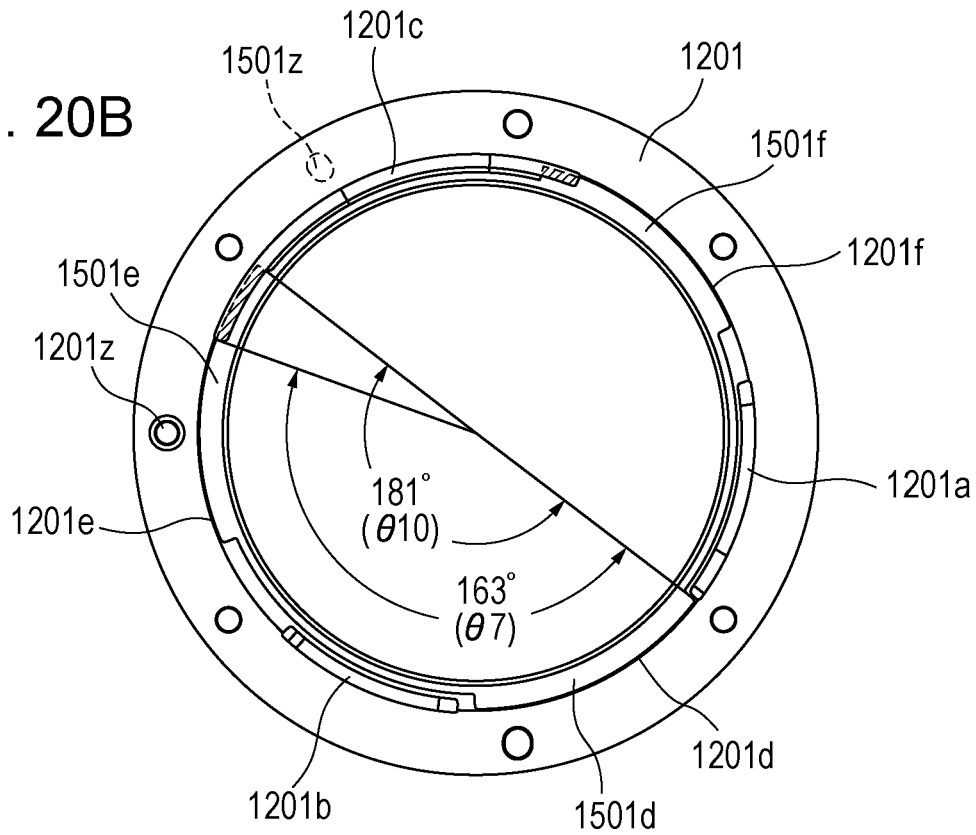
FIG. 20B is a diagram exemplarily describing a way in which the second lens claw interfere with the third camera claw, when attempting to mount a reference claw at the lens mount 501 side to a reference recess at the camera mount 201 side according to an embodiment of the present invention.
Figure 21A:
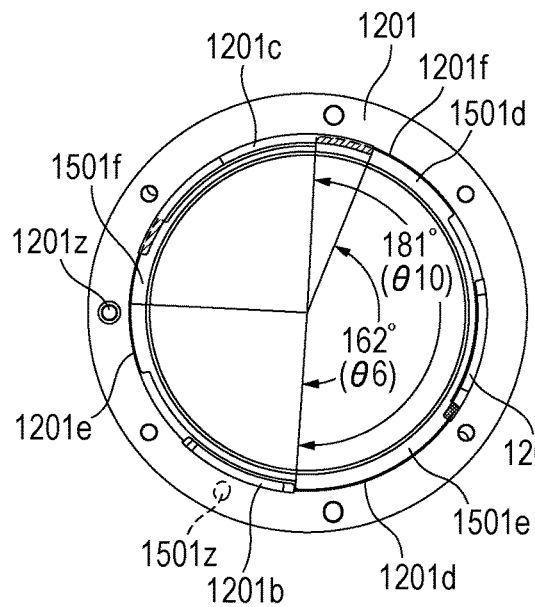
FIG. 21A illustrates a way in which the first lens claw and the third camera claw interfere in a case of attempting to insert the second lens claw into the first camera recess, when attempting to mount a claw other than the reference claw at the lens mount 501 side to a reference recess at the camera mount 201 side according to an embodiment of the present invention.
Figure 21C:
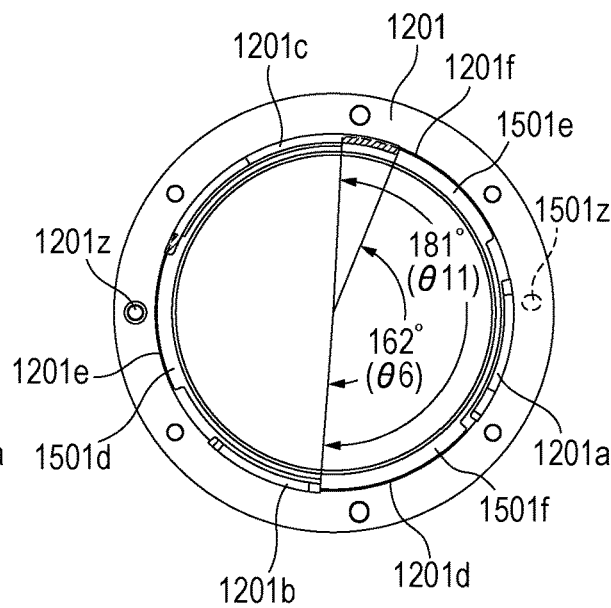
FIG. 21C illustrates a way in which the second lens claw and the third camera claw interfere in a case of attempting to insert the third lens claw into the first camera recess, when attempting to mount a claw other than the reference claw at the lens mount 501 side to a reference recess at the camera mount 201 side according to an embodiment of the present invention.
Figure 21B:
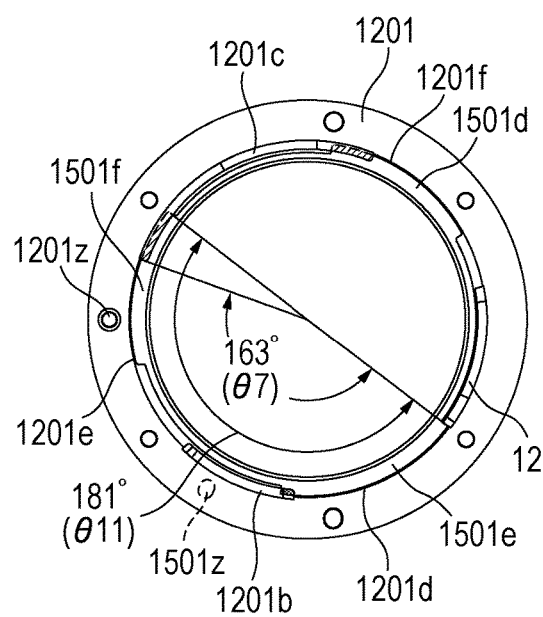
FIG. 21B illustrates a way in which the third lens claw and the third camera claw interfere in a case of attempting to insert the second lens claw into the first camera recess, when attempting to mount a claw other than the reference claw at the lens mount 501 side to a reference recess at the camera mount 201 side according to an embodiment of the present invention.
Figure 21D:
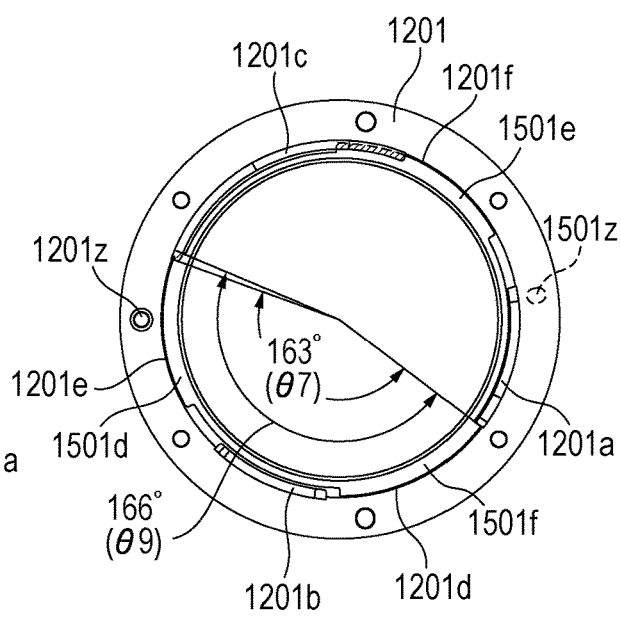
FIG. 21D illustrates a way in which the first lens claw and the third camera claw interfere in a case of attempting to insert the third lens claw into the first camera recess, when attempting to mount a claw other than the reference claw at the lens mount 501 side to a reference recess at the camera mount 201 side according to an embodiment of the present invention.

In the present embodiment, the claws and recesses at the camera mount 1201 side and the lens mount 1501 side are disposed to satisfy θ6<θ9 and θ7<θ10 in the circumferential direction. FIG. 20 illustrates diagrams exemplarily describing the way in which claws interfere with each other, when attempting to mount a reference claw at the lens mount 1501 (501) side to a reference recess at the camera mount 201 (1201) side according to the embodiment of the present invention. FIG. 20A illustrates the way in which the third lens claw 1501f (501f) and the third camera claw 201c (1201c) interfere. FIG. 20B illustrates the way in which the second lens claw 1501e (501e) and the third camera claw 201c (1201c) interfere.

As illustrated in FIGS. 20A and 20B, in a case where, for example, the reference first lens claw 1501d (501d) is attempted to be inserted into the reference camera recess 201d (1201d), the third camera claw 201c (1201c) interferes with the second lens claw 1501e (501e) and third lens claw 1501f (501f).

That is to say, as viewed from the rear face side, the total sum of the angles of one reference lens claw, another lens claw adjacent thereto in the clockwise direction, and a lens recess situated between these lens claws, is taken as a first angle. As viewed from the rear face side, the total sum of the angles of one reference camera recess, another camera recess adjacent thereto in the clockwise direction, and a camera claw portion situated therebetween, is taken as a second angle. As viewed from the rear face side, the total sum of the angles of one reference lens claw, another lens claw adjacent thereto in the counterclockwise direction, and a lens recess situated between these lens claws, is taken as a third angle. As viewed from the rear face side, the total sum of the angles of one reference camera recess, another camera recess adjacent thereto in the counterclockwise direction, and a camera claw portion situated therebetween, is taken as a fourth angle. According to the present embodiment, it is sufficient to layout the claws and recesses at the camera mount 1201 side and lens mount 1501 side such that the first angle described above is larger than the second angle, and the third angle is larger than the fourth angle.

According to this configuration, at least two lens claws and one camera claw interfere with each other. Thus, the risk of an incompatible lens unit being erroneously mounted to an imaging apparatus, or an incompatible lens unit and imaging apparatus being erroneously mounted to mount units provided to both ends of a conversion adapter, can be reduced.

However, even in a case where, for example, the above conditions are satisfied, there may be cases where, when attempting to insert three claws into incompatible recesses two claws are inserted into recesses depending on the angles of the claws and recesses.

The claws and recesses at the camera mount 1201 side and lens mount 1501 side are therefore disposed in the circumferential direction so as to satisfy θ6<θ9, θ6<θ10, θ6<θ11, θ7<θ9, θ7<θ10, and θ7<θ11. That is to say, as viewed from the rear face side, the total sum of the angles of two claws other than the reference lens claw described above, and a lens recess situated therebetween, is taken as a fifth angle. According to the present embodiment, it is sufficient to layout the claws and recesses at the camera mount 1201 side and lens mount 1501 side such that the second angle and fourth angle described above are smaller than any of the first angle, third angle, and fifth angle.

FIG. 21 illustrates diagrams exemplarily describing the way in which claws interfere with each other, when attempting to mount a claw other than the reference claw at the lens mount 1501 (501) side to a reference recess at the camera mount 201 (1201) side according to the embodiment of the present invention. FIG. 21A illustrates the way in which the first lens claw 1501d (501d) and the third camera claw 201c (1201c) interfere in a case of attempting to insert the second lens claw 1501e (501e) into the first camera recess 201d (1201d). FIG. 21B illustrates the way in which the third lens claw 1501f (501f) and the third camera claw 201c (1201c) interfere in a case of attempting to insert the second lens claw 1501e (501e) into the first camera recess 201d (1201d). FIG. 21C illustrates the way in which the second lens claw 1501e (501e) and the third camera claw 201c (1201c) interfere in a case of attempting to insert the third lens claw 1501f (501f) into the first camera recess 201d (1201d). FIG. 21D illustrates the way in which the first lens claw 1501d (501d) and the third camera claw 201c (1201c) interfere in a case of attempting to insert the third lens claw 1501f (501f) into the first camera recess 201d (1201d).

As illustrated in FIGS. 21A through 21D, at least two lens claws and one camera claw interfere, regardless of the relative rotation angle of the lens mount 1501 and camera mount 1201, according to the present embodiment. According to this configuration, erroneous mounting of a lens unit and conversion adapter having the lens mount 501 and the lens mount 501 to an imaging apparatus and conversion adapter having the camera mount 201 and the camera mount 1201 can be prevented even more effectively.

Figure 22:
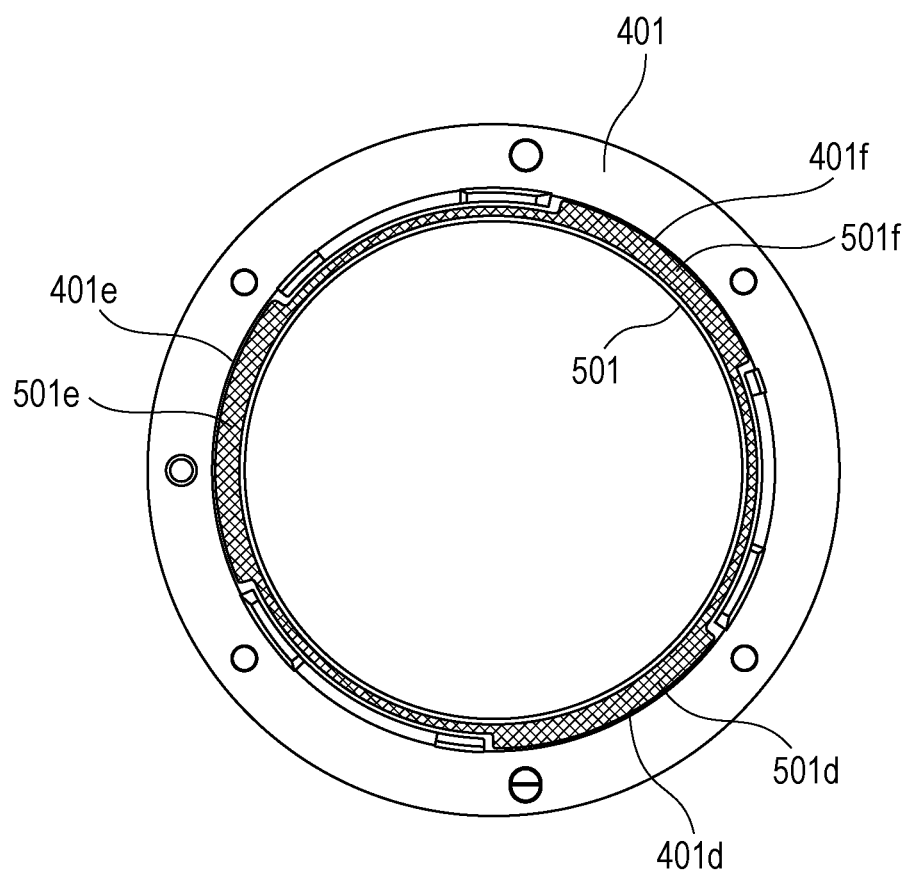
FIG. 22 is a diagram exemplarily describing a state in which claws provided to the camera mount 401 side and lens mount 501 side according to an embodiment of the present invention are engaged.

FIG. 22 is a diagram exemplarily describing a state in which claws provided to the camera mount 401 side and lens mount 501 side according to the embodiment of the present invention are engaged. FIG. 22 illustrates a state in which the camera mount 401 provided to the camera body 60 is engaged to the lens mount 501 provided to the second lens 50. The first lens claw 501d can be inserted into the first camera recess 401d, as illustrated in FIG. 22. The second lens claw 501e can be inserted into the second camera recess 401e. Further, the third lens claw 501f can be inserted into the third camera recess 401f. That is to say, the camera mount 401 side and the lens mount 501 side are a combination compatible with being directly mounted to each other. The camera mount 201 side and the lens mount 301 side are a combination compatible to being directly mounted to each other, as illustrated in FIG. 10A.

As described above, the camera mount 401 (1401) corresponding to an imaging apparatus (e.g., the camera body 60) having a long flange focal distance, and the lens mount 501 (1501) corresponding to a lens unit (e.g., the second lens 50) having a long flange focal distance can be directly mounted to each other. However, the camera mount 201 (1201) corresponding to an imaging apparatus (e.g., the camera body 10) having a short flange focal distance and the lens mount 501 (1501) corresponding to a lens unit (e.g., the second lens 50) having a long flange focal distance cannot be directly mounted to each other. The camera mount 201 (1201) corresponding to an imaging apparatus (e.g., the camera body 10) having a short flange focal distance and the lens mount 301 (1301) corresponding to a lens unit (e.g., the first lens 100) having a short flange focal distance can be directly mounted to each other. However, the camera mount 401 (1401) corresponding to an imaging apparatus (e.g., the camera body 60) having a long flange focal distance and the lens mount 301 (1301) corresponding to a lens unit (e.g., the first lens 100) having a short flange focal distance cannot be directly mounted to each other.

An imaging apparatus and camera accessory employing the configuration of the above-described embodiment can therefore prevent erroneous mounting of an imaging apparatus and camera accessory having approximately the same mount diameter but are not mutually compatible.

Although a preferable embodiment of the present invention has been described, the present invention is not restricted to this embodiment, and various modifications and alterations can be made within the scope of the essence thereof. For example, a case of employing a digital camera has been described as an example of the imaging apparatus in the above-described embodiment, but imaging apparatuses other than digital cameras, such as digital video cameras, and security cameras, may be employed in the configuration.

Although a case of employing an interchangeable lens and an intermediate accessory, such as a conversion adapter, as an example of the camera accessory carrying out the present invention, has been described in the embodiment above, this is not restrictive. Any sort of camera accessory may be employed as long as it is a device having an accessory mount capable of directly connecting (coupling) to a camera mount provided to the above-described imaging apparatuses.

Although a configuration has been described in the above embodiment where both of the camera mount and accessory mount corresponding to each other have a pair of electric terminals through which electric connection is established in a mutually mounted state, this is not restrictive. For example, a configuration may be made having electric terminals that do not correspond to each other. For example, a configuration may be made where a terminal that the camera body 10 does not have is provided to a camera accessory mountable to the camera body 10.

Although a configuration has been described in the above embodiment where the electric terminals are disposed in order along a circumferential direction where the diameter from the center of the camera mount and accessory mount is approximately the same, this is not restrictive. For example, a configuration may be made where the electric terminals are disposed along the circumferential direction at different diameters from the center of the camera mount and accessory mount. In this case, the dimensions of the mounts in the radial direction will increase, but friction between terminals can be suppressed.

Although a case has been described in the above embodiment where each mount has three claws in the circumferential direction, the number of claws is not restricted to three, as long as the conditions of the above-described embodiment are satisfied.

A configuration may be made where each of the three claws provided to the mounts in the above-described embodiment is further divided. That is to say, a configuration may be made where one claw is one claw group made up of multiple claws. A case where a groove is provided to one claw falls under this, for example. In this case, the ranges of angles of claw groups disposed in the circumferential direction of the mounts is the same as those in the embodiment described above.

Although a case has been described in the above embodiment where the mount diameter of each mount is the inner diameter of a fitting portion provided to each mount, this is not restrictive. For example, at each mount, an inner diameter of which the radius is the distance from the center (substantially the same as optical axis) of each mount to multiple electronic contacts (terminals) may be used as the mount diameter, or an inner diameter of which the radius is the distance from the center of each mount to a claw or recess may be used as the mount diameter.

Although a configuration has been described in the above embodiment where a device having one of a camera mount and an accessory mount is actually rotated as to a device having the other mount, thereby bayonet-coupling the devices to each other, this is not restrictive. For example, a configuration may be employed where a camera mount and accessory mount are relatively rotated, and the camera mount and accessory mount are bayonet-coupled. Specifics of this will be described in detail below.

Figure 23:
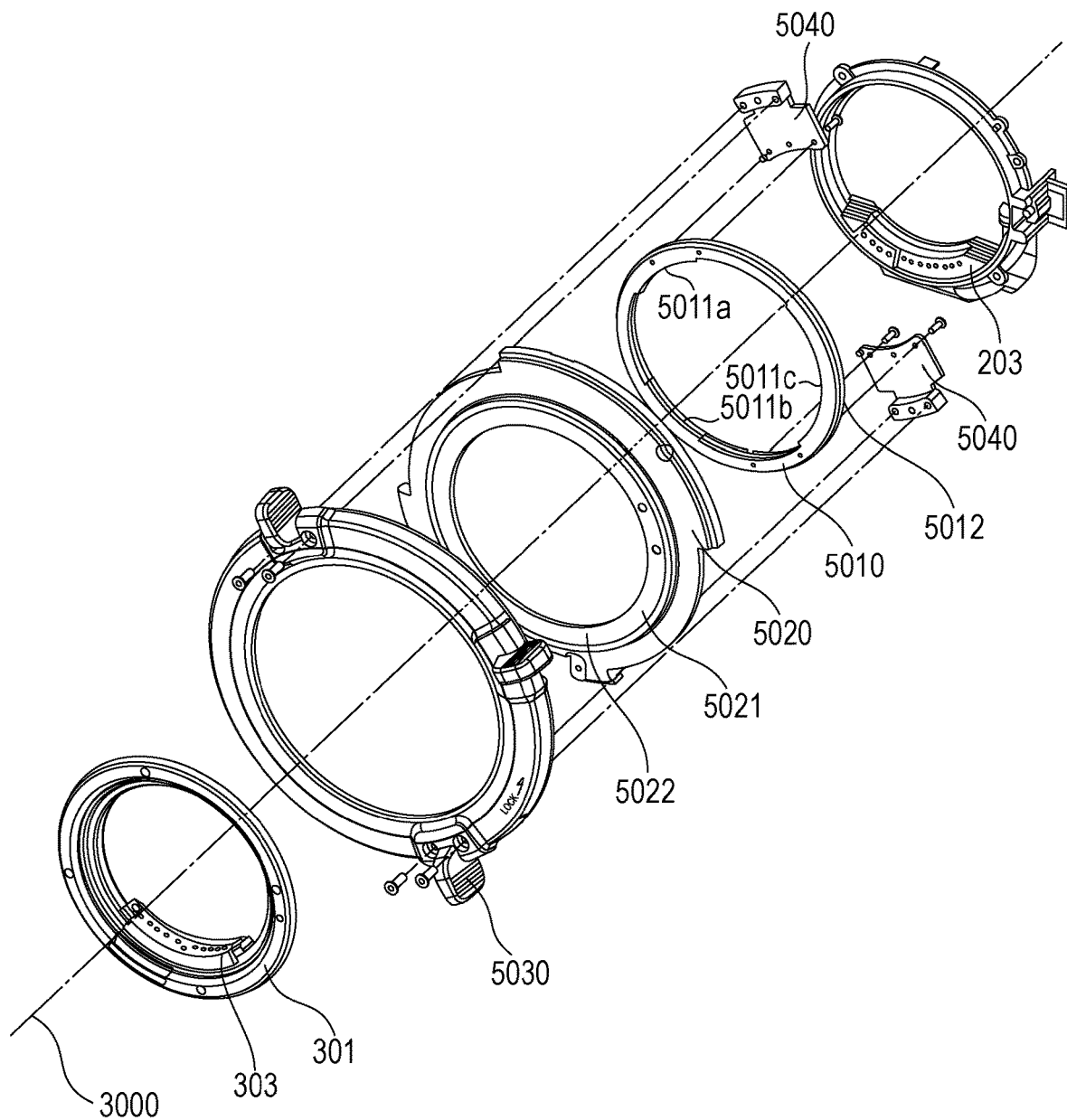
FIG. 23 is a disassembled perspective view of a mount mechanism 5000 according to a modification of the present invention.

FIG. 23 is a disassembled perspective view of a mount mechanism 5000 according to a modification of the present invention. FIG. 24 illustrates diagrams for exemplarily describing a non-coupled state of the mount mechanism 5000 according to the modification of the present invention. FIG. 25 illustrates diagrams for exemplarily describing a coupled state of the mount mechanism 5000 according to the modification of the present invention. In FIGS. 23 through 25, the lens mount capable of bayonet-coupling to a movable mount portion 5010 of the mount mechanism 5000 is also illustrated, for the same of description. Members that are the same as those in the above-described embodiment are denoted by the same reference numerals, and description thereof will be omitted.

As illustrated in FIG. 23, the mount mechanism 5000 according to the present embodiment has, in order from the side to which the lens mount is attached, an operation portion 5030, a fixed mount portion 5020, the movable mount portion 5010, and the contact holding member 203, centered on the optical axis 3000. The operation portion 5030 is a ring-shaped operating unit capable of rotating on a center axis, and is fixed to the movable mount portion 5010 by screws, by arm portions 5040. In the present modification, the operation portion 5030 and movable mount portion 5010 are fixed at two positions, using two arm portions 5040 disposed in an orthogonal direction as to the center axis. According to this configuration, by the operation portion 5030 being rotationally operated, the movable mount portion 5010 also rotates integrally about the center axis as the center.

Provided on the movable mount portion 5010 are movable mount claws 5011a, 5011b, and 5011c, that are each capable of bayonet-coupling with bayonet claws 301a through 301c provided to the lens mount 301. Also provided to the movable mount portion 5010 is a screw portion 5012 that has been threaded around the center axis, and the screwed state as to a below-described screw portion 5022 of the fixed mount portion 5020 changes in accordance with the rotation of the movable mount portion 5010 around the center axis.

The fixed mount portion 5020 has a camera mount face 5021 that comes into contact with the mount face of the lens mount, and the screw portion 5022 with which the screw portion 5012 of the above-described movable mount portion 5010 is screwed. Unlike the above-described movable mount portion 5010, the fixed mount portion 5020 does not rotate about the center axis in accordance with rotation operations of the operation portion 5030.

Figure 24A:
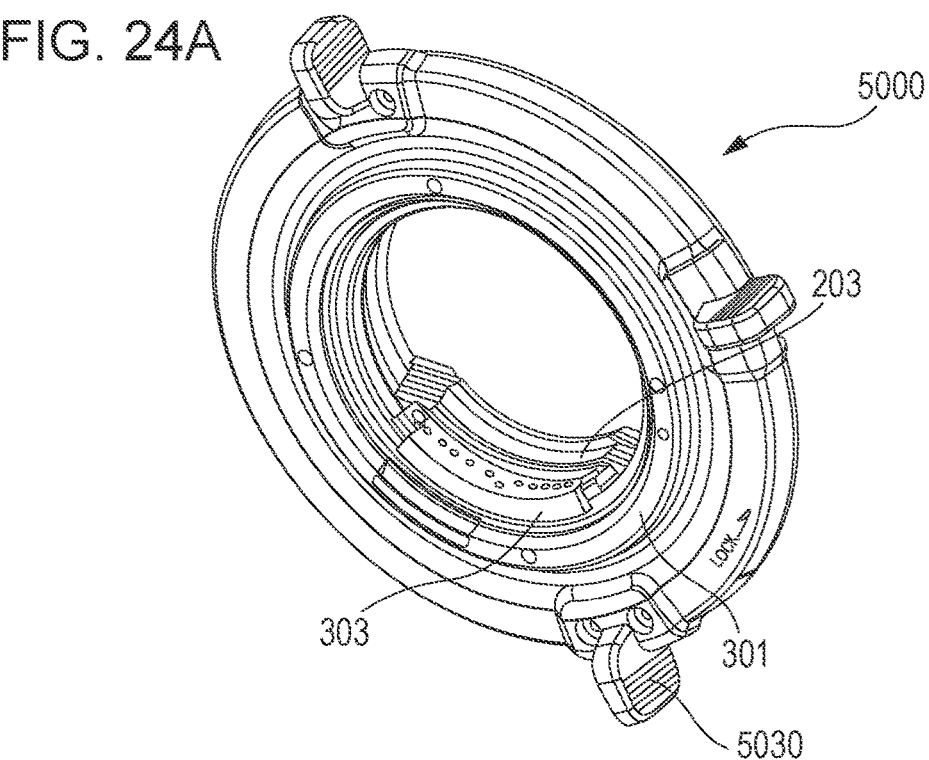
FIG. 24A is an external perspective view of a mount mechanism 5000 exemplarily illustrating a non-coupled state of the mount mechanism 5000 according to a modification of the present invention.
Figure 24B:
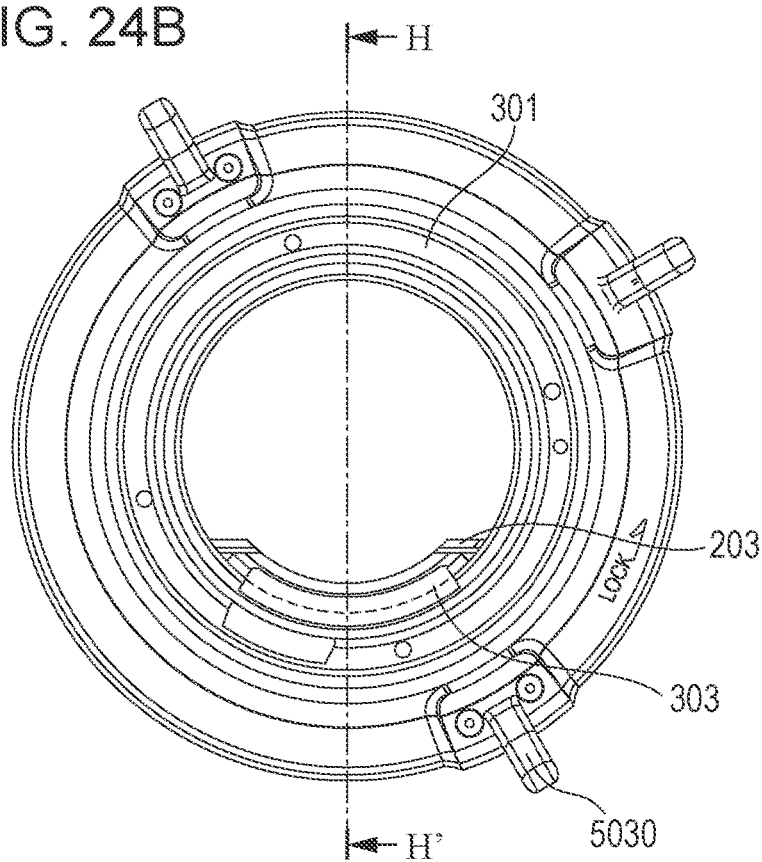
FIG. 24B is a frontal view of the mount mechanism 5000 exemplarily illustrating a non-coupled state of the mount mechanism 5000 according to the modification of the present invention.
Figure 24C:
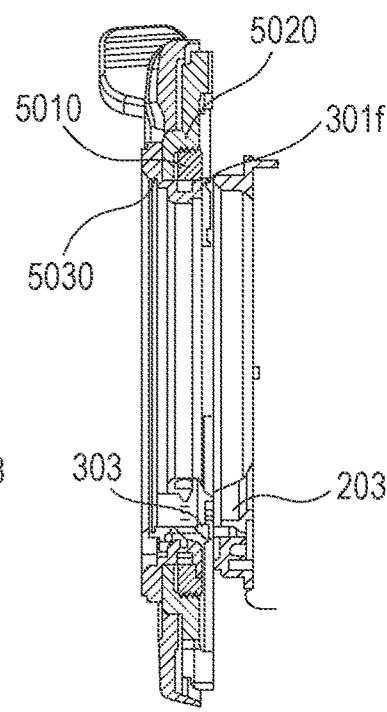
FIG. 24C is a cross-sectional diagram taken along a cross-section H-H' illustrated in FIG. 24B.

Next, the bayonet coupling method of the mount mechanism 5000 according to the present modification will be described with reference to FIGS. 24 and 25. The bayonet claws provided to the lens mount 301 are in a state of being capable to engage the movable mount claws 5011a through 5011c of the movable mount portion 5010, in a state of being passed through an opening portion of the operation portion 5030 and an opening portion of the fixed mount portion 5020. The state illustrated in FIGS. 24A through 24C is a state where the operation portion 5030 is situated at an unlocked position. In this state, the lens mount face of the lens mount and the camera mount face 5021 of the fixed mount portion 5020 are in contact, but the claws of each of the lens mount 301 and movable mount portion 5010 do not engage each other, and do not overlap, as viewed from the center axis direction. FIG. 24C is a cross-sectional diagram taken along a cross-section H-H' illustrated in FIG. 24B. FIG. 25 exemplifies the mount mechanism 5000 in a state where the operation portion 5030 has been rotationally operated from this state.

Figure 25A:
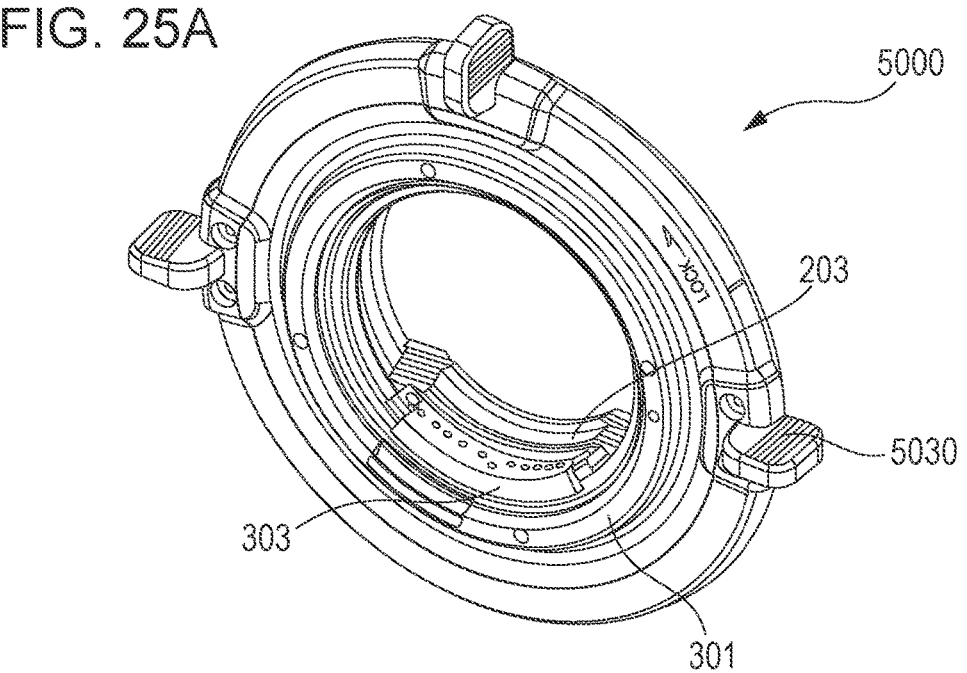
FIG. 25A is an external perspective view of a mount mechanism 5000 exemplarily illustrating a coupled state of the mount mechanism 5000 according to a modification of the present invention.
Figure 25B:
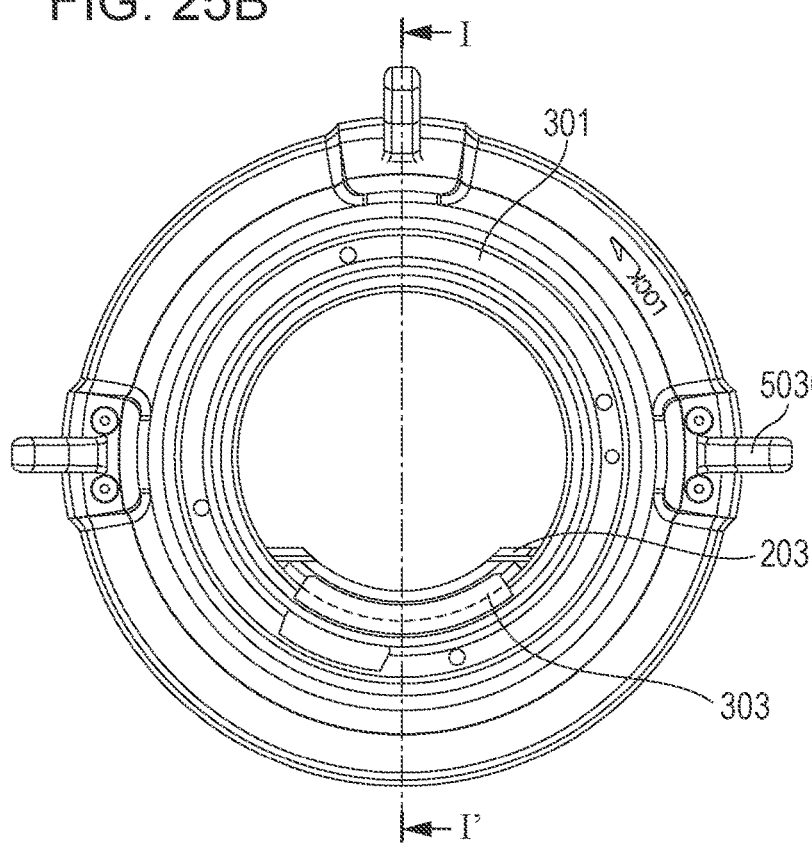
FIG. 25B is a frontal view of the mount mechanism 5000 exemplarily illustrating a coupled state of the mount mechanism 5000 according to the modification of the present invention.
Figure 25C:
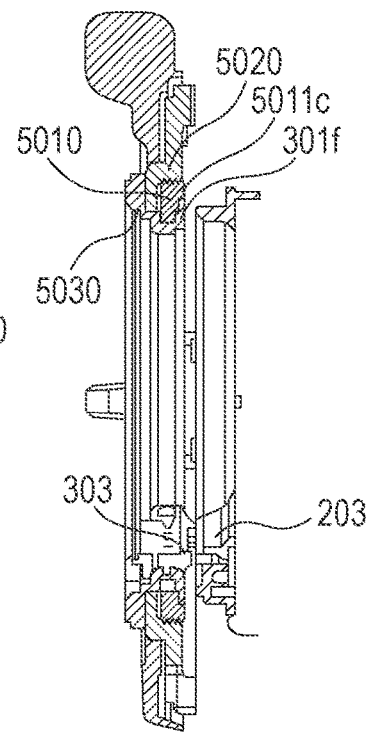
FIG. 25C is a cross-sectional diagram taken along a cross-section I-I' illustrated in FIG. 25B.

The state illustrated in FIGS. 25A through 25C is a state where the operation portion 5030 is situated in a locked position. In this state, the claws of each of the lens mount 301 and movable mount portion 5010 overlap each other, and thereby are engaged in the center axis direction. In this state, the screwing state of the screw portion 5022 of the fixed mount portion 5020 and the screw portion of the movable mount portion 5010 changes in accordance with rotational operation of the operation portion 5030, and the movable mount portion 5010 moves toward the imaging device side in the center axis direction. FIG. 25C is a cross-sectional diagram taken along a cross-section I-I' illustrated in FIG. 25B. As illustrated in FIGS. 24C and 25C, the movable mount portion 5010 moves away from the fixed mount portion 5020 in a center axis direction in accordance with a non-locked state of the mount mechanism 5000 changing to a locked state of the mount mechanism 5000.

According to this configuration, each of the movable mount claws 5011*a* through 5011*c* in a state of being engaged with the bayonet claws at the lens mount 301 side moves toward the imaging apparatus side.

As described above, the mount mechanism 5000 according to the present modification can move the movable mount portion in the center axis direction as to the fixed mount portion, by rotating the movable mount portion that has claws capable of engaging lens-mount-side claws on the center axis. According to this configuration, the mount mechanism 5000 according to the present modification can reduce occurrence of gaps (looseness) occurring between the lens mount and camera-side mount in a coupled state.

Although a configuration has been described in the above modification where the mount mechanism 5000 is provided to the imaging apparatus side, this can be applied to a configuration where the mount mechanism 5000 is provided to a camera accessory side, such as an interchangeable lens.

According to the present invention, erroneous mounting of an imaging apparatus and an accessory having mounts that can be mutually engaged with each other can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A mount apparatus that is attachable to and detachable from an accessory having a first mount provided with a plurality of claws, the mount apparatus comprising:
    a second mount fastened to the mount apparatus by a plurality of screws and provided with a plurality of mount claws configured to be engaged with the plurality of claws provided to the first mount; and
    a plurality of biasing members configured to bias the plurality of claws provided to the first mount in a center axis direction of the second mount,
    wherein the plurality of mount claws provided to the second mount is provided following a circumferential direction of the second mount and includes a first mount claw, a second mount claw, and a third mount claw,
    wherein the first mount claw has an angle range and the second and third mount claws each have an angle range in the circumferential direction of the second mount that is smaller than the angle range of the first mount claw,
    wherein the first, second, and third mount claws respectively have a first, second, and third biasing member arrangement portions on which each of the plurality of biasing members is arranged, and
    wherein, in a case where a line extending from a center of the second mount in a gravitational direction and a direction opposite to the gravitational direction when viewing the mount apparatus in a normal position from the center axis direction of the second mount is taken as a first mount center line, and where a line orthogonal to the first mount center line is taken as a second mount center line, the following is viewed when viewing the second mount in the center axis direction of the second mount:
    (i) the first mount claw overlaps the first mount center line, and at least one of the second mount claw and the third mount claw overlap the second mount center line, in a radial direction of the second mount,
    (ii) the first biasing member arrangement portion overlaps the first mount center line in the radial direction of the second mount, and
    (iii) the second biasing member arrangement portion overlaps the second mount center line in the radial direction of the second mount.

2. The mount apparatus according to claim 1, wherein, in a case of viewing the mount apparatus in the normal position from the center axis direction of the second mount, a total sum of angle ranges of the plurality of mount claws provided to the second mount at a side including a side opposite from the gravitational direction with the second mount center line as an opposite gravitational direction reference in the circumferential direction of the second mount, is larger than a total sum of angle ranges of the plurality of mount claws provided to the second mount at a side including the gravitational direction with the second mount center line as a gravitational direction reference.

3. The mount apparatus according to claim 1, further comprising a lock member provided on an opposite side across the first mount center line from at least one of the second mount claw and third mount claw that overlaps the second mount center line,
    wherein, in a state where the second mount and the first mount are bayonet-coupled, the lock member is configured to engage a groove portion provided to the accessory.

4. The mount apparatus according to claim 1,
    wherein a biasing member of the plurality of biasing members is a leaf spring, and
    wherein the first, second, and third biasing member arrangement portions are spaces in which the leaf spring is arranged.

5. The mount apparatus according to claim 1,
    wherein the second mount has a first mount recess to which a fourth mount claw out of the plurality of claws provided to the first mount can be inserted between the first mount claw and the second mount claw, a second mount recess to which a fifth mount claw out of the plurality of claws provided to the first mount can be inserted between the second mount claw and the third mount claw, and a third mount recess to which a sixth mount claw out of the plurality of claws provided to the first mount can be inserted between the third mount claw and the first mount claw, and
    wherein the angle range of the first mount claw in the circumferential direction of the second mount is not greater than the angle range of the second mount claw and third mount claw in the circumferential direction of the second mount.

6. The mount apparatus according to claim 5, wherein angle ranges of the second mount in the circumferential direction of the second mount are 92° for the first mount claw, 48° for the second mount claw, and 40° for the third mount claw.

7. The mount apparatus according to claim 1, further comprising a restricting member configured to restrict a relative rotational angle of the plurality of claws provided to the first mount and the plurality of mount claws provided to the second mount,
    wherein the second mount center line overlaps the restricting member in the center axis direction of the second mount.

8. The mount apparatus according to claim 1, further comprising an imaging device, wherein the second mount is capable of attaching and detaching an interchangeable lens or an adapter apparatus as the accessory having the first mount.

9. The mount apparatus according to claim 1,
wherein the second mount has a third mount on a side opposite in the center axis direction of the second mount, and
wherein the second mount is capable of attaching and detaching at least an interchangeable lens as the accessory having the first mount, and the third mount is attachable to and detachable from an imaging apparatus.

10. The mount apparatus according to claim 1, wherein the plurality of screws are arranged at non-uniform intervals in the circumferential direction of the second mount, as viewed from the center axis direction of the second mount.

11. The mount apparatus according to claim 1, wherein the first, second, and third biasing member arrangement portions are notch portions provided in each of the first, second, and third mount claws.

12. The mount apparatus according to claim 1, wherein an angle range of the first mount claw on the second mount is equal to or greater than a total sum of an angle range of the second mount claw and an angle range of the third mount claw on the second mount.

13. An accessory attachable to and detachable from a mount apparatus having a first mount provided with a plurality of claws, the accessory comprising:
a second mount fastened to the accessory by a plurality of screws and provided with a plurality of mount claws, which include a first mount claw, a second mount claw, and a third mount claw, and provided with a plurality of mount recesses configured to be engaged with the plurality of claws provided to the first mount,
wherein the plurality of mount recesses provided to the second mount is provided following a circumferential direction of the second mount and includes a first mount recess, a second mount recess, and a third mount recess,
wherein the first mount recess has an angle range and the second and third mount recesses each have an angle range in the circumferential direction of the second mount that is smaller than the angle range of the first mount recess,
wherein, in a state where the accessory is attached to the mount apparatus, the plurality of mount claws provided to the second mount are biased in a center axis direction of the second mount by each of a plurality of biasing members arranged in each space provided in the plurality of claws provided to the first mount,
wherein, in a case where a line extending from a center of the second mount in a gravitational direction and a direction opposite to the gravitational direction when viewing from the center axis direction of the second mount with the mount apparatus to which the accessory is mounted in a normal position, is taken as a first mount center line, the following is viewed when viewing the second mount in the center axis direction of the second mount:
(i) the first mount center line does not overlap any of the plurality of mount recesses provided to the second mount, and
(ii) of the plurality of biasing members, at least a biasing member which biases the first mount claw overlaps the first mount center line in the state where the accessory is attached to the mount apparatus.

14. The accessory according to claim 13, wherein the accessory can be transitioned between a first state where the plurality of mount claws provided to the second mount are inserted between the plurality of claws provided to the first mount, and a second state where coupling of the second mount to the first mount is completed by the plurality of mount claws provided to the second mount and the plurality of claws provided to the first mount being engaged with each other in the center axis direction of the second mount.

15. The accessory according to claim 13, wherein, when viewing the second mount in the center axis direction of the second mount, the first mount claw and the second mount claw overlap the first mount center line in a radial direction of the second mount.

16. The accessory according to claim 15, wherein the second mount claw overlaps the second mount center line in the radial direction of the second mount.

17. The accessory according to claim 16, further comprising a groove portion configured to engage a restricting member provided to the first mount for restricting a relative rotation of the plurality of claws provided to the first mount and the plurality of mount claws provided to the second mount,
wherein, when viewing the second mount in the center axis direction of the second mount, the groove potion is provided on a side opposite and across the first mount center line from the second mount claw, on the second mount center line.

18. The accessory according to claim 17,
wherein the plurality of biasing members are a plurality of leaf springs, and
wherein, when viewing the second mount in the center axis direction of the second mount, a biasing member which biases the second mount claw overlaps the second mount center line in the state where the accessory is attached to the mount apparatus.

19. The accessory according to claim 13, wherein a fourth mount claw out of the plurality of claws provided to the first mount can be inserted to the first mount recess, a fifth mount claw out of the plurality of claws provided to the first mount can be inserted to the second mount recess, and a sixth mount claw out of the plurality of claws provided to the first mount can be inserted to the third mount recess, on the second mount.

20. The accessory according to claim 13, wherein the accessory is an interchangeable lens or an adapter apparatus.

21. The accessory according to claim 13, wherein, of the plurality of biasing members, a biasing member which biases the second mount claw overlaps the second mount center line in the state where the accessory is attached to the mount apparatus.

22. The accessory according to claim 13, wherein at least one of the plurality of screws is not situated in the same angle ranges as the first, second, and third mount claws in the circumferential direction of the second mount, as viewed from the center axis direction of the second mount.

23. The accessory according to claim 13, wherein at least two mount claws of the first mount claw, the second mount claw, and the third mount claw overlap the first mount center line.

24. The accessory according to claim 13, wherein an angle range that the first mount recess occupies on the second mount is equal to or greater than a total sum of an angle range that the second mount recess occupies on the second mount and an angle range that the third mount recess occupies on the second mount.

\* \* \* \* \*